US005389296A

United States Patent [19]

Shingo et al.

[11] Patent Number: 5,389,296

[45] Date of Patent: Feb. 14, 1995

[54] LIQUID CRYSTAL COMPOSITION AND LIQUID CRYSTAL DEVICE CONTAINING SAME

[75] Inventors: Kenji Shingo; Masahiro Terada; Toshiharu Uchimi, all of Atsugi; Akio Yoshida, Chigasaki; Takeshi Togano; Masanobu Asaoka, both of Yokohama; Takashi Iwaki, Atsugi, all of Japan

[73] Assignee: Canon Kabushiki Kaisha, Tokyo, Japan

[21] Appl. No.: 980,116

[22] Filed: Nov. 23, 1992

Related U.S. Application Data

[63] Continuation of Ser. No. 201,183, Jun. 2, 1988, abandoned.

[30] Foreign Application Priority Data

| | | | |
|---|---|---|---|
| Jun. 4, 1987 | [JP] | Japan | 62-140645 |
| Jun. 5, 1987 | [JP] | Japan | 62-142023 |
| May 30, 1988 | [JP] | Japan | 63-132152 |

[51] Int. Cl.[6] ....................... C09K 19/30; C09K 19/34; C09K 19/12

[52] U.S. Cl. ........................... 252/299.63; 252/299.61; 252/299.66

[58] Field of Search ....................... 252/299.61, 299.63, 252/299.66; 359/103

[56] References Cited

U.S. PATENT DOCUMENTS

| | | | |
|---|---|---|---|
| 4,311,610 | 1/1982 | Zaschke et al. | 252/299 |
| 4,737,313 | 4/1988 | Saito et al. | 252/299.63 |
| 4,820,839 | 4/1989 | Krause et al. | 252/299.61 |
| 4,834,904 | 5/1989 | Krause | 252/299.01 |
| 5,064,566 | 11/1991 | Hopf et al. | 252/299.61 |

FOREIGN PATENT DOCUMENTS

| | | |
|---|---|---|
| 0025119 | 3/1981 | European Pat. Off. . |
| 0035155 | 9/1981 | European Pat. Off. . |
| 240386 | 10/1986 | German Dem. Rep. . |
| 3518734 | 11/1986 | Germany . |
| 61-197680 | 9/1986 | Japan . |
| 2175409 | 11/1986 | United Kingdom . |
| 2181429 | 4/1987 | United Kingdom . |
| 87/01717 | 3/1987 | WIPO . |

OTHER PUBLICATIONS

Patent Abstracts of Japan, vol. 11, No. 297 (C-448) Sep. 1987 (62-089669).

Patent Abstracts of Japan, vol. 12, No. 365 (C-532) Sep. 1988 (63-119473).

Patent Abstracts of Japan, vol. 12, No. 306 (C-522) Aug. 1988 (63-077864).

*Primary Examiner*—Richard D. Lovering

*Assistant Examiner*—C. Harris

*Attorney, Agent, or Firm*—Fitzpatrick, Cella, Harper & Scinto

[57] ABSTRACT

A ferroelectric chiral smectic liquid crystal composition is provided with a fast response speed and a less temperature dependency of the response speed by containing at least one mesomorphic compound represented by the formula (1) below:

(1)

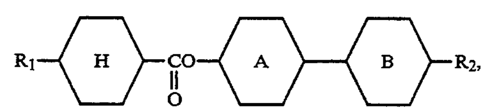

wherein $R_1$ denotes an alkyl group having 1–16 carbon atoms and capable of having a substituent; $R_2$ denotes an alkyl group, alkoxy group, alkoxycarbonyl group, acyloxy group or alkoxycarbonyloxy group each having 1–16 carbon atoms and capable of having a substituent; and respectively denotes (Abstract continued on next page.)

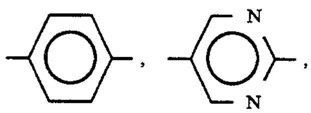
-continued
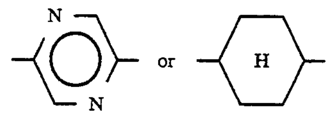
each capable of having a substituent.
11 Claims, 2 Drawing Sheets

LIQUID CRYSTAL COMPOSITION AND LIQUID CRYSTAL DEVICE CONTAINING SAME

This application is a continuation of application Ser. No. 201,183, filed Jun. 2, 1988, now abandoned.

FIELD OF THE INVENTION AND RELATED ART

The present invention relates to a liquid crystal composition used in a liquid crystal display device, a liquid crystal-optical shutter, etc., and more particularly to a novel liquid crystal composition with improved responsiveness to an electric field.

Hitherto, liquid crystal devices have been used as an electro-optical device in various fields. Most liquid crystal devices which have been put into practice use TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128.

These devices are based on the dielectric alignment effect of a liquid crystal and utilize an effect that the average molecular axis direction is directed to a specific direction in response to an applied electric field because of the dielectric anisotropy of liquid crystal molecules. It is said that the limit of response speed is on the order of milli-seconds, which is too slow for many uses. On the other hand, a simple matrix system of driving is most promising for application to a large-area flat display in view of cost, productivity, etc., in combination. In the simple matrix system, an electrode arrangement wherein scanning electrodes and signal electrodes are arranged in a matrix, and for driving, a multiplex driving scheme is adopted wherein an address signal is sequentially, periodically and selectively applied to the scanning electrodes and prescribed data signals are selectively applied in parallel to the signal electrodes in synchronism with the address signal.

When the above-mentioned TN-type liquid crystal is used in a device of such a driving system, a certain electric field is applied to regions where a scanning electrode is selected and signal electrodes are not selected or regions where scanning electrode is not selected and a signal electrode is selected (which regions are so called "half-selected points"). If the difference between a voltage applied to the selected points and a voltage applied to half-selected points is sufficiently large, and a voltage threshold level required for allowing liquid crystal molecules to be aligned or oriented perpendicular to an electric field is set to a value therebetween, display devices normally operate. However, in fact, as the number (N) of scanning lines increases, a time (duty ratio) during which an effective electric field is applied to one selected point when a whole image area (corresponding to one frame) is scanned decreases with a ratio of 1/N. Accordingly, the larger the number of scanning lines are, the smaller is the voltage difference of an effective value applied to a selected point and non-selected points when scanning is repeatedly effected. As a result, this leads to unavoidable drawbacks of lowering of image contrast or occurrence of interference or crosstalk. These phenomena are regarded as essentially unavoidable problems appearing when a liquid crystal having no bistability (i.e. liquid crystal molecules are horizontally oriented with respect to the electrode surface as stable state and is vertically oriented with respect to the electrode surface only when an electric field is effectively applied) is driven (i.e. repeatedly scanned) by making use of a time storage effect. To overcome these drawbacks, the voltage averaging method, the two-frequency driving method, the multiple matrix method, etc. has been already proposed. However, any method is not sufficient to overcome the above-mentioned drawbacks. As a result, it is the present state that the development of large image area or high packaging density in respect to display elements is delayed because it is difficult to sufficiently increase the number of scanning lines.

To overcome drawbacks with such prior art liquid crystal devices, the use of liquid crystal devices having bistability has been proposed by Clark and Lagerwall (e.g. Japanese Laid-Open Patent Appln. No. 56-107216, U.S. Pat. No. 4,367,924, etc.). In this instance, as the liquid crystals having bistability, ferroelectric liquid crystals having chiral smectic C-phase (SmC*) or H-phase (SmH*) are generally used. These liquid crystals have bistable states of first and second stable states with respect to an electric field applied thereto. Accordingly, as different from optical modulation devices in which the above-mentioned TN-type liquid crystals are used, the bistable liquid crystal molecules are oriented to first and second optically stable states with respect to one and the other electric field vectors, respectively. Further, this type of liquid crystal has a property (bistability) of assuming either one of the two stable states in response to an applied electric and retaining in the absence of the resultant state in the absence of an electric field.

In addition to the above-described characteristic of showing bistability, the ferroelectric liquid crystal has an excellent property, i.e., a high-speed responsiveness. This is because the spontaneous polarization of the ferroelectric liquid crystal and an applied electric field directly interact with each other to induce transition of orientation states. The resultant response speed is faster than the response speed due to the interaction between dielectric anistropy and an electric field by 3 to 4 digits.

Thus, a ferroelectric liquid crystal potentially has very excellent characteristics, and by making use of these properties, it is possible to provide essential improvements to many of the above-mentioned problems with the conventional TN-type devices. Particularly, the application to a high-speed optical shutter and a display of a high density and a large picture is expected. For this reason, there has been made extensive research with respect to liquid crystal materials showing ferroelectricity. However, ferroelectric liquid crystal materials developed heretofore cannot be said to satisfy sufficient characteristics required for a liquid crystal device including low-temperature operation characteristic, high-speed responsiveness, etc.

Among a response time $\tau$, the magnitude of spontaneous polarization Ps and viscosity $\eta$, the following relationship exists: $\tau=\eta/(Ps\cdot E)$, where E is an applied voltage. Accordingly, a large response speed can be obtained by (a) increasing the spontaneous polarization, (b) lowering the viscosity $\eta$, or (c) increasing the applied voltage. However, the driving voltage has a certain upper limit in view of driving with IC, etc., and should desirably be as low as possible. Accordingly, it is actually necessary to lower the viscosity or increase the spontaneous polarization.

A ferroelectric chiral smectic liquid crystal having a large spontaneous polarization generally provides a large internal electric field in a cell given by the spontaneous polarization and is liable to pose may constraints on the device construction giving bistability. Further, an excessively large spontaneous polarization is liable to accompany an increase in viscosity, so that a remarkable increase in response speed may not be attained as a result.

Further, if it is assumed that the operation temperature of an actual display device is 5°–40° C., the response speed changes by a factor of about 20, so that it actually exceeds the range controllable by driving voltage and frequency.

As described hereinabove, commercialization of a ferroelectric liquid crystal device requires a ferroelectric chiral smectic liquid crystal composition having a low viscosity, a high-speed responsiveness and a small temperature-dependency of response speed.

SUMMARY OF THE INVENTION

An object of the present invention is to provide a chiral smectic liquid crystal composition having a high response speed and a smaller temperature-dependency of the response speed for providing a practical ferroelectric liquid crystal device and a liquid crystal device using the liquid crystal composition.

According to a generic aspect of the present invention, there is provided a ferroelectric chiral smectic liquid crystal composition containing at least one mesomorphic compound represented by the formula (1) below:

(1)

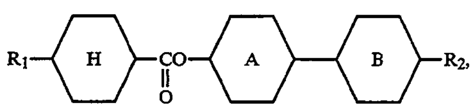

wherein $R_1$ denotes an alkyl group having 1–16 carbon atoms and capable of having a substituent; $R_2$ denotes an alkyl group, alkoxy group, alkoxycarbonyl group, acyloxy group or alkoxycarbonyloxy group each having 1–16 carbon atoms and capable of having a substituent; and

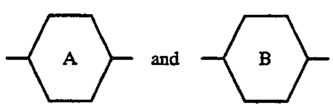

respectively denotes

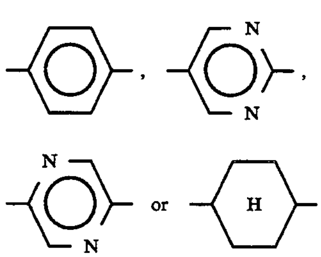

each capable of having a substituent.

According to another generic aspect of the present invention, there is provided a liquid crystal device comprising a pair of electrode plates, and the above liquid crystal composition disposed between the electrode plates.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
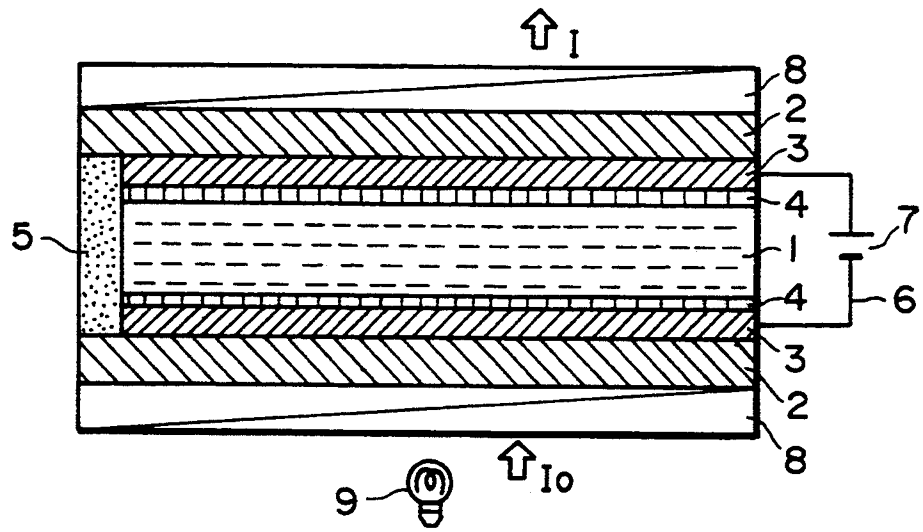
FIG. 1 is a schematic sectional view of a liquid crystal display device using a ferroelectric liquid crystal.

As described above, according to a generic aspect of the present invention, there is provided a ferroelectric chiral smectic liquid crystal composition containing at least one mesomorphic compound represented by the formula (1) below:

(1)

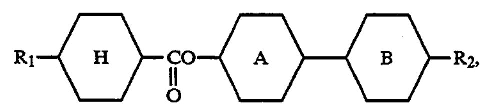

wherein $R_1$ denotes an alkyl group having 1–16 carbon atoms and capable of having a substituent; $R_2$ denotes an alkyl group, alkoxy group, alkoxycarbonyl group, acyloxy group or alkoxycarbonyloxy group each having 1–16 carbon atoms and capable of having a substituent; and

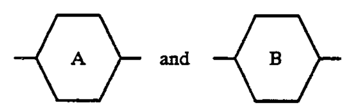

respectively denotes

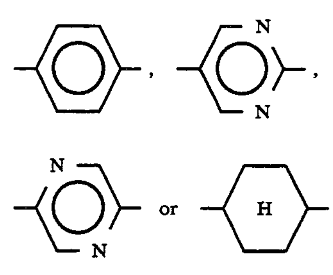

each capable of having a substituent.

According to a preferred embodiment, the liquid crystal composition of the present invention contains at least one mesomorphic compound represented by the following formula (2):

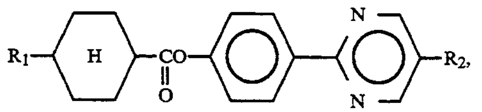

(2)

wherein $R_1$ and $R_2$ have the same meanings as in the formula (1).

According a more specific aspect of the present invention, there is provided a liquid crystal composition comprising at least one mesomorphic compound of the above-mentioned formula (1), and at least one mesomorphic compound of the formula (3) below:

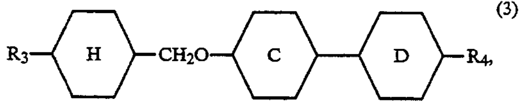

(3)

wherein $R_3$ denotes an alkyl group having 1-16 carbon atoms and capable of having a substituent; $R_4$ denotes an alkyl group, alkoxy group, alkoxycarbonyl group, acyloxy group or alkoxycarbonyloxy group each having 1-16 carbon atoms and capable of having a substituent; and

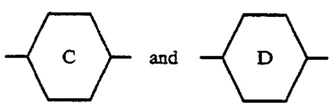

respectively denotes

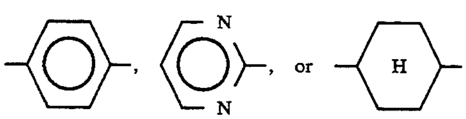

each capable of having a substituent.

According to a preferred embodiment of this aspect, the liquid crystal comprises at least one mesomorphic compound represented by the following formula (2):

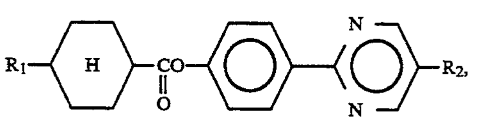

(2)

wherein $R_1$ and $R_2$ have the same meanings as in the formula (1); and at least one mesomorphic compound represented by the following formula (4):

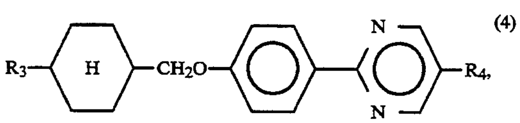

(4)

wherein $R_3$ and $R_4$ have the same meanings as in the formula (3).

According to another specific aspect of the present invention, there is provided a liquid crystal composition comprising at least one mesomorphic compound of the above-mentioned formula (1), and at least one mesomorphic compound of the formula (5) below:

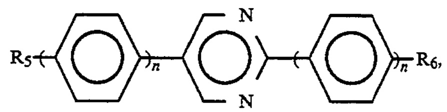

(5)

wherein $R_5$ and $R_6$ respectively denote an alkyl group, alkoxy group, acyloxy group, alkoxycarbonyl group or alkoxycarbonyloxy group each having 1-16 carbon atoms and capable of having a substituent; and m and n are respectively 0, 1 or 2.

In a particularly preferred embodiment of this aspect, the liquid crystal composition comprises at least one mesomorphic compound of the formula (2), and at least one mesomorphic compound of the formula (6) and/or at least one mesomorphic compound of the formula (7) respectively shown below:

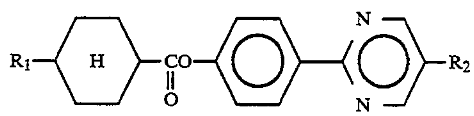

(2)

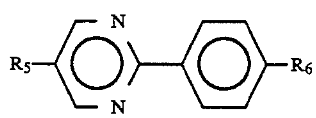

(6)

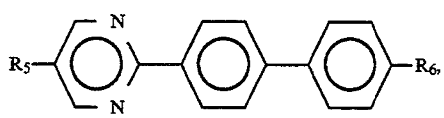

(7)

wherein $R_1$, $R_2$, $R_5$ and $R_6$ have the same meanings as defined above.

According to another aspect of the present invention, there is provided a ferroelectric chiral smectic liquid crystal composition comprising at Least one mesomorphic compound having a pyrazine ring and at least one mesomorphic compound having a pyrimidine ring. A liquid crystal device comprising the liquid crystal composition between a pair of electrode plates, is also provided.

Specific examples of the mesomorphic compounds represented by the above-mentioned general formula (1) are enumerated hereinbelow with their numbers and structural formulas:

Example Compound No.

(1-1)

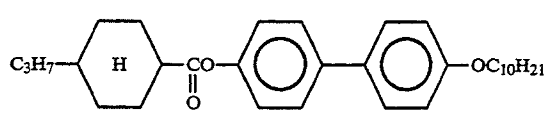

-continued
Example Compound No.
(1-2)
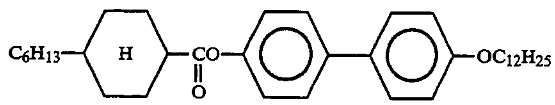
(1-3)
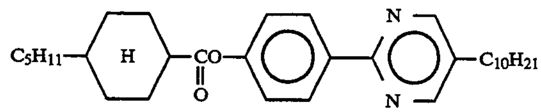
(1-4)
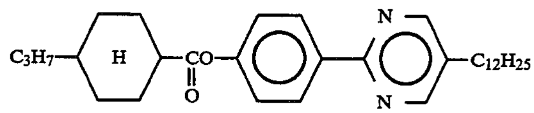
(1-5)
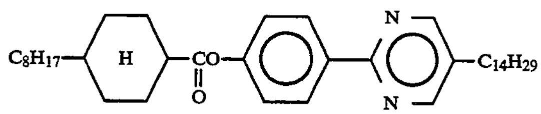
(1-6)
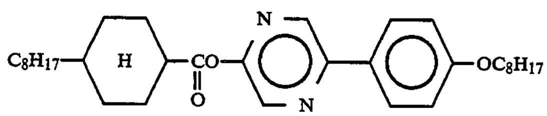
(1-7)
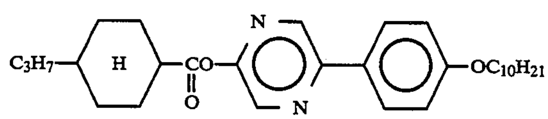
(1-8)
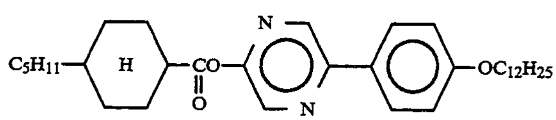
(1-9)
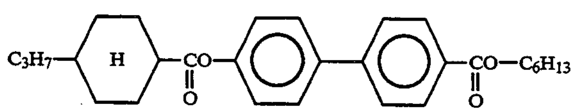
(1-10)
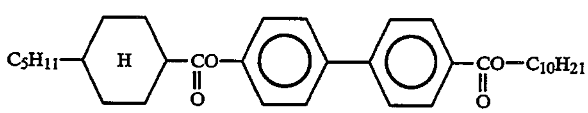
(1-11)
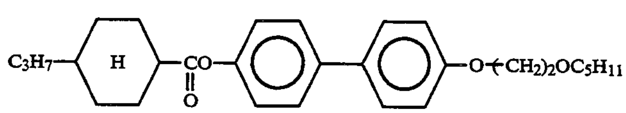
(1-12)
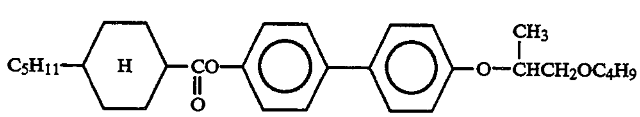
(1-13)
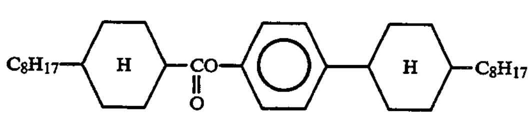
(1-14)
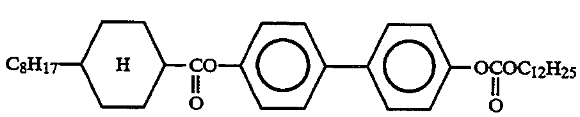

-continued
Example Compound No.
(1-15)
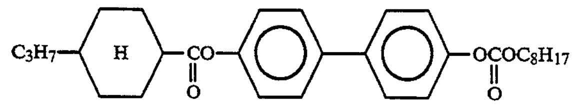
(1-16)
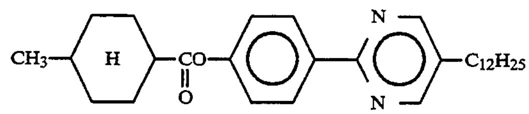
(1-17)
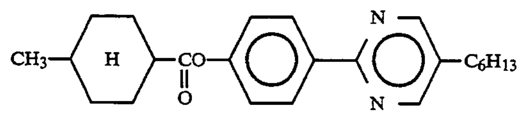
(1-18)
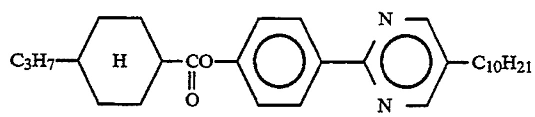
(1-19)
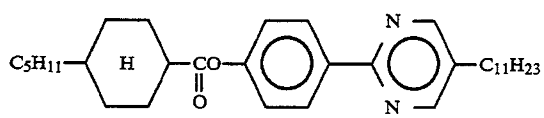
(1-20)
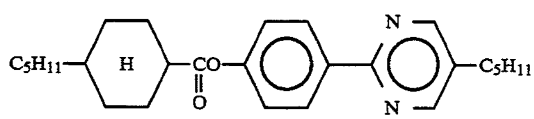
(1-21)
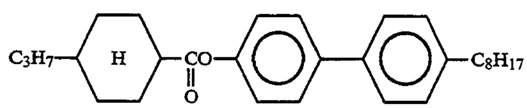
(1-22)
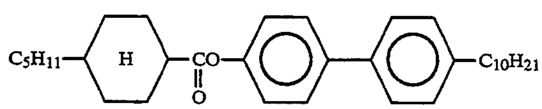
(1-23)
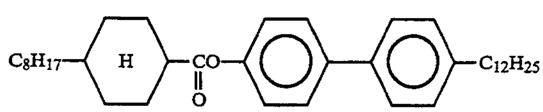
(1-24)
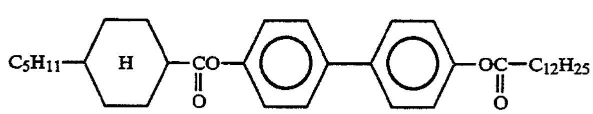
(1-25)
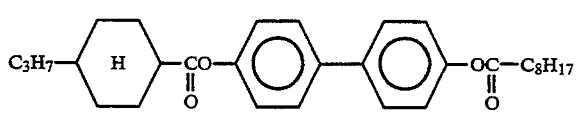
(1-26)
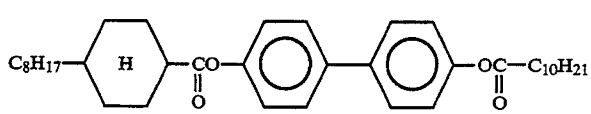
(1-27)
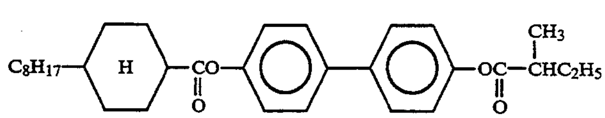

-continued
Example Compound No.
(1-28)
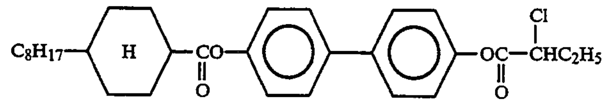
(1-29)
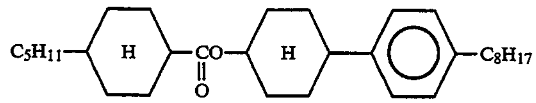
(1-30)
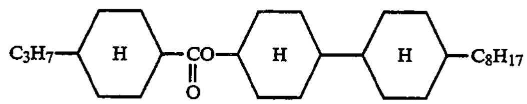
(1-31)
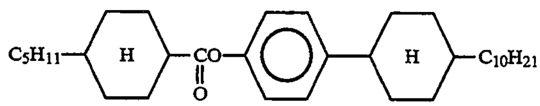
(1-32)
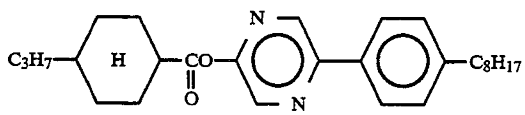
(1-33)
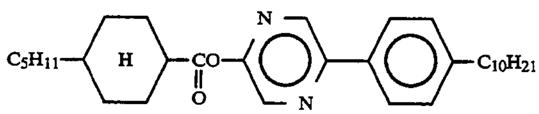
(1-34)
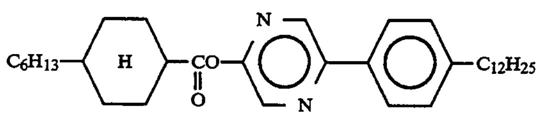
(1-35)
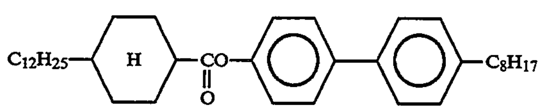
(1-36)
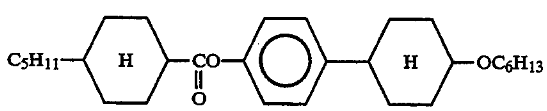
(1-37)
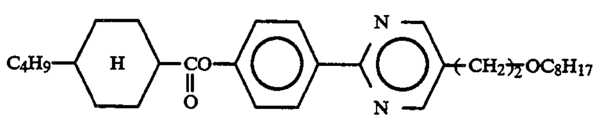
(1-38)
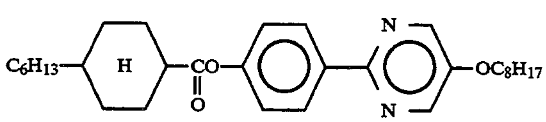
(1-39)
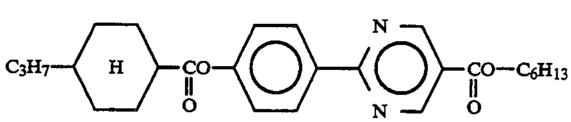
(1-40)
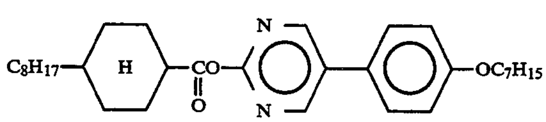

-continued
Example Compound No.
(1-41)
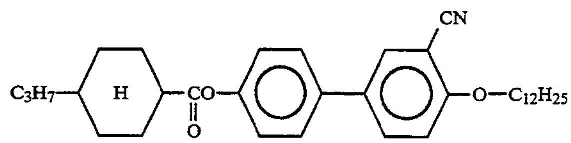
(1-42)
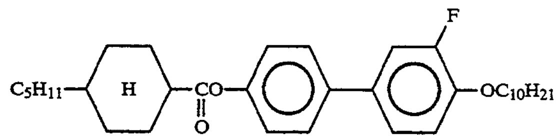
(1-43)
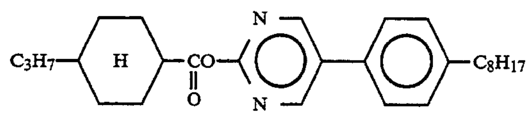
(1-44)
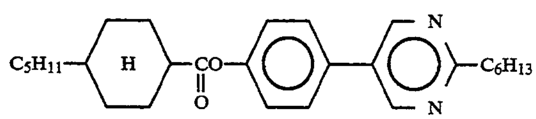
(1-45)
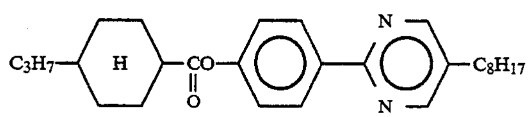
(1-46)
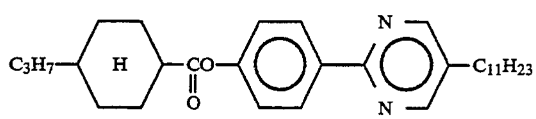
(1-47)
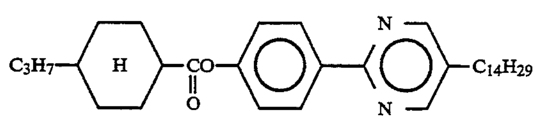
(1-48)
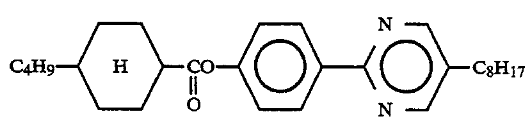
(1-49)
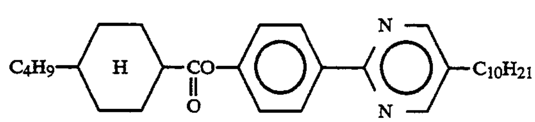
(1-50)
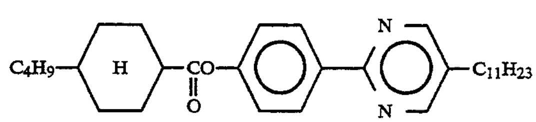
(1-51)
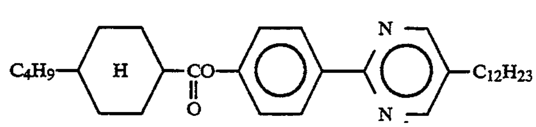
(1-52)
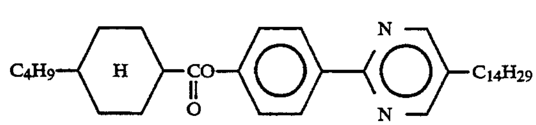

-continued
Example Compound No.
(1-53) 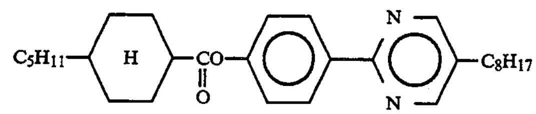
(1-54) 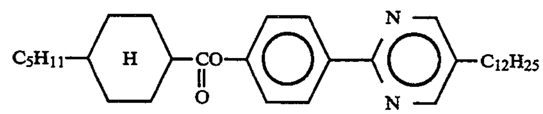
(1-55) 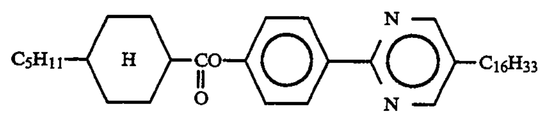
(1-56) 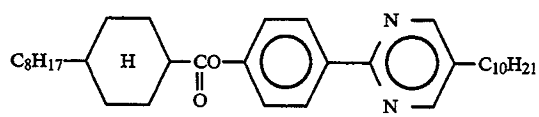
(1-57) 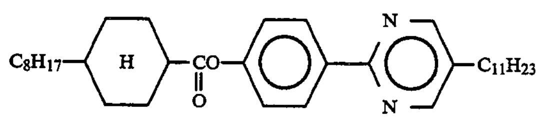
(1-58) 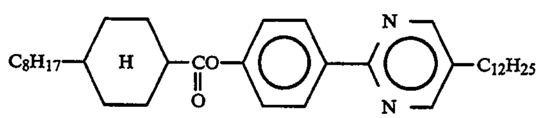
(1-59) 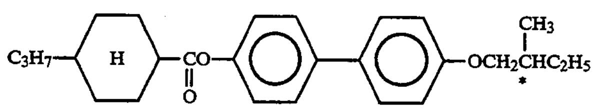
(1-60) 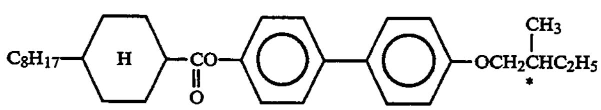
(1-61) 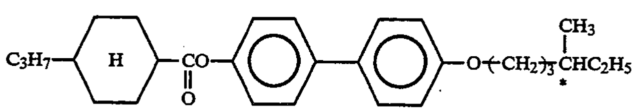
(1-62) 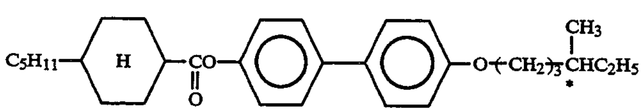
(1-63) 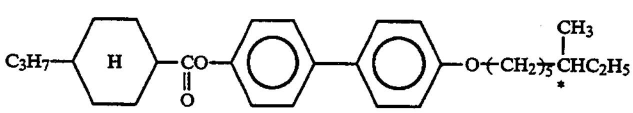
(1-64) 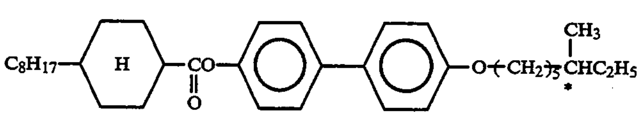
(1-65) 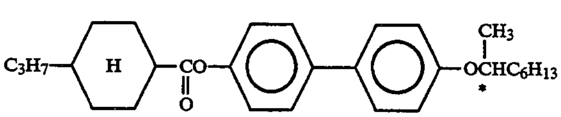

-continued
Example Compound No.
(1-66) 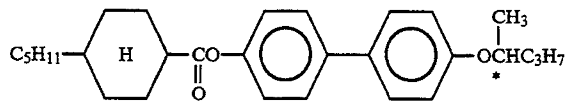
(1-67) 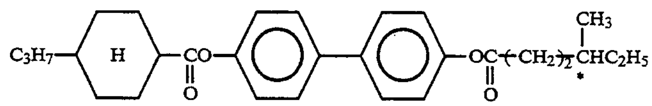
(1-68) 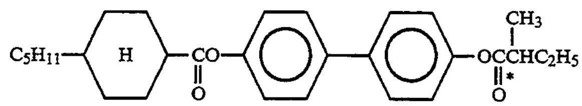
(1-69) 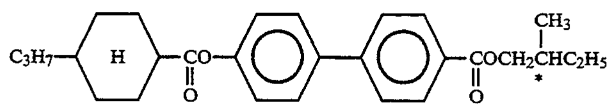
(1-70) 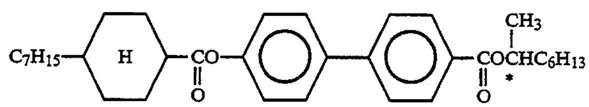
(1-71) 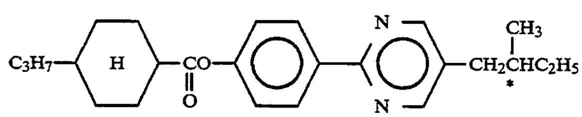
(1-72) 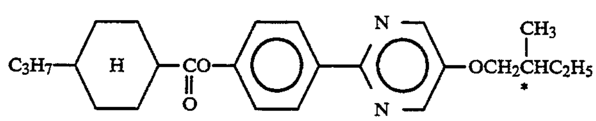
(1-73) 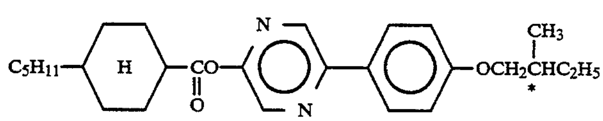
(1-74) 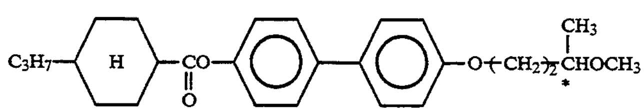
(1-75) 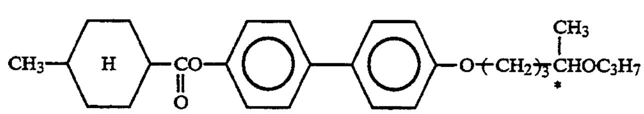
(1-76) 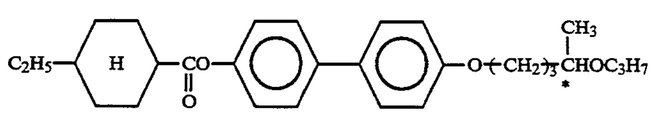
(1-77) 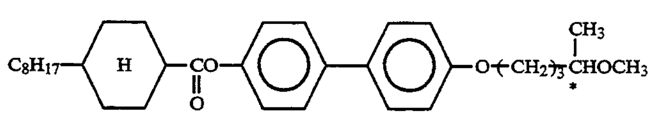
(1-78) 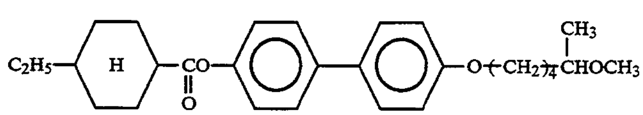

-continued
Example Compound No.
(1-79) 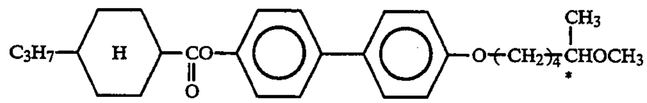
(1-80) 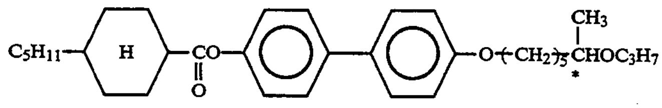
(1-81) 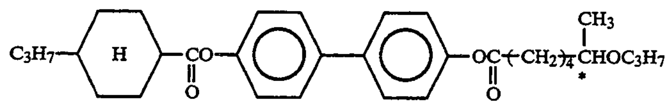
(1-82) 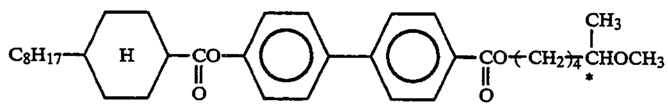
(1-83) 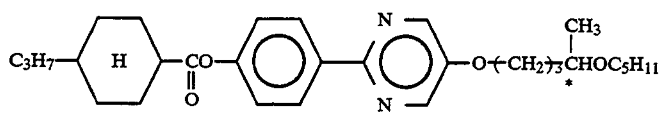
(1-84) 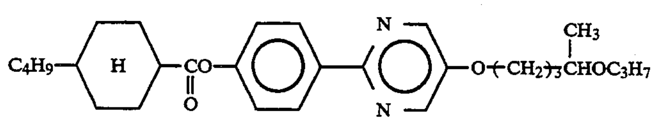
(1-85) 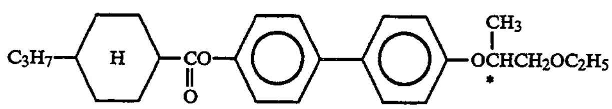
(1-86) 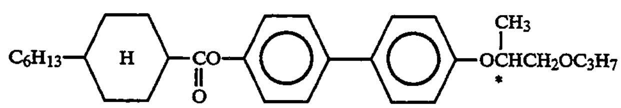
(1-87) 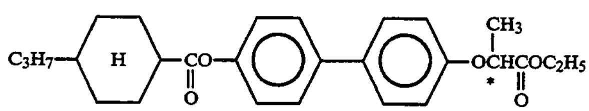
(1-88) 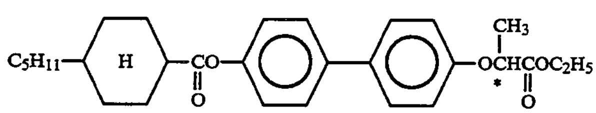
(1-89) 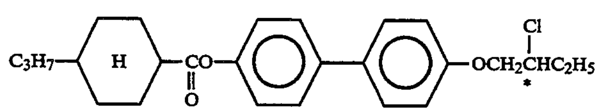
(1-90) 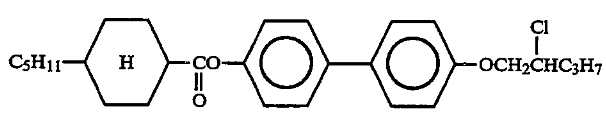
(1-91) 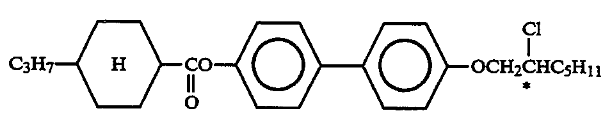

-continued

Example Compound No.

(1-92) 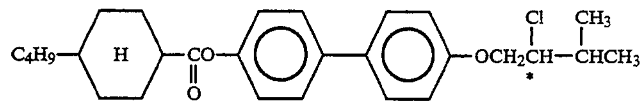

(1-93) 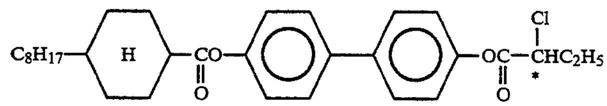

(1-94) 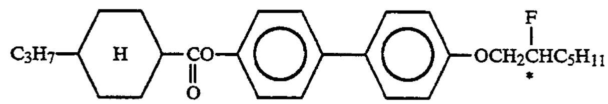

(1-95) 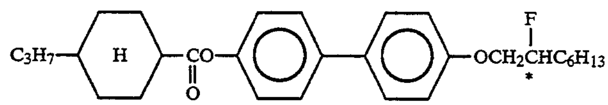

(1-96) 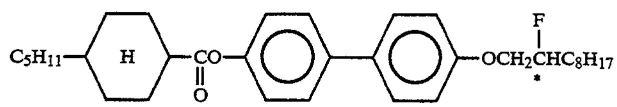

(1-97) 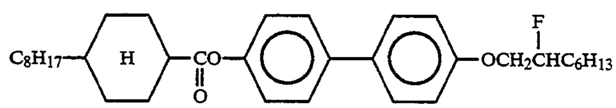

(1-98) 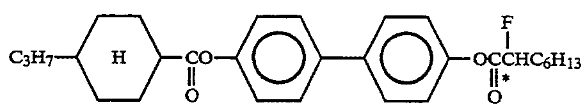

(1-99) 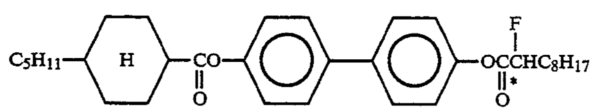

Then, a representative example of synthesis of the mesomorphic compound represented by the above formula (1) is described.

Synthesis Example 1

(Synthesis of the above-mentioned Example Compound No. 1-4)

1.0 g (2.94 mmol) of 5-dodecyl-2-(4'-hydroxyphenyl)-pyrimidine was dissolved in a mixture of toluene 4 ml and pyridine 4 ml. While the solution was held at 5° C. or below or an iced water bath, a solution of 0.55 g of trans-4-n-propylcyclohexanecarboxylic acid chloride (mfd. by Kanto Kagaku K.K.) in 4 ml of toluene was gradually added dropwise. After the addition, the mixture was stirred for 12 hours at room temperature and then poured into 100 ml of iced water. The mixture was acidified with 6N-hydrochloric acid and then extracted with benzene, followed by sequential washing with water, 5% aqueous solution of sodium bicarbonate and water after drying with magnesium sulfate, the solvent was distille-off to obtain a cream-colored crude product. The crude product was further purified by column chromatography and recrystallized from a solvent mixture of ethanol/ethyl acetate to obtain 0.94 g (yield: 64.8%) of the objective compound in white color, which showed the following phase transition characteristic.

Phase transition temperature (°C.)

$$\text{Cry.}\ \underset{61.5}{\overset{64.9}{\rightleftarrows}}\ \text{Sm3}\ \underset{75.4}{\overset{76.3}{\rightleftarrows}}\ \text{SmC}\ \underset{107.4}{\overset{108.1}{\rightleftarrows}}\ \text{N}\ \underset{152.0}{\overset{152.8}{\rightleftarrows}}\ \text{Iso.}$$

Herein, symbols regarding the phase transition characteristic of a mesomorphic compound or liquid crystal composition denote the following phases:

Cry.: crystal phase, SmC: smectic C phase, SmC*: chiral smectic C phase, SmA: smectic A phase, Ch.: cholesteric phase, N: nematic phase, Iso.: isotropic phase, Sm3: a smectic phase other than SmA and SmC (un-identified).

Hereinbelow, an example of synthesis of a representative mesomorphic compound has been explained. The other compounds represent by the general formula (1) may also be prepared by reacting a corresponding para-substituted cyclohexanecarboxylic acid chloride (which may be obtained by reacting a corresponding parasubstituted cyclohexanecarboxylic acid with thionyl chloride, etc., according to an ordinary method, if not commercially available) with a corresponding phenol in the presence of an alkali. These reactions may be summarized by the following reaction scheme:

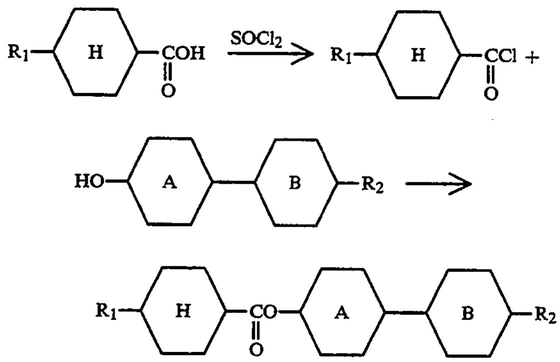

$R_1$, $R_2$,

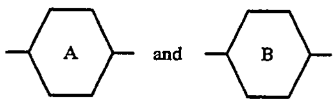

have the same meanings as defined above.

The ferroelectric liquid crystal composition of the present invention may be obtained by mixing at least one mesomorphic compound represented by the general formula (1) (hereinafter sometimes referred to as "instant mesomorphic compound" with or without indication of the formula) with another at least one mesomorphic compound in appropriate proportions. The mixture may be generally heated into isotropic phase and sealed up in a device cell in vacuo, followed by gradual cooling to form a liquid crystal and then recovery of normal pressure, whereby the liquid crystal composition of the present invention may be formed in situ as the preparation of the liquid crystal device according to the present invention.

When the mesomorphic compound of the formula (1) is optically inactive, it may suit, ably be mixed with ferroelectric liquid crystal composition comprising a ferroelectric mesomorphic compound as another mesomorphic compound. Specific examples of such ferroelectric mesomorphic compounds are shown below with their Compound Nos. and structural formulas:

Example Compound No.

(1)

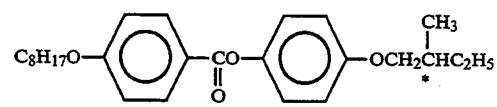

(2)

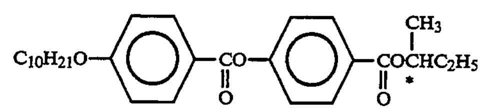

(3)

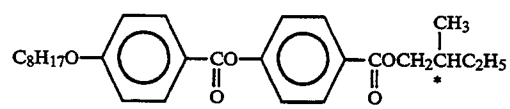

(4)

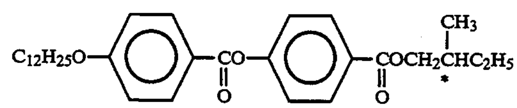

(5)

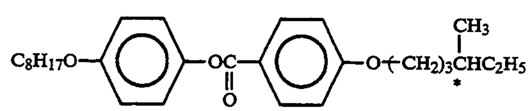

(6)

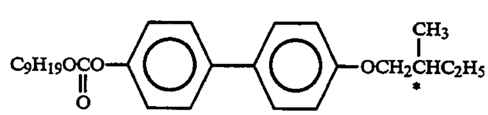

(7)

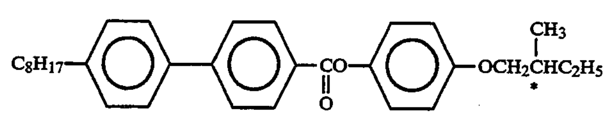

(8)

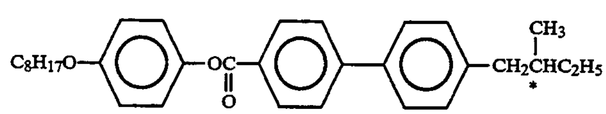

-continued
Example Compound No.
(9)
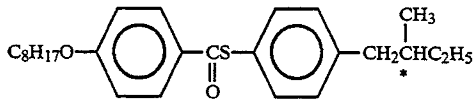
(10)
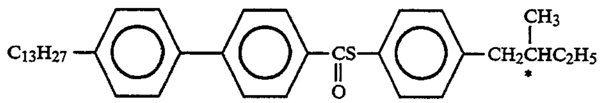
(11)
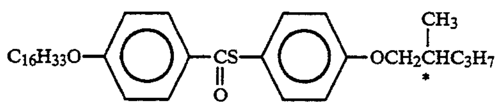
(12)
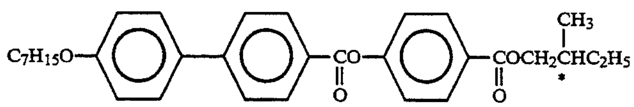
(13)
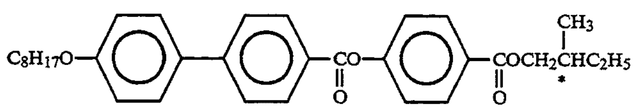
(14)
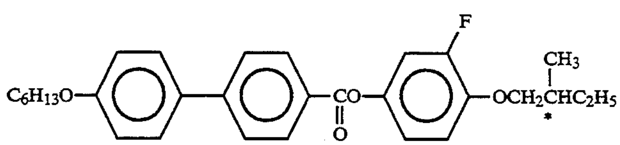
(15)
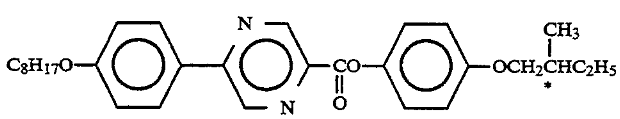
(16)
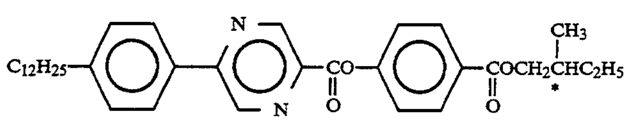
(17)
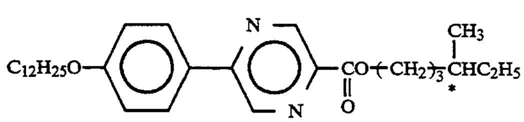
(18)
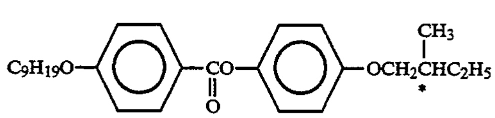
(19)
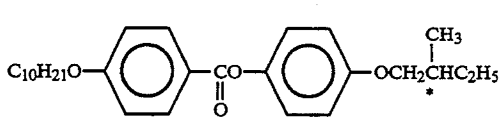
(20)
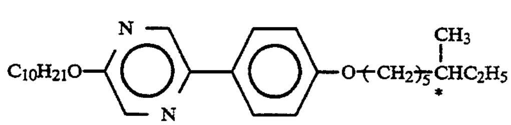
(21)
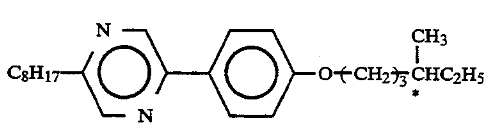

-continued
Example Compound No.
(22)
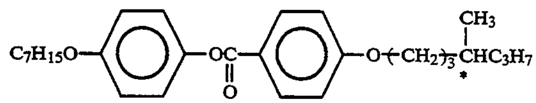
(23)
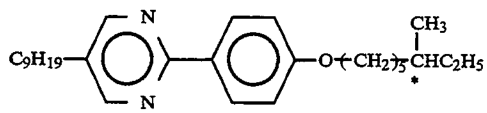
(24)
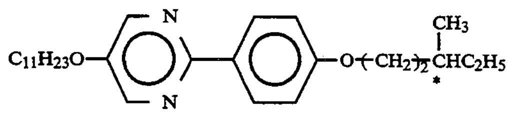
(25)
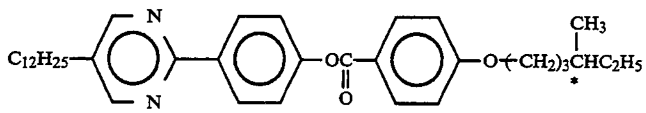
(26)
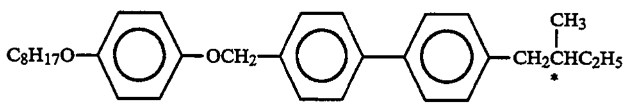
(27)
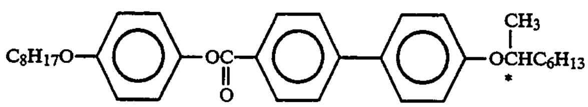
(28)
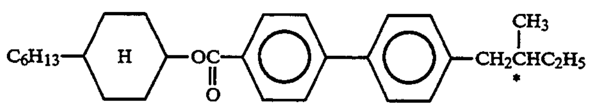
(29)
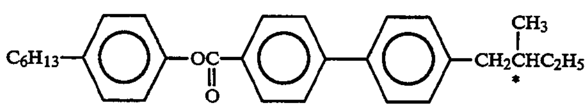
(30)
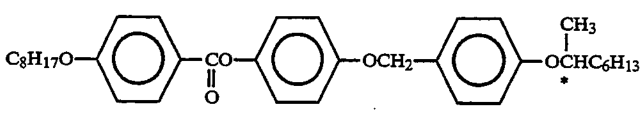
(31)
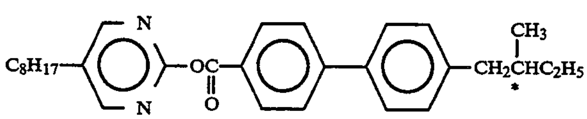
(32)
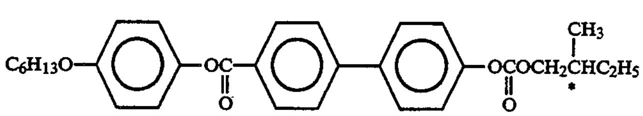
(33)
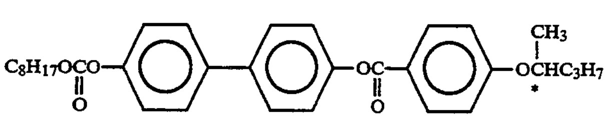
(34)
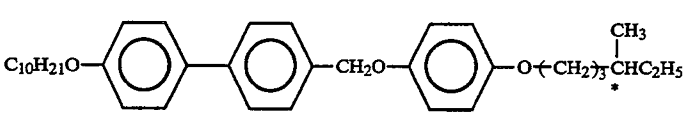

-continued
Example Compound No.
(35)
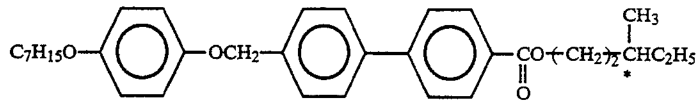
(36)
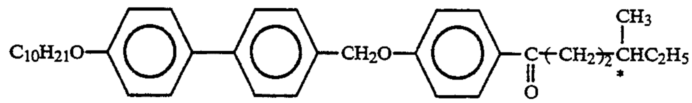
(37)
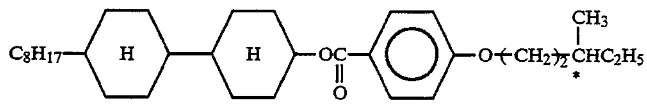
(38)
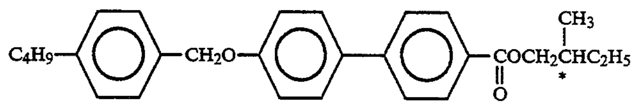
(39)
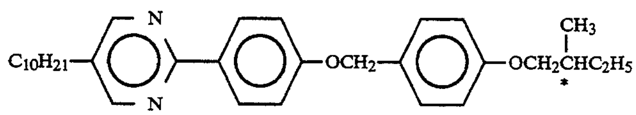
(40)
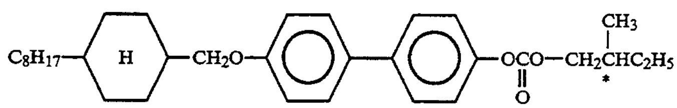
(41)
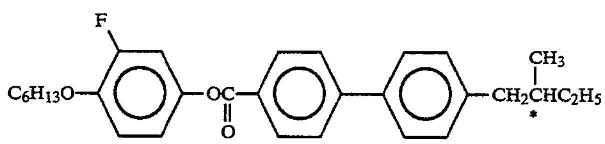
(42)
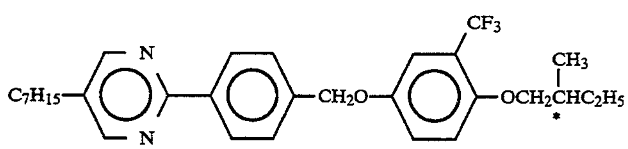
(43)
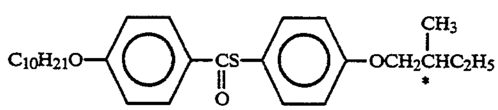
(44)
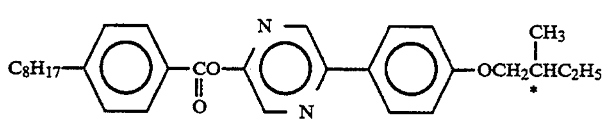
(45)
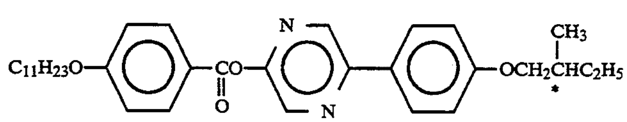
(46)
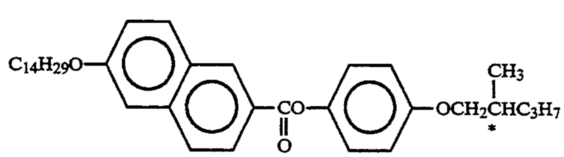

-continued
Example Compound No.
(47)
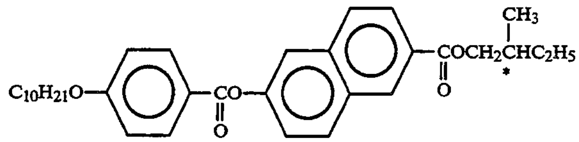
(48)
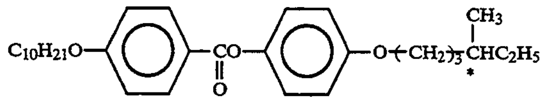
(49)
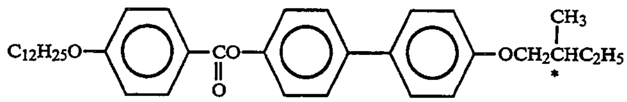
(50)
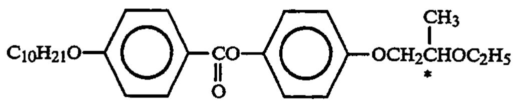
(51)
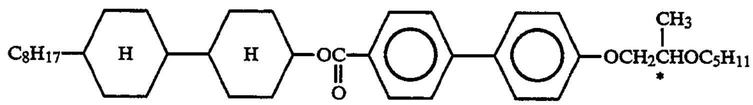
(52)
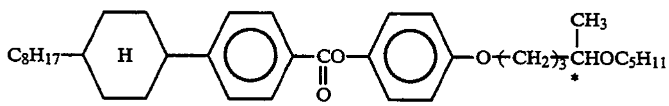
(53)
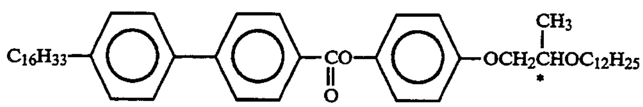
(54)
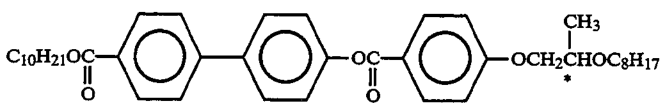
(55)
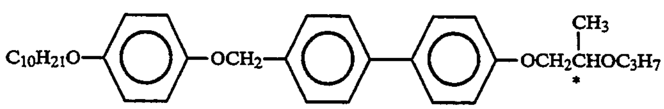
(56)
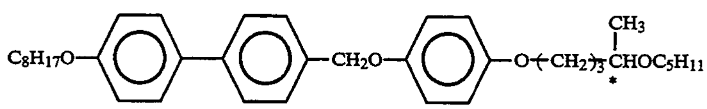
(57)
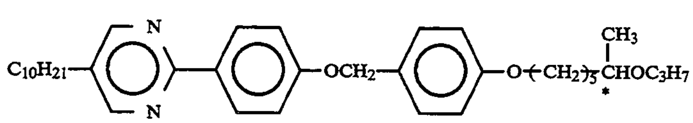
(58)
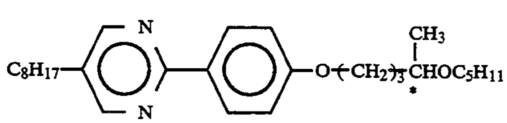
(59)
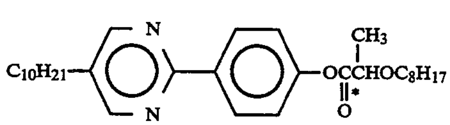

-continued
Example Compound No.
(60)
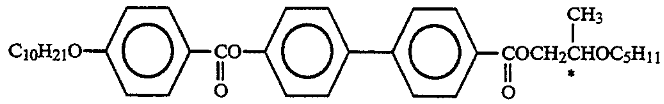
(61)
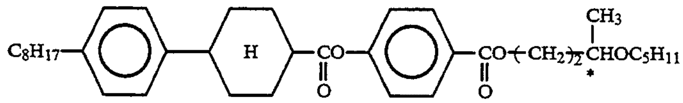
(62)
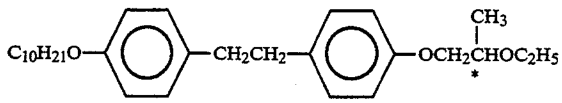
(63)
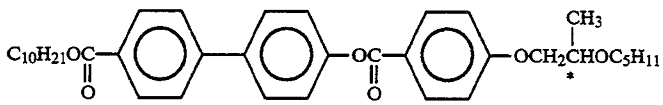
(64)
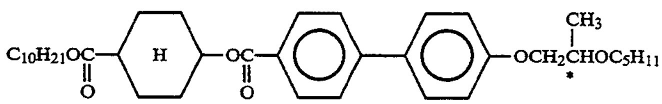
(65)
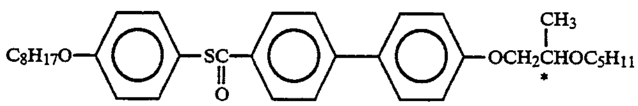
(66)
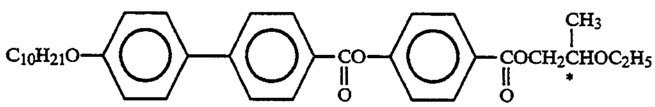
(67)
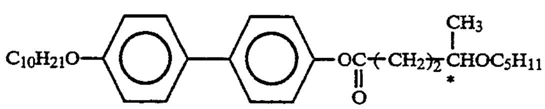
(68)
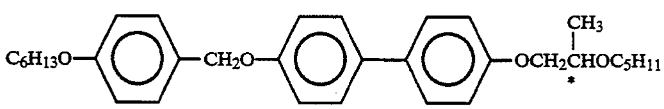
(69)
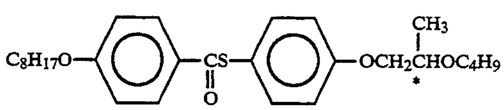
(70)
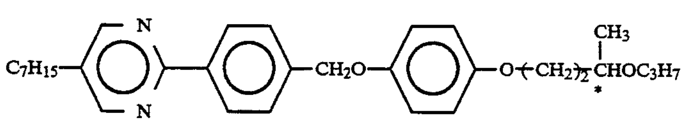
(71)
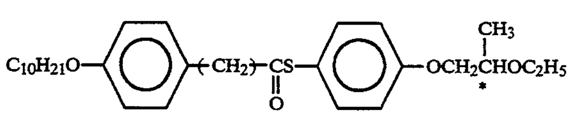
(72)
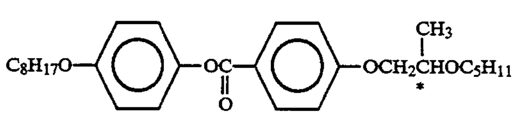

-continued
Example Compound No.
(73)
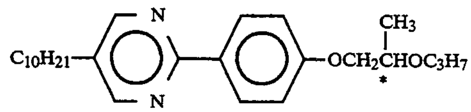
(74)
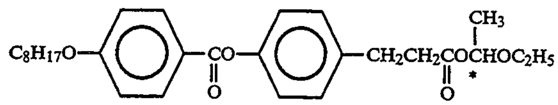
(75)
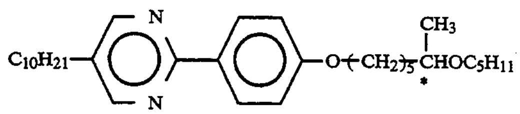
(76)
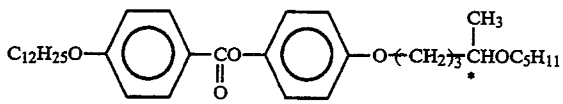
(77)
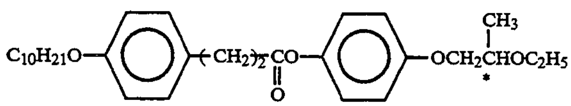
(78)
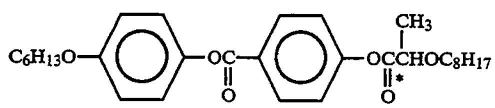
(79)
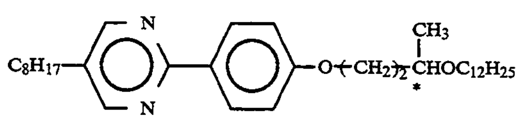
(80)
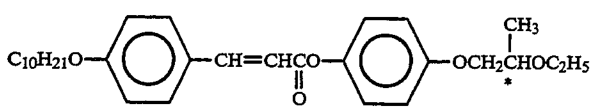
(81)
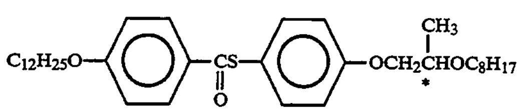
(82)
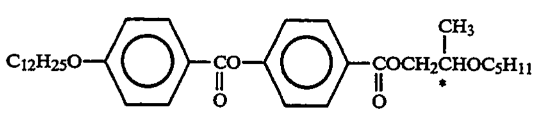
(83)
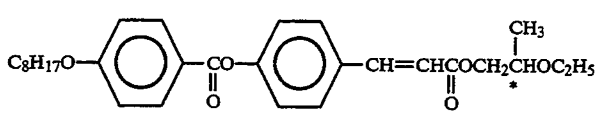
(84)
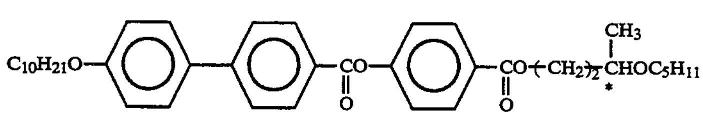
(85)
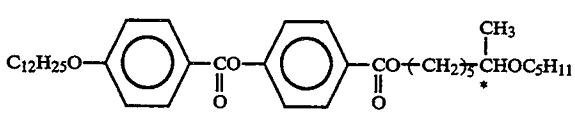

-continued
Example Compound No.
(86)
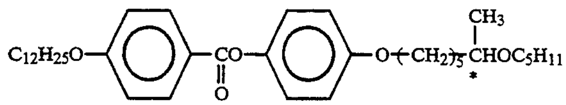
(87)
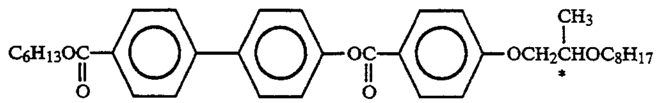
(88)
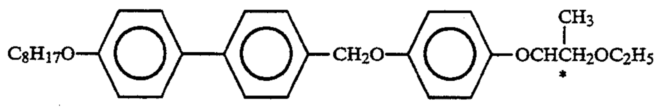
(89)
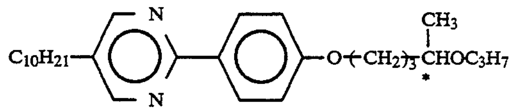
(90)
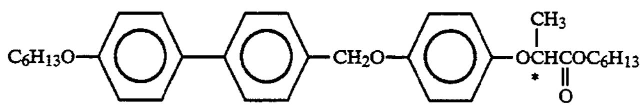
(91)
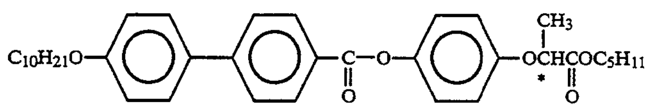
(92)
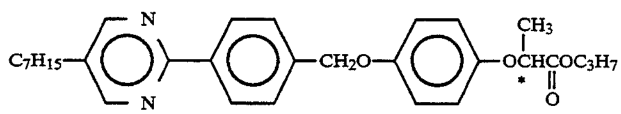
(93)
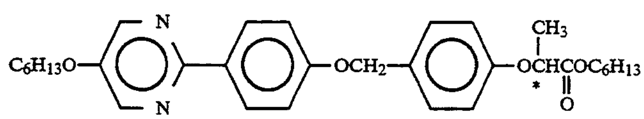
(94)
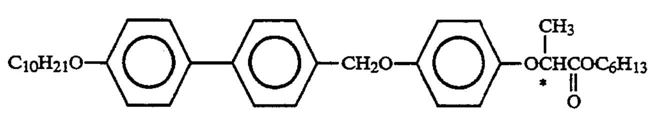
(95)
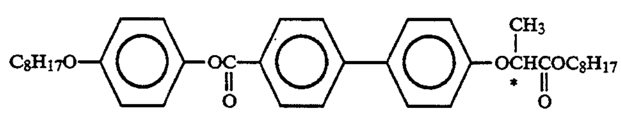
(96)
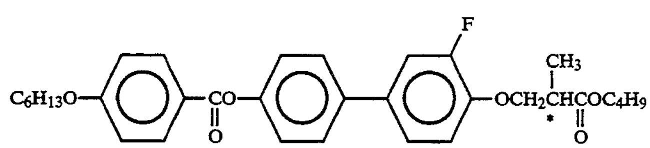
(97)
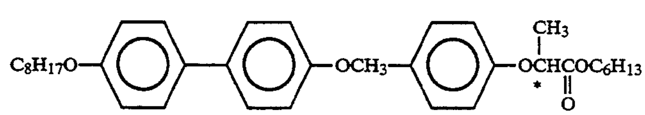
(98)
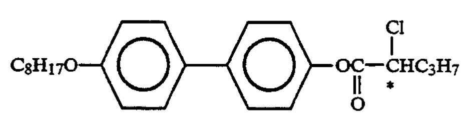

-continued
Example Compound No.
(99) 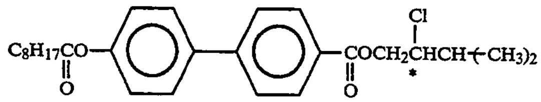
(100) 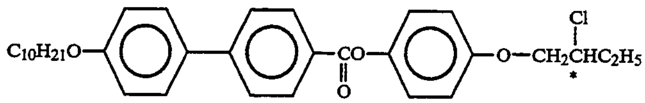
(101) 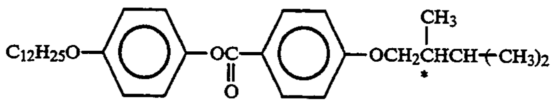
(102) 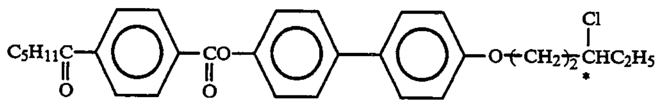
(103) 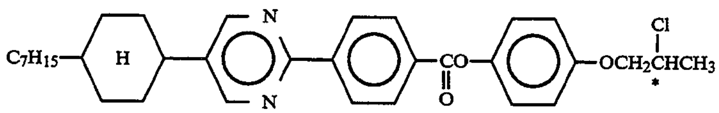
(104) 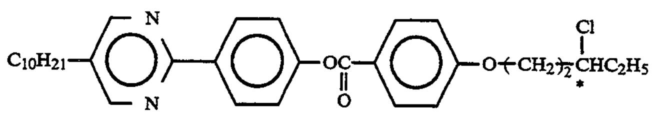
(105) 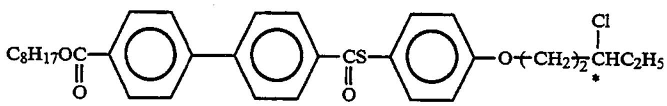
(106) 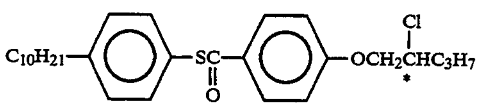
(107) 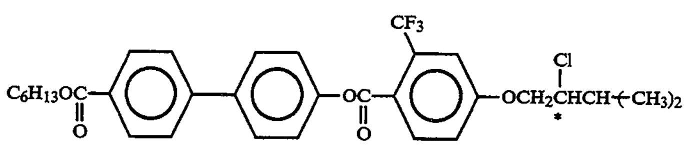
(108) 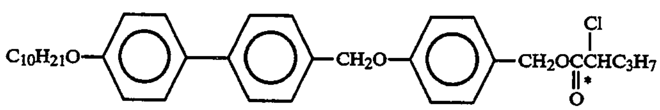
(109) 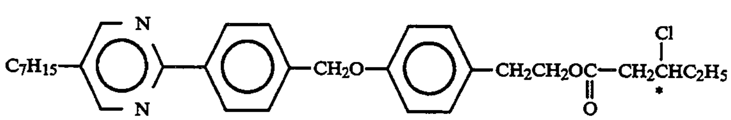
(110) 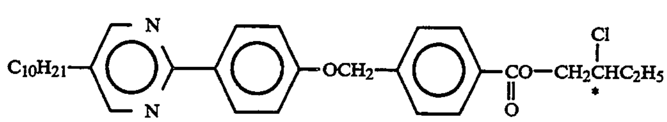
(111) 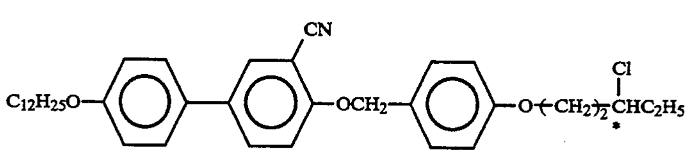

-continued
Example Compound No.
(112) 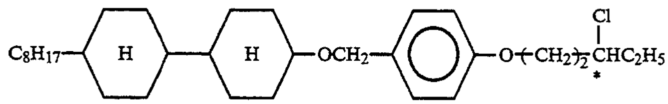
(113) 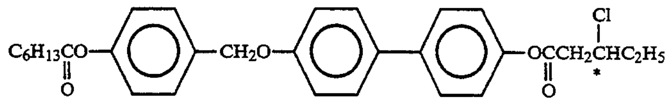
(114) 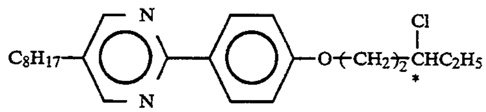
(115) 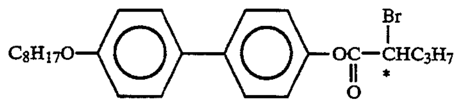
(116) 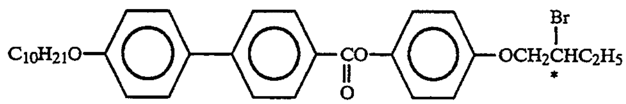
(117) 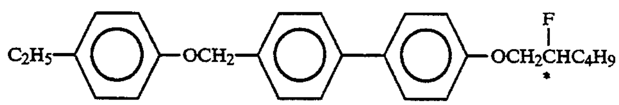
(118) 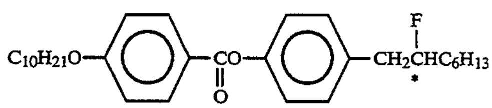
(119) 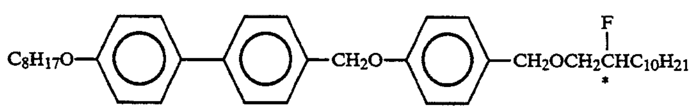
(120) 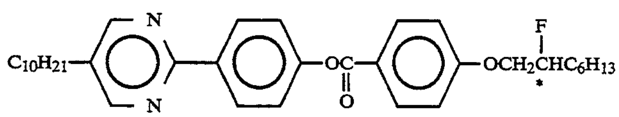
(121) 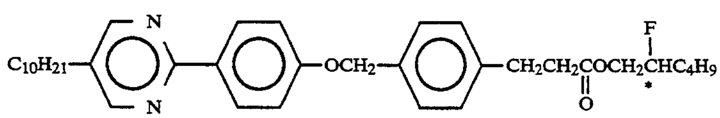
(122) 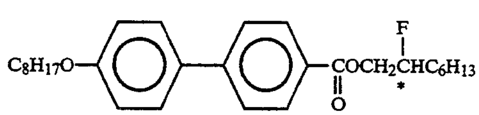
(123) 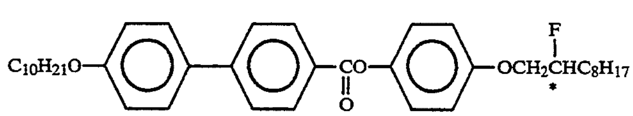
(124) 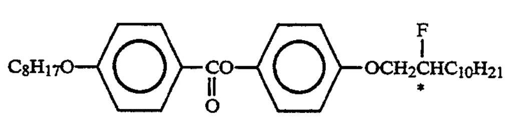

-continued
Example Compound No.
(125)
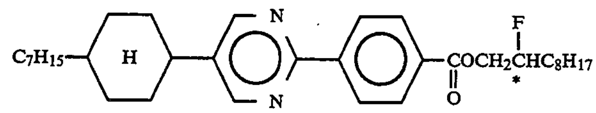
(126)
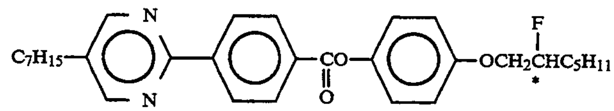
(127)
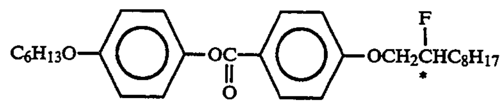
(128)
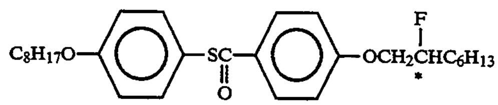
(129)
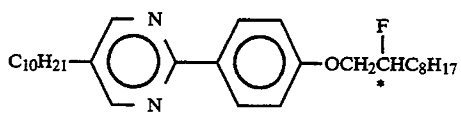
(130)
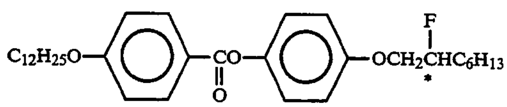
(131)
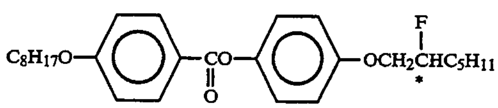
(132)
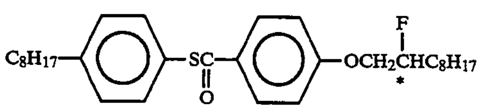
(133)
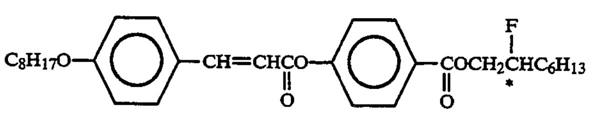
(134)
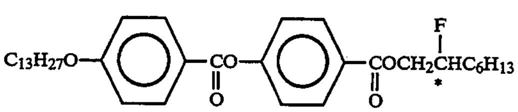
(135)
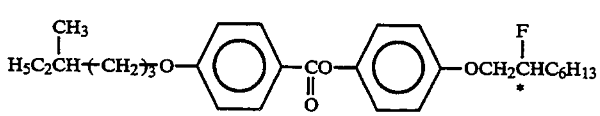
(136)
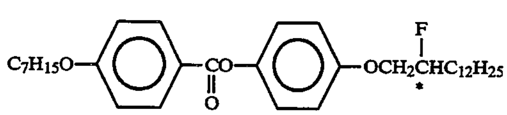
(137)
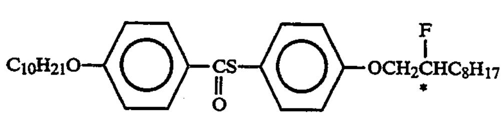

-continued
Example Compound No.
(138) 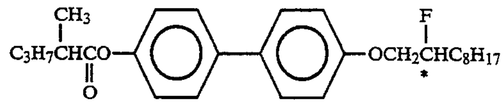
(139) 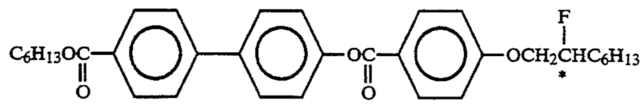
(140) 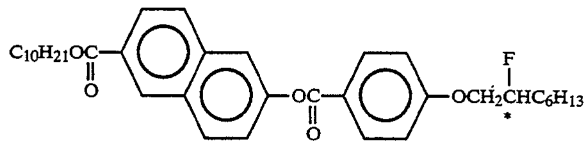
(141) 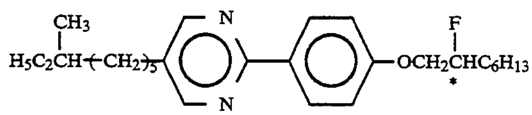
(142) 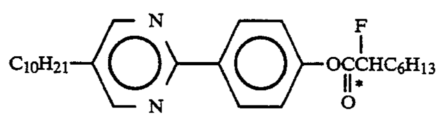
(143) 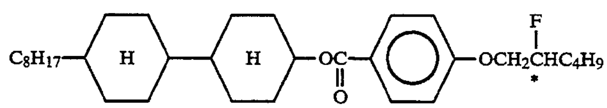
(144) 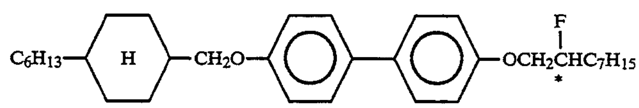
(145) 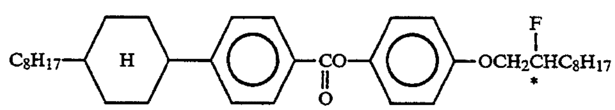
(146) 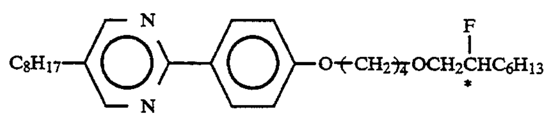
(147) 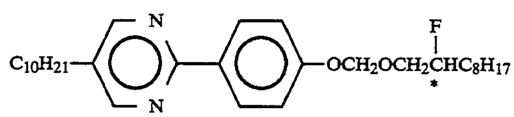
(148) 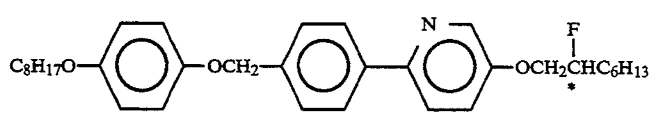
(149) 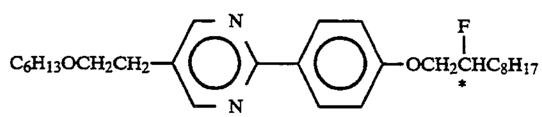
(150) 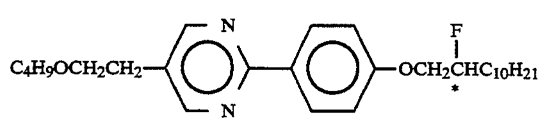

-continued
Example Compound No.
(151)
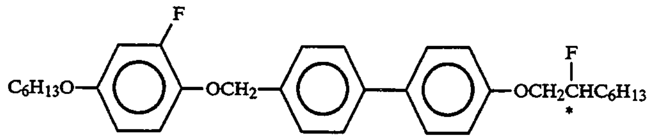
(152)
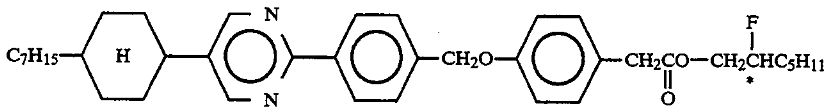
(153)
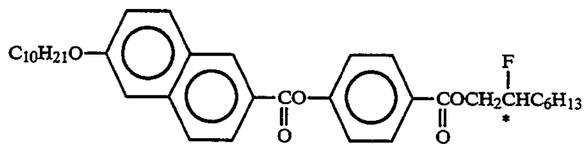
(154)
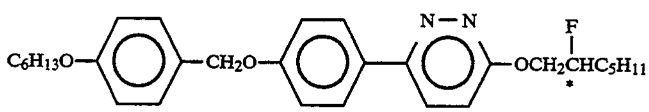
(155)
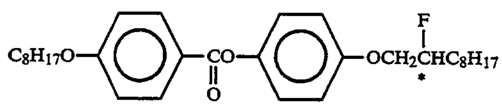
(156)
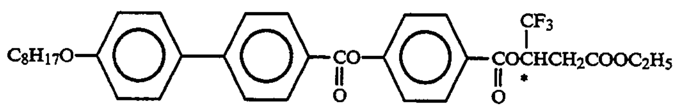
(157)
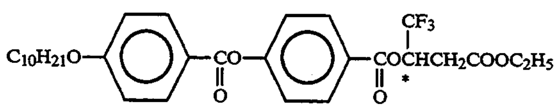
(158)
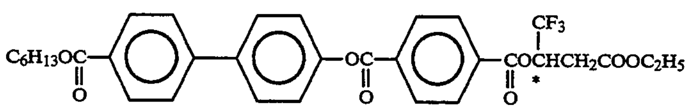
(159)
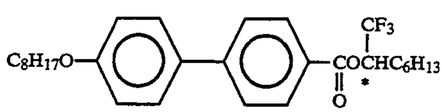
(160)
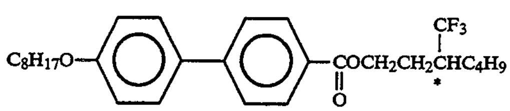
(161)
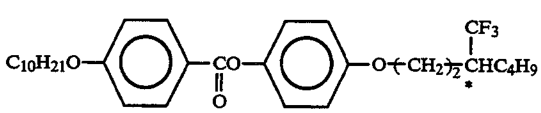
(162)
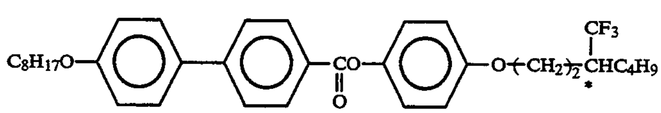
(163)
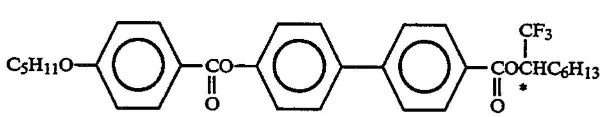

-continued
Example Compound No.
(164)
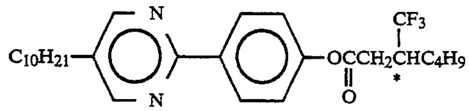
(165)
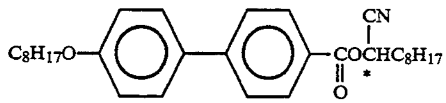
(166)
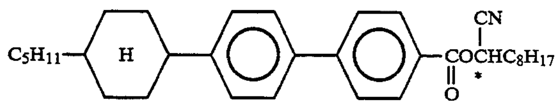
(167)
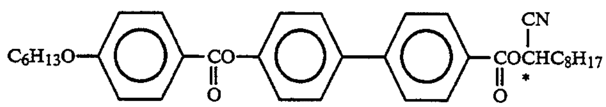
(168)
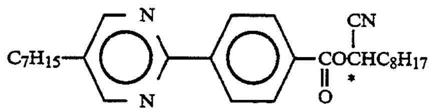
(169)
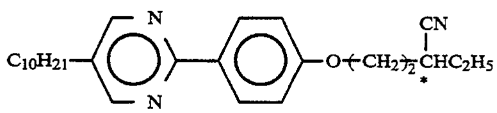
(170)
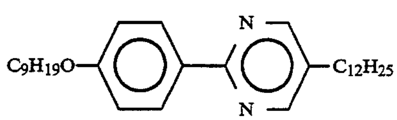
(171)
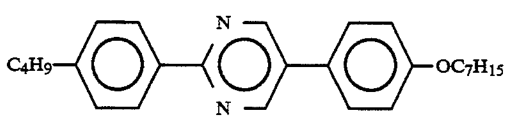
(172)
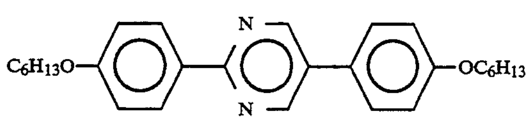
(173)
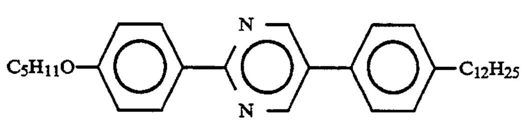
(174)
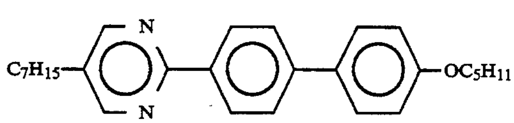
(175)
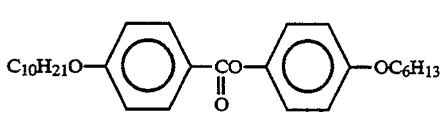
(176)
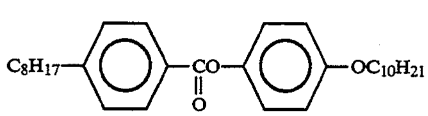

-continued

Example Compound No.

(177)

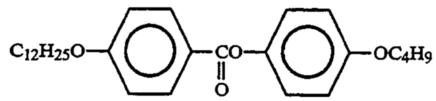

(178)

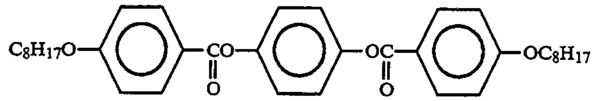

(179)

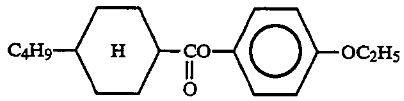

(180)

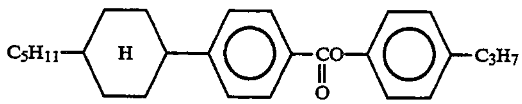

(181)

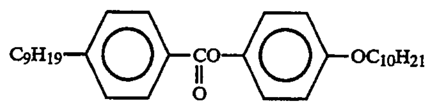

The instant mesomorphic compound may suitably mixed with a ferroelectric liquid crystal composition consisting or containing at least one ferroelectric mesomorphic compound as described above (hereinafter referred to as "FLC material") in a proportion of 1 to 500 wt. parts, preferably 10–100 wt. parts, with respect to 100 wt. parts of the latter. When two or more instant mesomorphic compounds are used, the above proportion is based on the total amount.

Among the instant mesomorphic compounds of the formula (1), those of the above-mentioned formula (2) provide a liquid crystal composition showing better performances.

Further, a mesomorphic compound of the formula (1) may suitably be combined with a mesomorphic compound of the formula (3) in a ratio of 100 wt. parts of the former with 1–300 wt. parts, preferably 2–200 wt. parts, of the latter. Further the mesomorphic compounds of the formulas (1) and (3) in combination may further be suitably mixed with another FLC material in a ratio of 1–500 wt. parts, preferably 10–100 wt. parts, of the former with 100 wt. parts of the latter.

Specific examples of the mesomorphic compounds represented by the above-mentioned general formula (3) are enumerated hereinbelow with their numbers and structural formulas wherein C* denotes an asymmetric carbon atom showing optical activity.

Example Compound No.

(3-1)

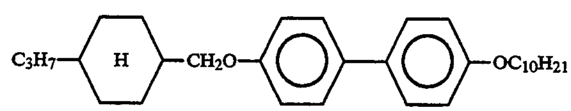

(3-2)

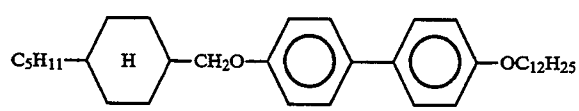

(3-3)

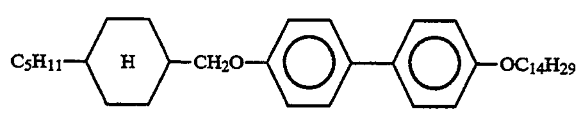

(3-4)

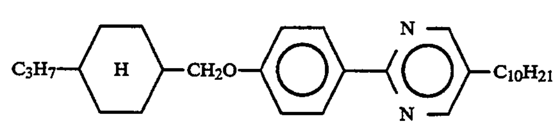

(3-5)

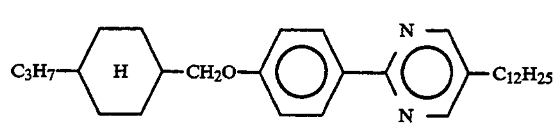

-continued
Example Compound No.
(3-6) 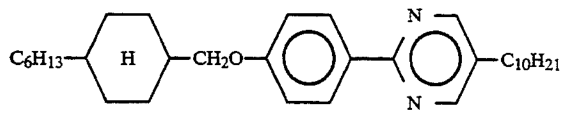
(3-7) 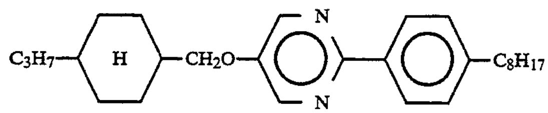
(3-8) 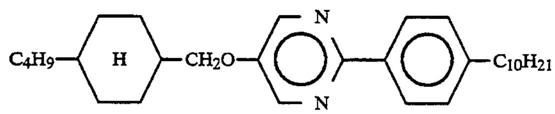
(3-9) 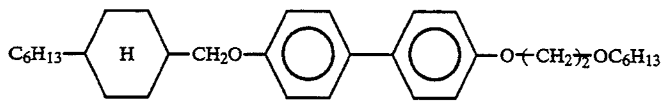
(3-10) 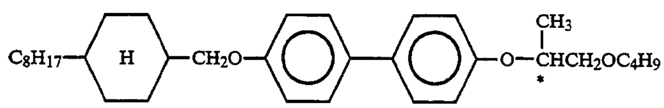
(3-11) 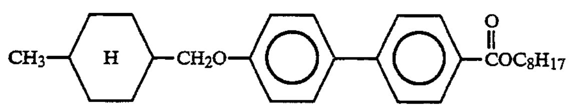
(3-12) 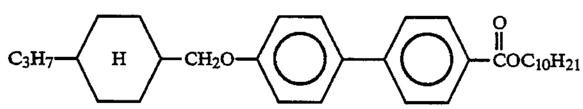
(3-13) 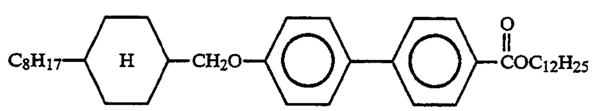
(3-14) 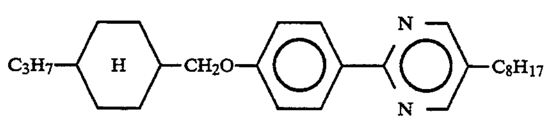
(1-15) 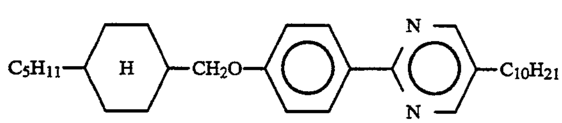
(3-16) 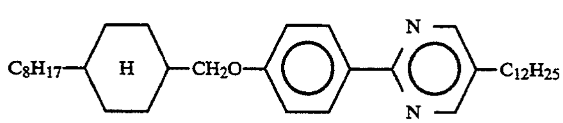
(3-17) 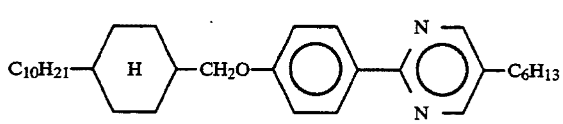
(3-18) 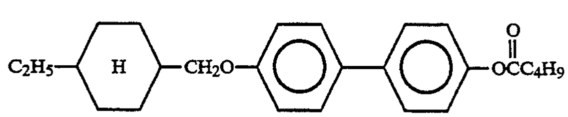

-continued
Example Compound No.
(3-19)
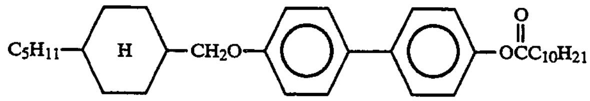
(3-20)
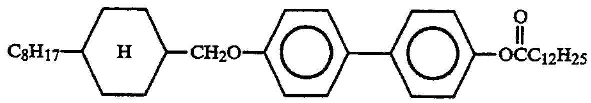
(3-21)
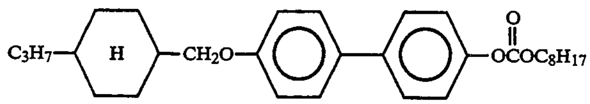
(3-22)
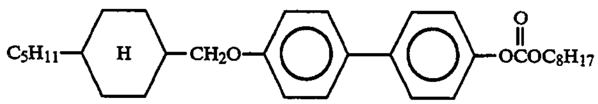
(3-23)
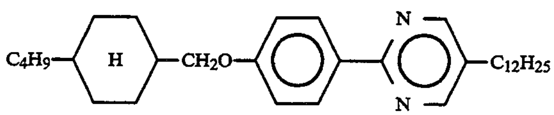
(3-24)
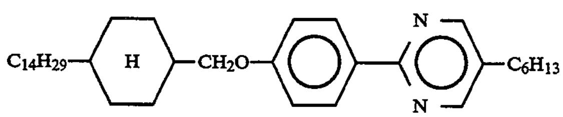
(3-25)
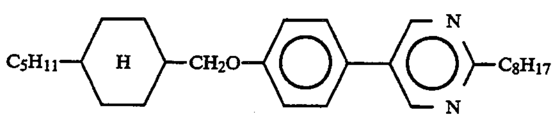
(3-26)
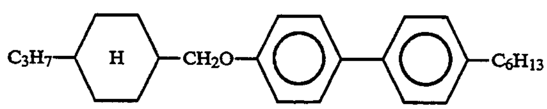
(3-27)
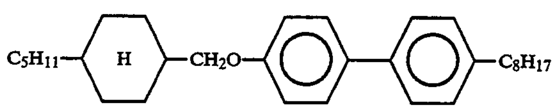
(3-28)
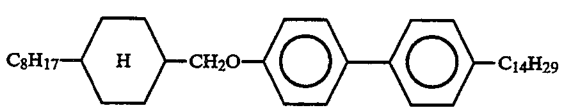
(3-29)
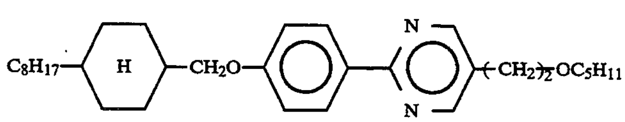
(3-30)
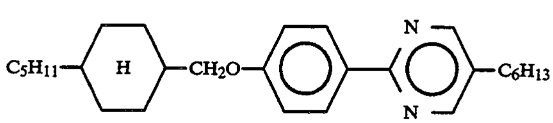
(3-31)
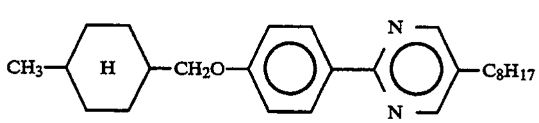

-continued
Example Compound No.
(3-32)
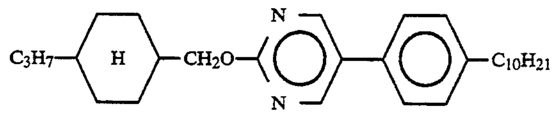
(3-33)
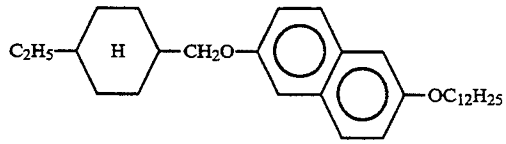
(3-34)
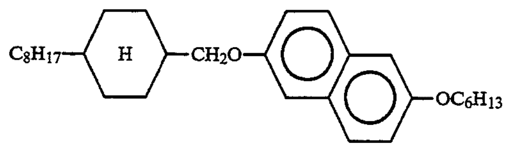
(3-35)
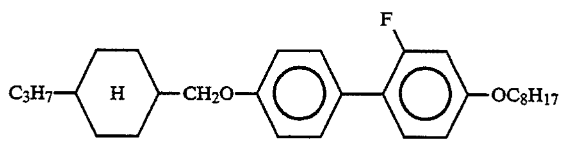
(3-36)
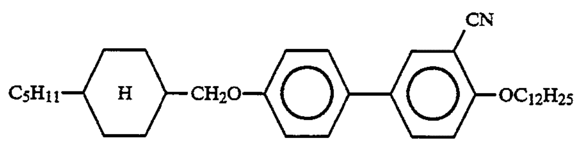
(3-37)
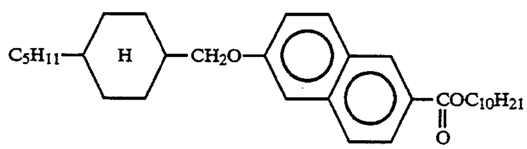
(3-38)
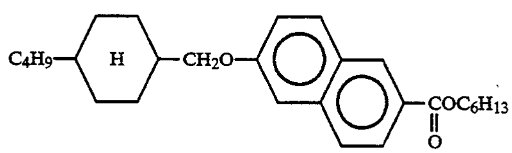
(3-39)
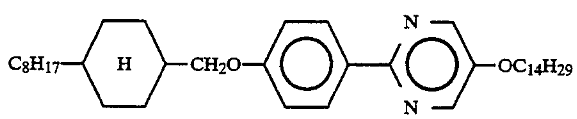
(3-40)
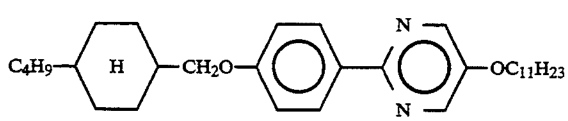
(3-41)
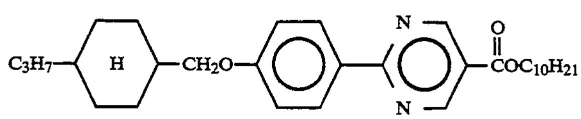
(3-42)
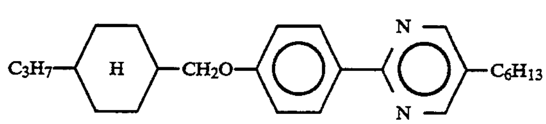

-continued
Example Compound No.
(3-43)
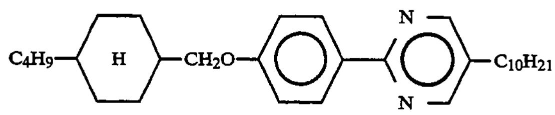
(3-44)
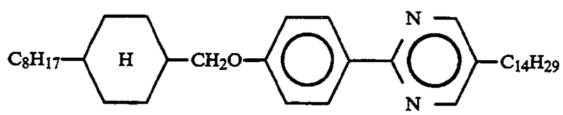
(3-45)
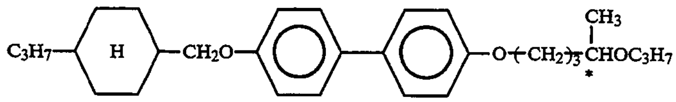
(3-46)
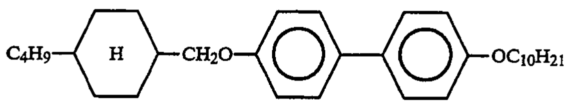
(3-47)
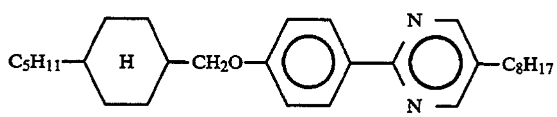
(3-48)
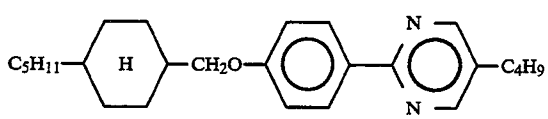
(3-49)
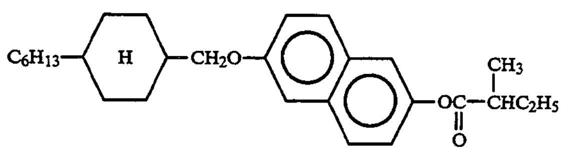
(3-50)
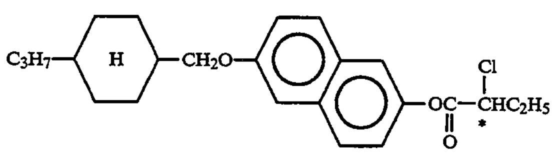
(3-51)
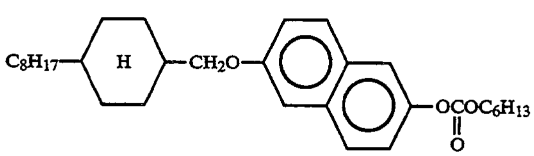
(3-52)
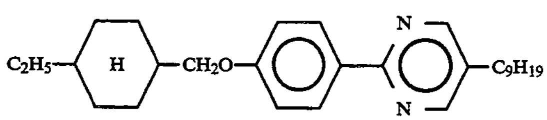
(3-53)
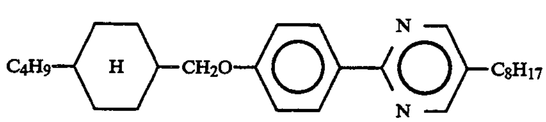
(3-54)
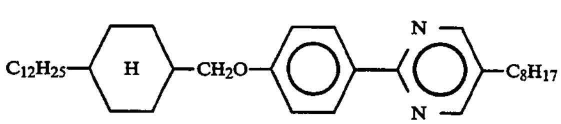

-continued

| Example Compound No. | |
|---|---|
| (3-55) | 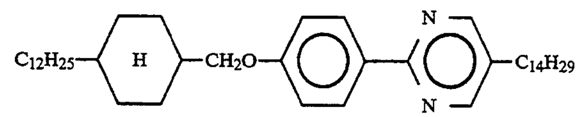 |
| (3-56) | 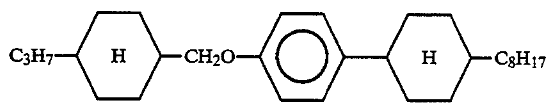 |
| (3-57) | 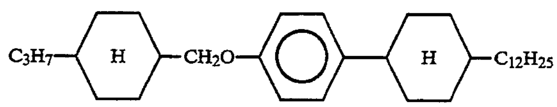 |

Some representative examples of synthesis of the mesomorphic-compound represented by the above formula (3) are described.

Synthesis Example 2

(Synthesis of the above-mentioned Example Compound No. 3-4, i.e., a case where

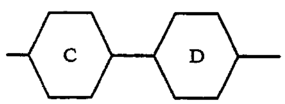 is

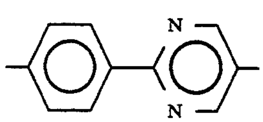

and $R_4$ is an alkyl)

(I) 10 g (53.6 mmol) of trans-4-n-propylcyclohexanecarboxylic acid chloride was dissolved in 30 ml of ethanol, and a small amount of triethylamine was added thereto, followed by 10 hours of stirring at room temperature. The reaction mixture was poured into 100 ml of riced water, acidified with addition of 6N-hydrochloric acid aqueous solution and then extracted with isopropyl ether. The organic layer was washed with water repeatedly until the washing liquid reached neutrality, and then dried with magnesium sulfate. After distilling off the solvent, the product was purified by silica gel column chromatography to obtain 9.9 g of trans-4-n-propylcyclohexanecarboxylic acid-ethyl-ester.

(II) 0.73 g (19.1 mmol) of aluminum lithium hydride was added to 30 ml of dry ether, and the mixture was heat-refluxed for 1 hour. The mixture was cooled to about 10° C. on an iced water bath, and a solution of 5 g (25.5 mmol) of trans-4-n-propylcyclohexanecarboxylic acid-ethyl-ester dissolved in 30 ml of dry ether was gradually added dropwise thereto. After the addition, the mixture was stirred for 1 hour at room temperature and further heat-refluxed for 1 hour. The reaction mixture was treated with ethyl acetate and 6N-hydrochloric acid aqueous solution and then poured into 200 ml of iced water.

After the extraction with isopropyl ether, the organic layer was successively washed with water, sodium hydroxide aqueous solution and water, followed by drying with magnesium sulfate. After distilling off the solvent, the product was purified by silica gel column chromatography to obtain 3.5 g of trans-4-n-propylcyclohexylmethanol.

(III) 3.4 g (22.4 mmol) of trans-4-n-propylcyclohexylmethanol was dissolved in 20 ml of pyridine, and 5.3 g of p-toluenesulfonyl chloride dissolved in 20 ml of pyridine was added thereto on an iced water bath for cooling below 5° C. The mixture was stirred for 10 hours at room temperature and then poured in 200 ml of iced water. The mixture was acidified with 6N-hydrochloric acid aqueous solution and extracted with isopropyl ether. The organic layer was washed with water repeatedly until the washing liquid reached neutralty and then dried with magnesium sulfate. Then, the solvent was removed by distillation to obtain trans-4-n-propylcyclohexylmethyl-p-toluenesulfonate.

(IV) 6.3 g (20.2 retool) of 5-decyl-2-(4'-hydroxyphenyl)pyrimidine was dissolved in 40 ml of dimethylformamide, and 1.5 g of 85%-potassium hydroxide was added thereto, followed by stirring for 1 hour at 100° C. To the mixture was added 6.9 g of trans-4-n-propylcyclohexylmethyl-p-toluenesulfonate, followed by 4 hours of stirring at 100° C. After the reaction, the reaction mixture was poured into 200 ml of iced water and extracted with benzene. The organic layer was washed with water and dried with magnesium sulfate. After distilling off the solvent, the product was purified by silica gel column chromatography and recrystallized from a mixture solvent of ethanol/ethyl acetate to obtain the above-mentioned Example Compound No. 3-4.

IR ($cm^{-1}$) 2920, 2840, 1608, 1584, 1438, 1258, 1164, 800.

Phase transition temperature (°C.)

$$\text{Cryst.} \underset{62.9}{\overset{82.0}{\rightleftarrows}} \text{Sm2} \underset{86.8}{\overset{91.3}{\rightleftarrows}} \text{SmC} \underset{97.8}{\overset{98.6}{\rightleftarrows}} \text{N} \underset{136.8}{\overset{137.6}{\rightleftarrows}} \text{Iso.}$$

(Sm2: a smectic phase other than SmA and SmC (un-identified))

Synthesis Example 3

(Synthesis of the above-mentioned Example Compound No. 3-12, i.e., a case where

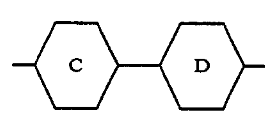 is

-continued

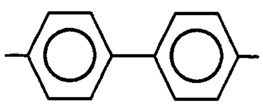

and $R_4$ is an alkoxycarbonyl group)

(I) 4.0 g (26.3 mmol) of trans-4-n-propylcyclohexylmethanol prepared in the same manner as in (I) and (II) of the above Synthesis Example 2 was dissolved in 25 ml of pyridine, and 6.0 g of p-toluenesulfonyl chloride dissolved in 25 ml of pyridine was added thereto on an iced water bath for cooling below 5° C. The mixture was stirred for 12 hours at room temperature and then poured in 200 ml of iced water. The mixture was acidified with 6N-hydrochloric acid aqueous solution and extracted with isopropyl ether. The organic layer was washed with water repeatedly until the washing liquid reached neutralty and then dried with magnesium sulfate. Then, the solvent was removed by distillation to obtain trans-4-n-propylcyclohexylmethyl-p-toluenesulfonate.

(II) 9.3 g (26.3 mmol) of 4-decyloxycarbonyl-4'-hydroxybiphenyl was dissolved in 70 ml of dimethylformamide, and 2.1 g of 85%-potassium hydroxide was added thereto, followed by stirring for 1.5 hours at 100° C. To the mixture was added 7.4 g of trans-4-n-propylcyclohexylmethyl-p-toluenesulfonate, followed by 5 hours of stirring at 100° C. After the reaction, the reaction mixture was poured into 200 ml of iced water and extracted with benzene. The organic layer was washed with water and dried with magnesium sulfate. After distilling off the solvent, the product was purified by silica gel column chromatography and recrystallized from a mixture solvent of ethanol/ethyl acetate to obtain the above-mentioned Example Compound No. 3-12.

IR ($cm^{-1}$) 2920, 2840, 1710, 1604, 1288, 1198, 1110, 830, 772

Phase transition temperature (°C.)

$$\text{Cryst.} \underset{28.9}{\overset{62.8}{\rightleftharpoons}} \text{Sm2} \underset{110.0}{\overset{111.4}{\rightleftharpoons}} \text{SmA} \underset{140.5}{\overset{142.4}{\rightleftharpoons}} \text{Iso.}$$

Hereinabove, some examples of synthesis of representative mesomorphic compounds have been explained. The other compounds represented by the general formula (3) may also be prepared by tosylating or halogenating a corresponding para-substituted cyclohexylmethanol and then reacting the product with a corresponding phenol. Principal reaction paths therefore may be represented by the following scheme:

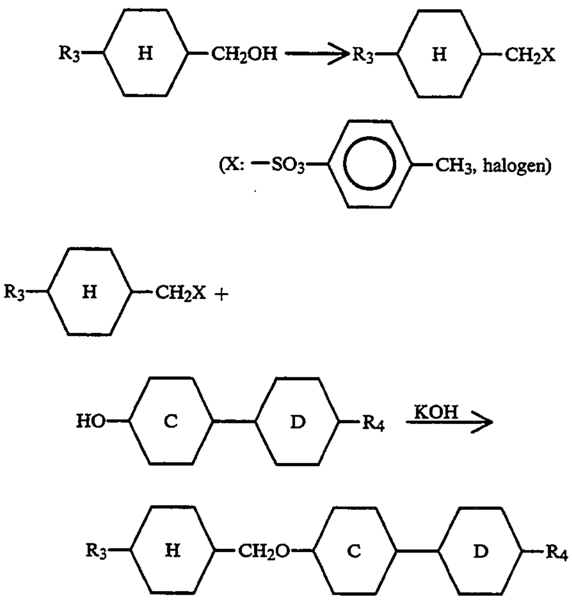

$R_3$, $R_4$,

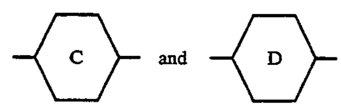

have the same meanings as defined above.

Further, a mesomorphic compound of the formula (1) may suitably be combined with a mesomorphic compound of the formula (5) in a ratio of 100 wt. parts of the former with 50–800 wt. parts, preferably 100–600 wt. parts, of the latter. Further, the mesomorphic compounds of the formulas (1) and (5) in combination may further be suitably mixed with another FLC material in a ratio of 1–500 wt. parts, prereferably 50–400 wt. parts, of the former with 100 wt. parts of the latter.

Specific examples of the mesomorphic compounds represented by the above-mentioned general formula (5) are enumerated hereinbelow with their numbers and structural formulas:

Example Compound No.

(5-1)

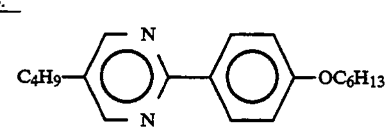

(5-2)

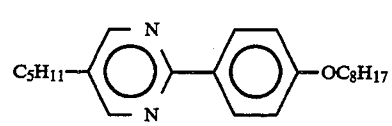

(5-3)

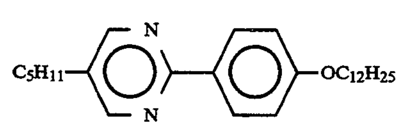

-continued
Example Compound No.
(5-4)
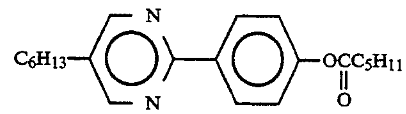
(5-5)
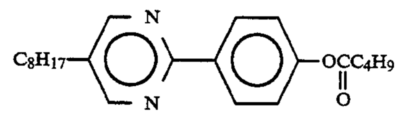
(5-6)
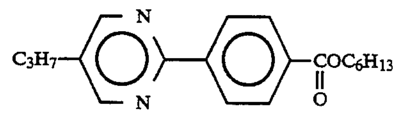
(5-7)
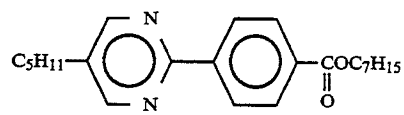
(5-8)
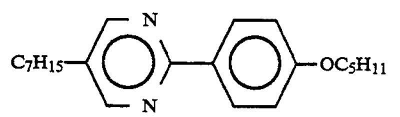
(5-9)
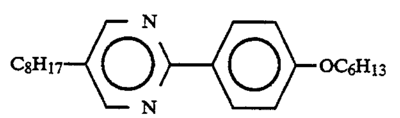
(5-10)
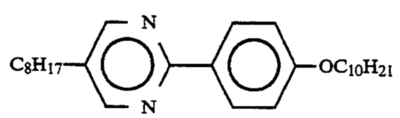
(5-11)
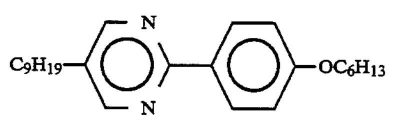
(5-12)
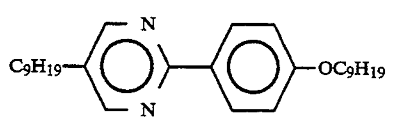
(5-13)
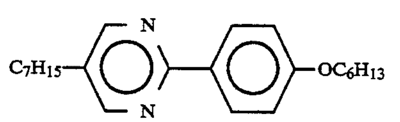
(5-14)
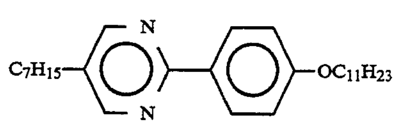
(5-15)
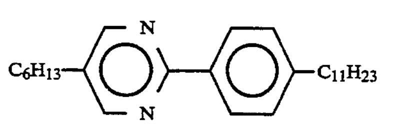
(5-16)
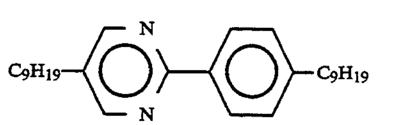

-continued
Example Compound No.
(5-17)
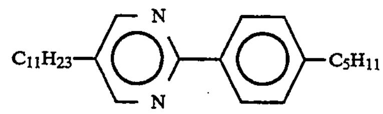
(5-18)
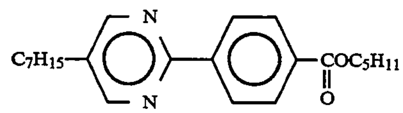
(5-19)
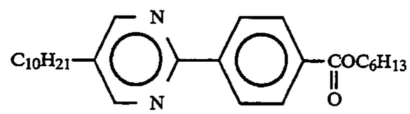
(5-20)
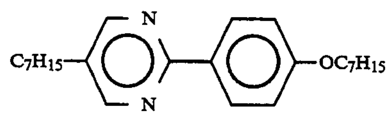
(5-21)
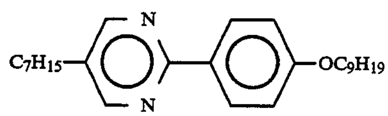
(5-22)
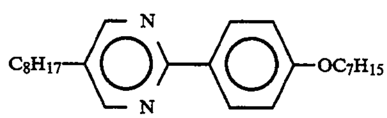
(5-23)
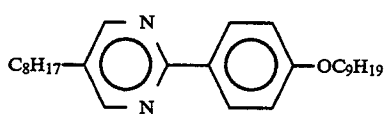
(5-24)
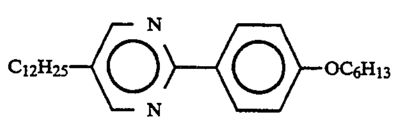
(5-25)
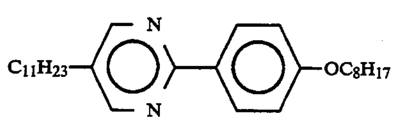
(5-26)
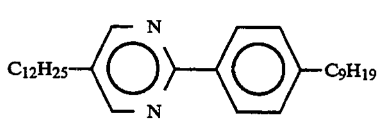
(5-27)
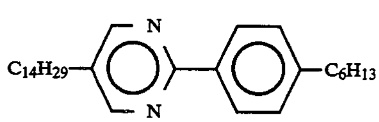
(5-28)
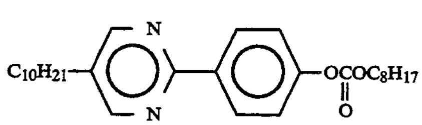
(5-29)
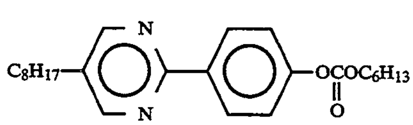

-continued
Example Compound No.
(5-30)
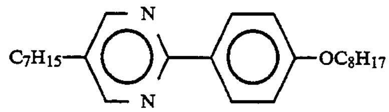
(5-31)
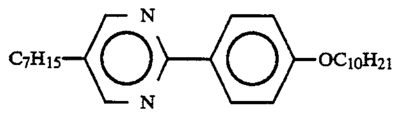
(5-32)
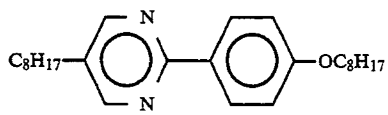
(5-33)
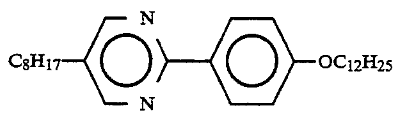
(5-34)
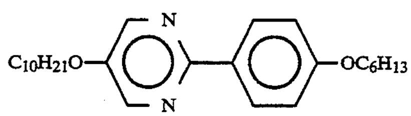
(5-35)
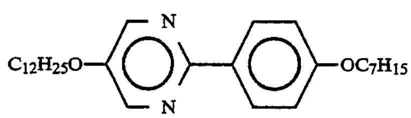
(5-36)
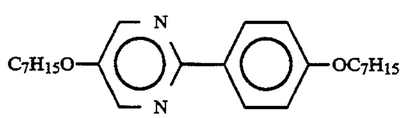
(5-37)
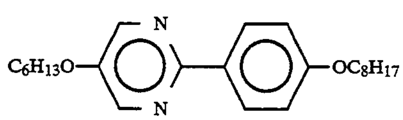
(5-38)
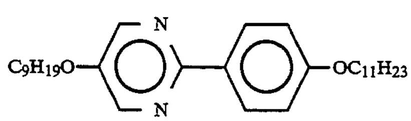
(5-39)
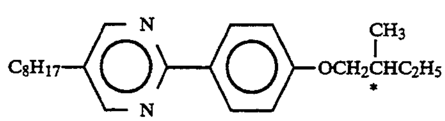
(5-40)
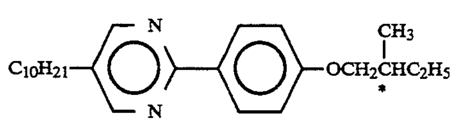
(5-41)
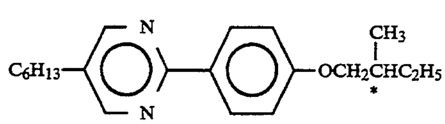
(5-42)
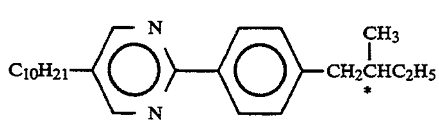

-continued
Example Compound No.
(5-43)
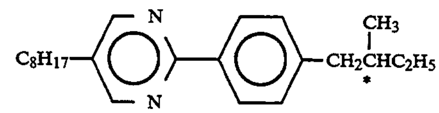
(5-44)
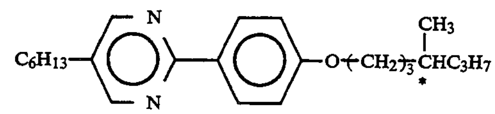
(5-45)
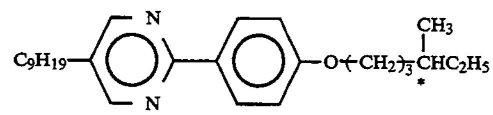
(5-46)
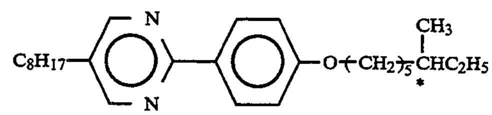
(5-47)
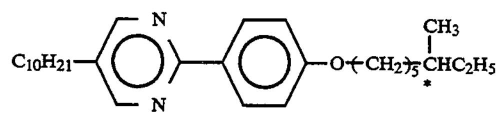
(5-48)
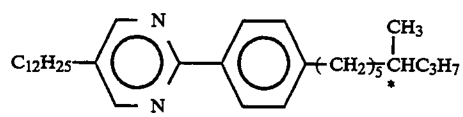
(5-49)
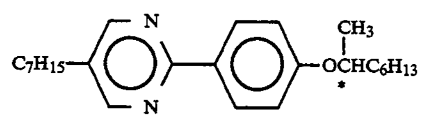
(5-50)
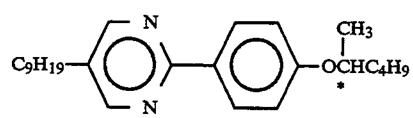
(5-51)
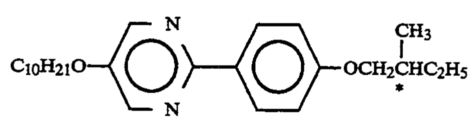
(5-52)
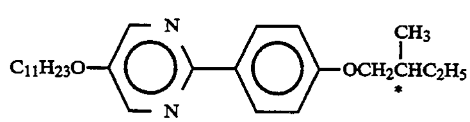
(5-53)
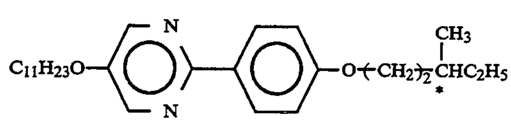
(5-54)
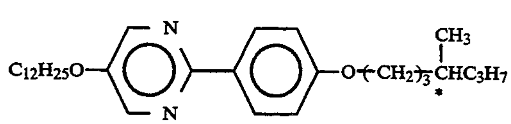
(5-55)
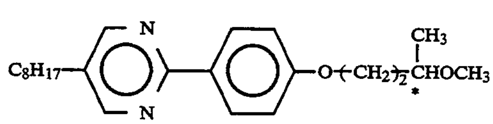

-continued
Example Compound No.
(5-56)
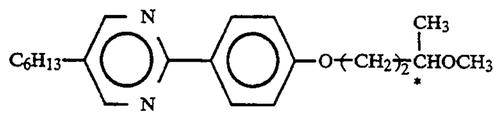
(5-57)
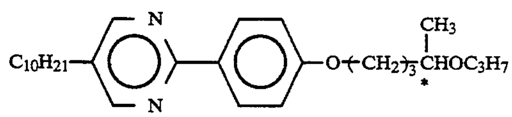
(5-58)
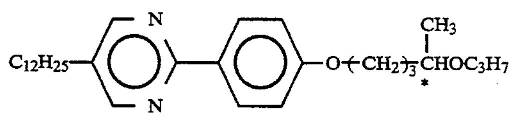
(5-59)
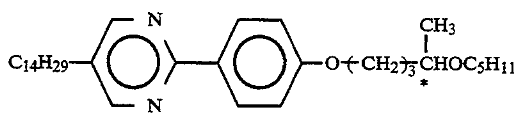
(5-60)
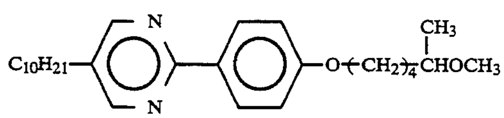
(racemate)
(5-61)
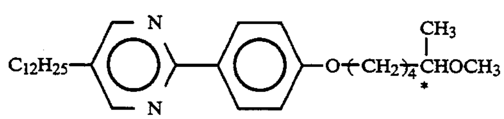
(5-62)
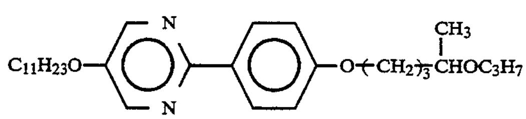
(racemate)
(5-63)
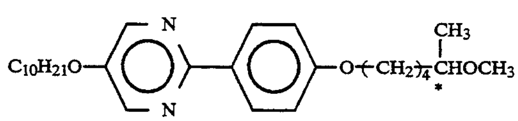
(5-64)
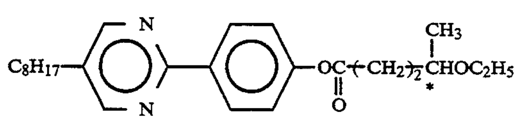
(5-65)
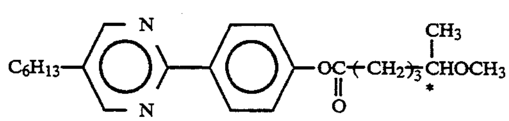
(5-66)
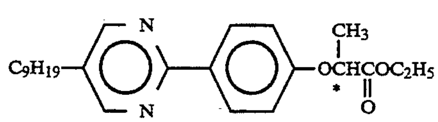
(5-67)
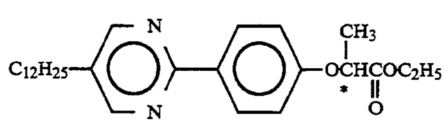
(5-68)
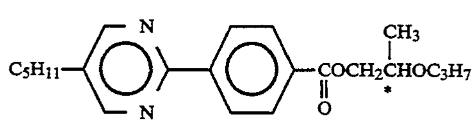

-continued
Example Compound No.
(5-69)
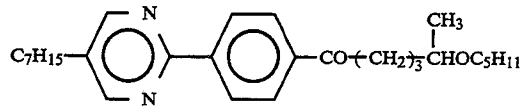
(racemate)
(5-70)
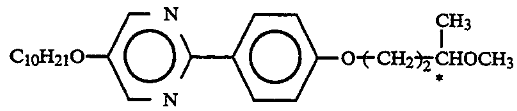
(5-71)
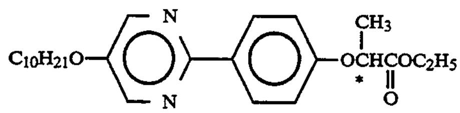
(5-72)
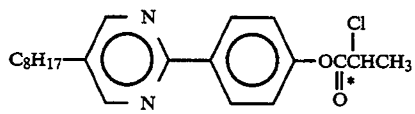
(5-73)
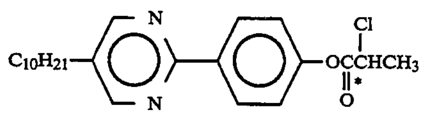
(5-74)
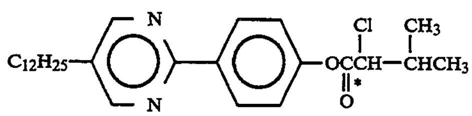
(5-75)
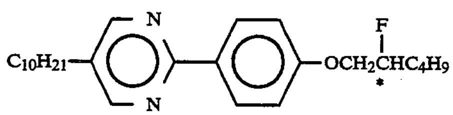
(5-76)
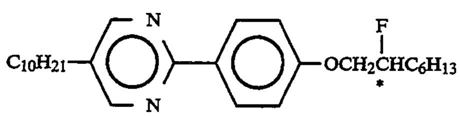
(5-77)
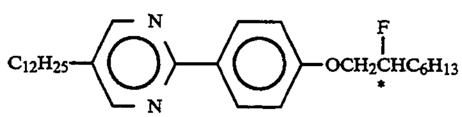
(5-78)
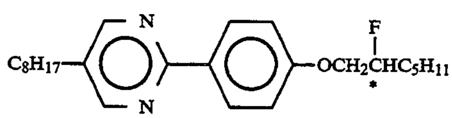
(5-79)
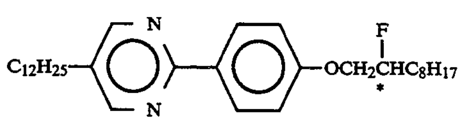
(5-80)
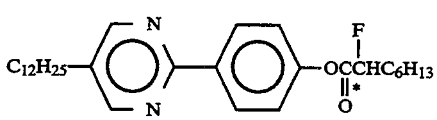
(5-81)
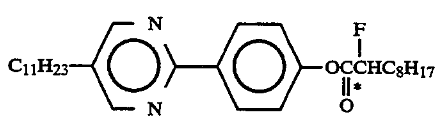

-continued
Example Compound No.
(5-82) 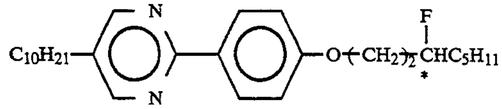
(5-83) 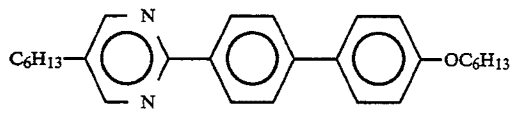
(5-84) 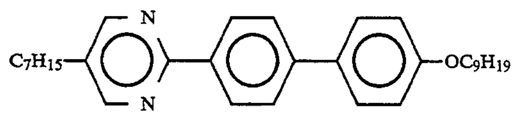
(5-85) 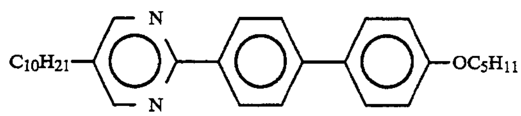
(5-86) 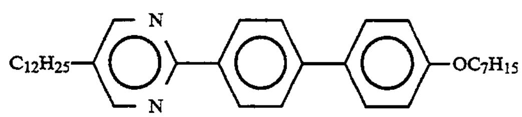
(5-87) 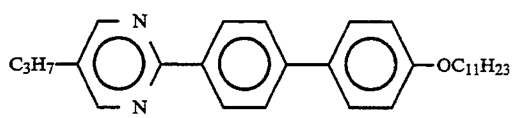
(5-88) 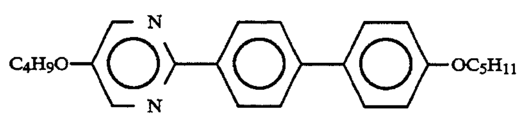
(5-89) 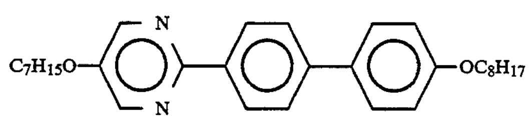
(5-90) 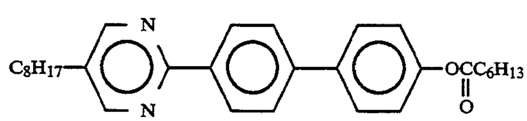
(5-91) 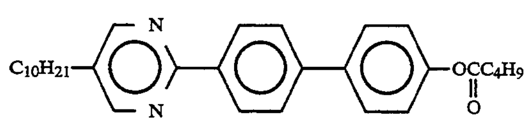
(5-92) 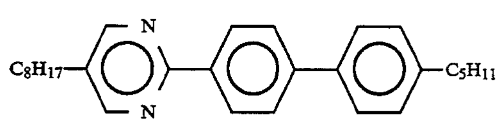
(5-93) 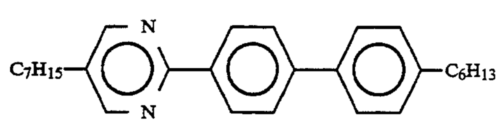
(5-94) 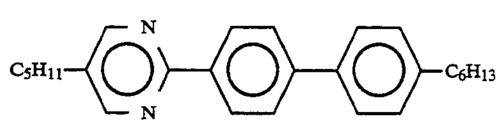

-continued
Example Compound No.
(5-95) 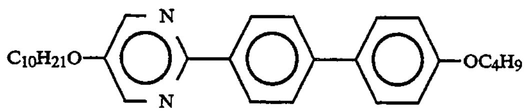
(5-96) 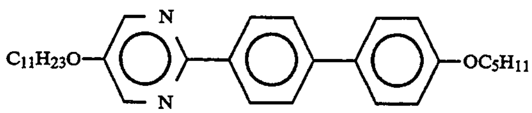
(5-97) 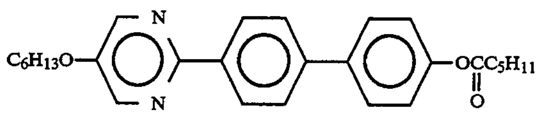
(5-98) 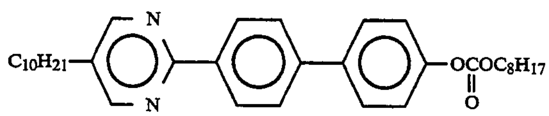
(5-99) 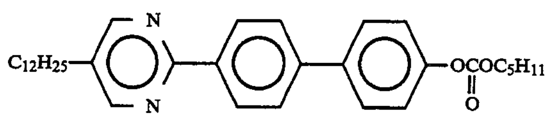
(5-100) 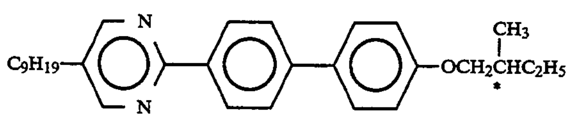
(5-101) 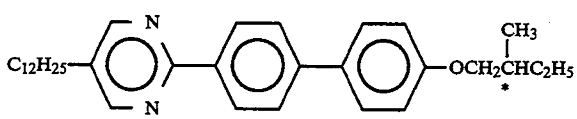
(5-102) 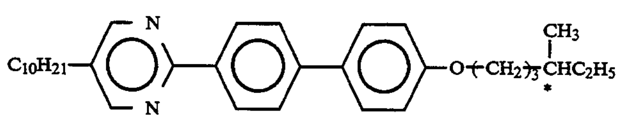
(5-103) 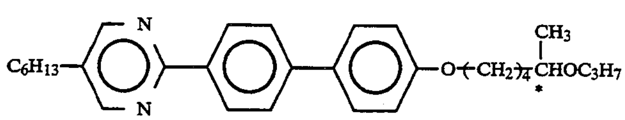
(5-104) 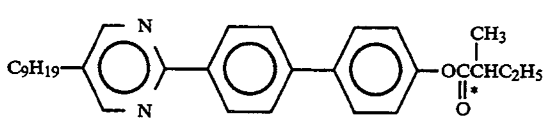
(5-105) 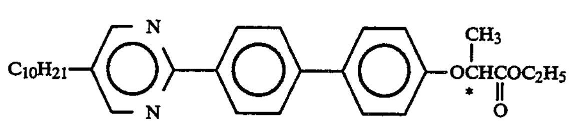
(5-106) 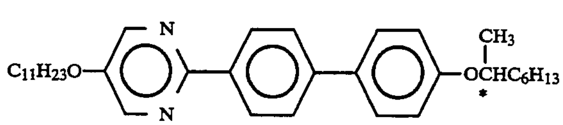
(5-107) 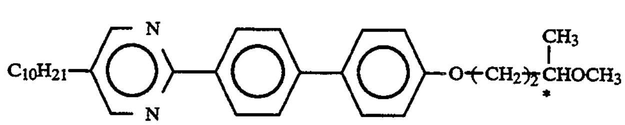

-continued
Example Compound No.
(5-108) 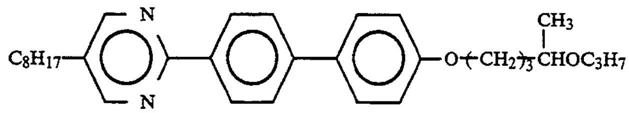 (racemate)
(5-109) 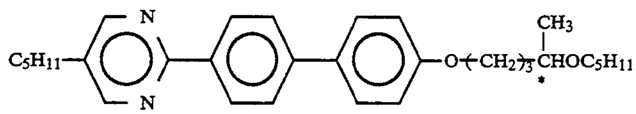
(5-110) 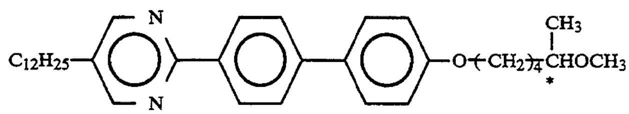
(5-111) 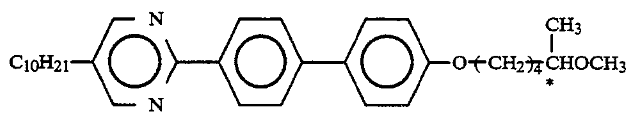 (racemate)
(5-112) 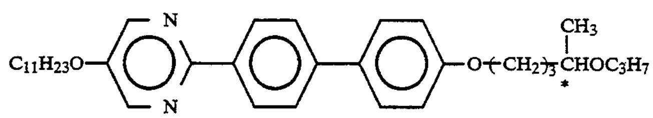
(5-113) 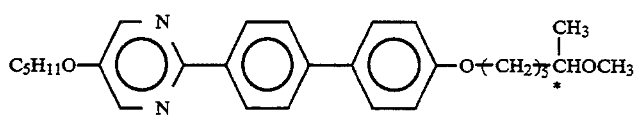
(5-114) 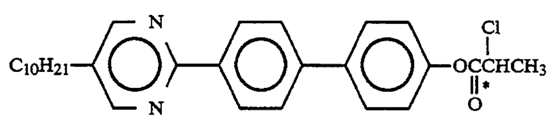
(5-115) 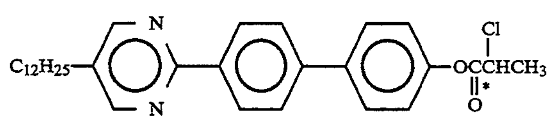
(5-116) 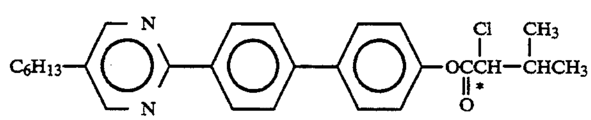
(5-117) 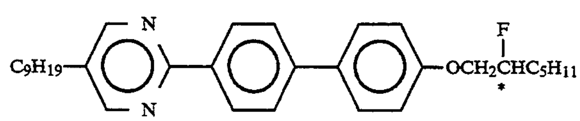
(5-118) 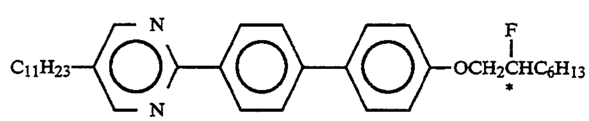
(5-119) 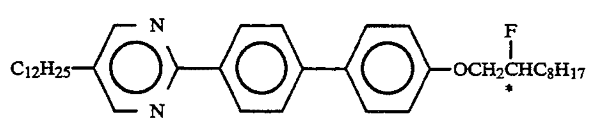
(5-120) 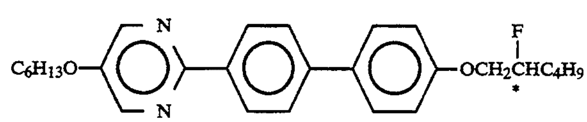

-continued
Example Compound No.
(5-121)
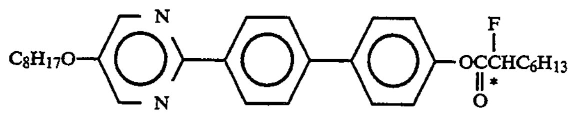
(5-122)
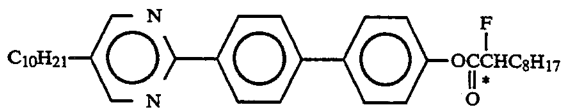
(5-123)
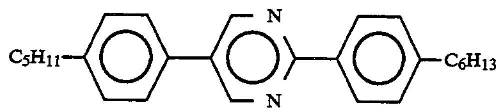
(5-124)
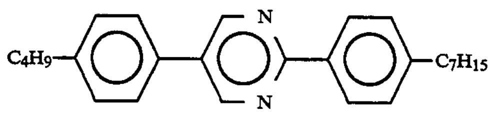
(5-125)
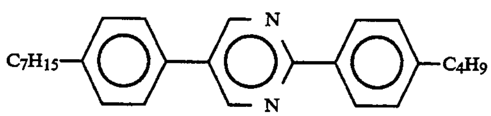
(5-126)
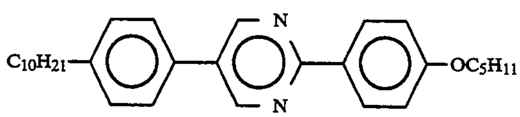
(5-127)
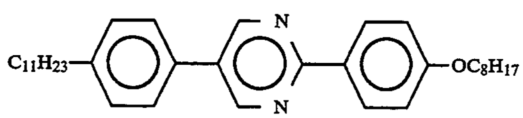
(5-128)
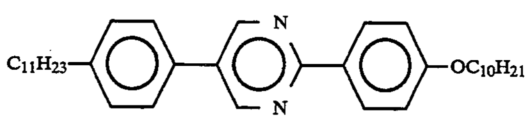
(5-129)
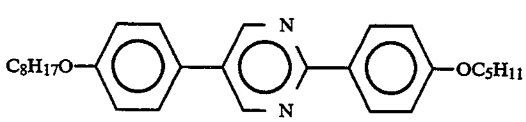
(5-130)
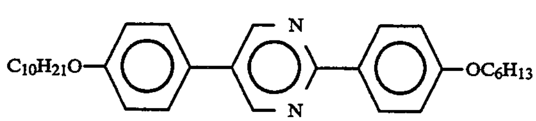
(5-131)
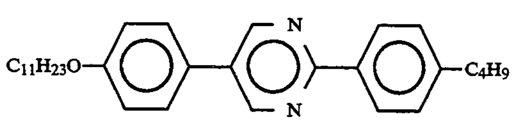
(5-132)
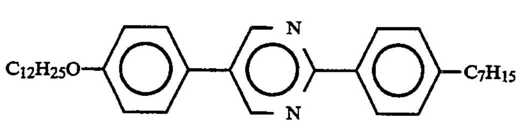
(5-133)
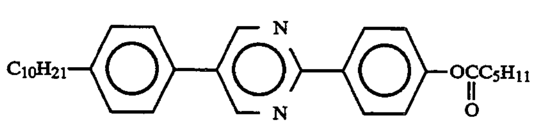

-continued
Example Compound No.
(5-134) 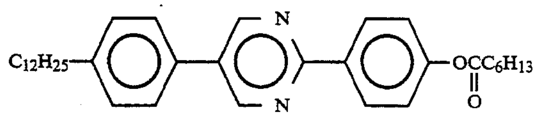
(5-135) 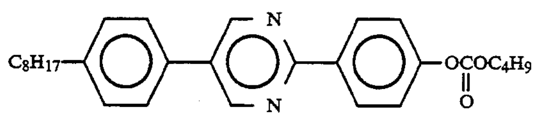
(5-136) 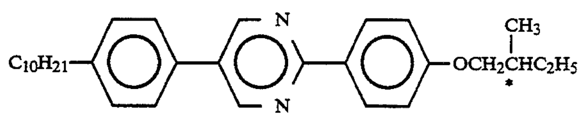
(5-137) 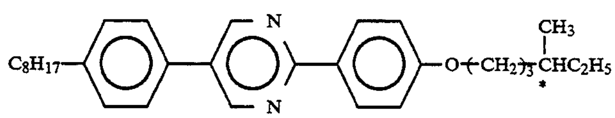
(5-138) 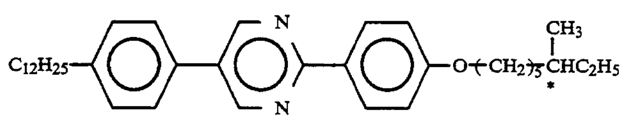
(5-139) 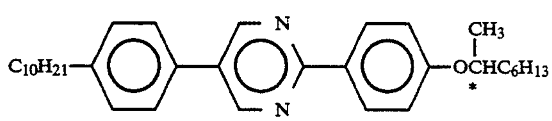
(5-140) 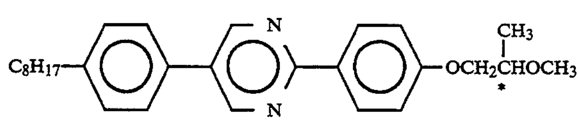
(5-141) 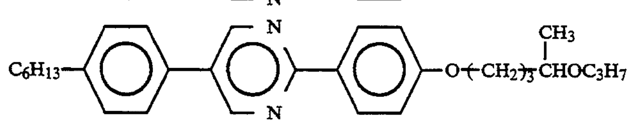 (racemate)
(5-142) 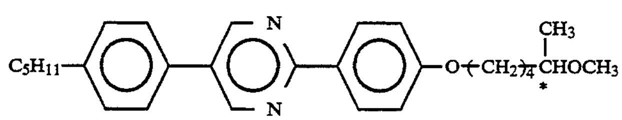
(5-143) 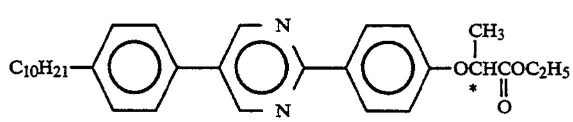
(5-144) 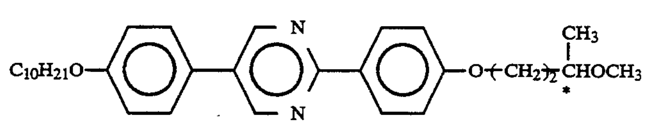
(5-145) 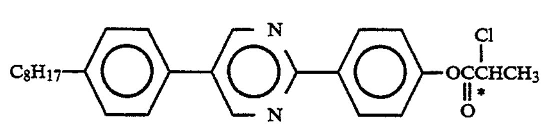
(5-146) 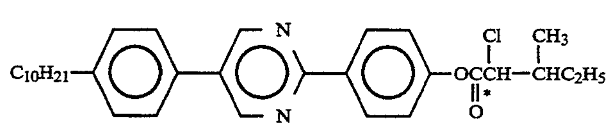

-continued
Example Compound No.
(5-147)
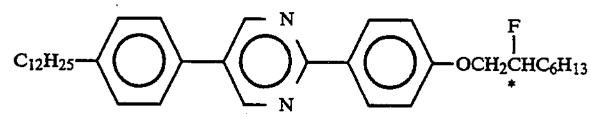
(5-148)
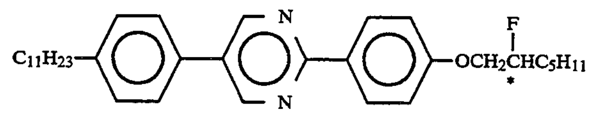
(5-149)
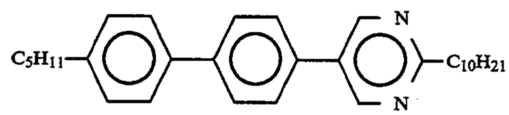
(5-150)
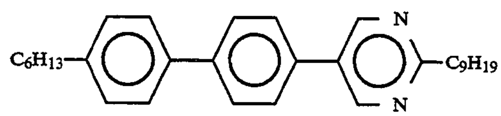
(5-151)
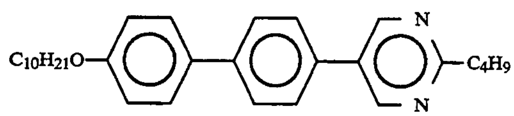
(5-152)
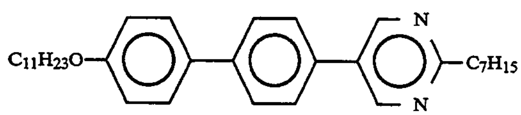
Among the mesomorphic compounds represented by the general formula (5), those also represented by the following formula, for example, may be synthesized along the reaction scheme shown below.
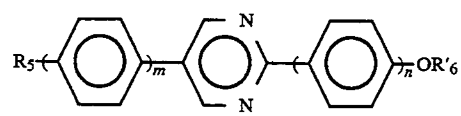
wherein $R'_6$ denotes an alkyl group having 1–16 carbon atoms and capable of having a substituent.
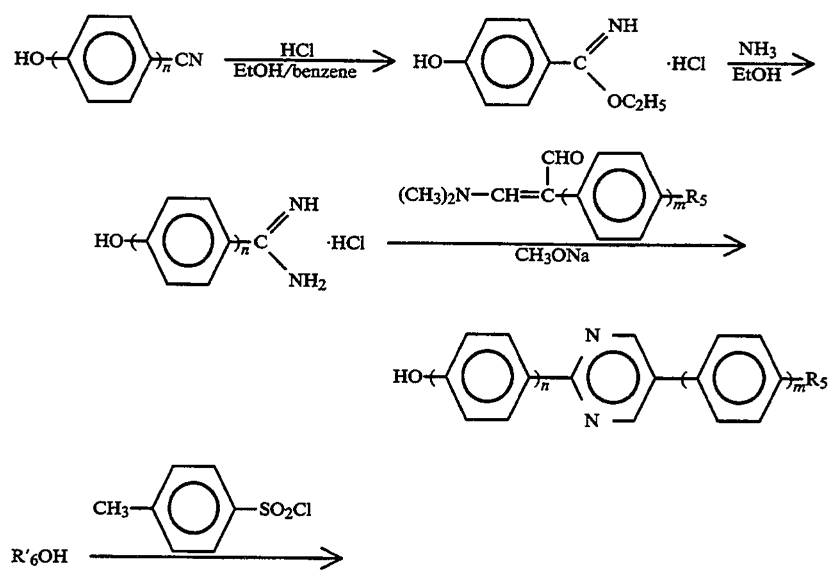

-continued

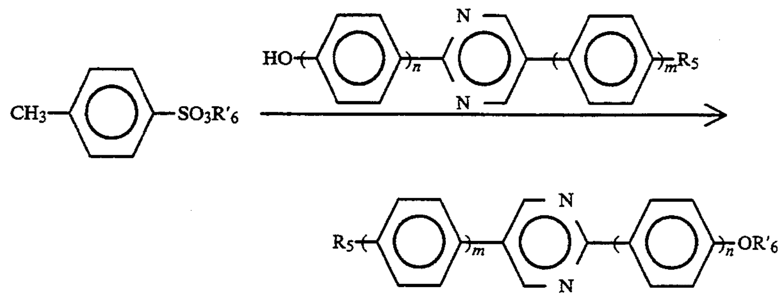

$R_5$, m and n have the same meanings as defined hereinabove.

The liquid crystal composition comprising a mesomorphic compound represented by the formula (1) and a mesomorphic compound represented by the formula (5) may show a further improved performance where it comprises a combination of a mesomorphic compound of the formula (2) below and a mesomorphic compound of the formula (6), or further a mesomorphic compound of the formula (7) below:

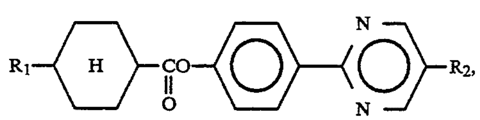

(2)

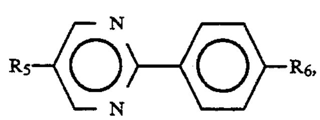

(6)

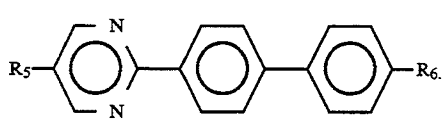

(7)

On the other hand, the present invention further provides a ferroelectric liquid crystal composition comprising at least one mesomorphic compound having a pyrazine ring and at least one mesomorphic compound having a pyrimidine ring. By using the ferroelectric liquid crystal composition, there is provided a ferroelectric liquid crystal device which shows excellent responsive characteristics inclusive of high speed responsiveness, low-temperature operation characteristic and temperature-dependency of the response speed; and shows excellent threshold characteristics with respect to electric field response, thus giving a good contrast while preventing crosstalk.

The mesomorphic compounds having a phenylpyrazine skeleton may preferably be those represented by the following formula (I):

$$R_7-X_1-y_1-X_2-Z_1-X_3-R_8 \qquad (I),$$

wherein $R_7$ and $R_8$ respectively denote an alkyl group having 1–18 carbon atoms and capable of having a substituent, at least one of $R_7$ and $R_8$ being capable of having an asymmetric carbon atom; $X_1$ and $X_3$ respectively denote a single bond, —O—, $$-\underset{\underset{O}{\|}}{C}O-,\quad -O\underset{\underset{O}{\|}}{C}-\quad \text{or} \quad -O\underset{\underset{O}{\|}}{C}O-;$$

$X_2$ denotes a single bond, $$-\underset{\underset{O}{\|}}{C}O-\quad \text{or} \quad -O\underset{\underset{O}{\|}}{C}-;$$

$Y_1$ denotes a divalent group including a pyrazine ring; and $Z_1$ denotes a single bond,

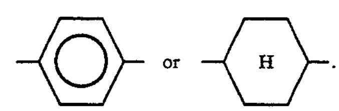

Specific examples of the mesomorphic compounds having a phenylpyrazine ring skeleton are enumerated hereinbelow with their numbers and structural formulas:

Example Compound No.

(I-1)

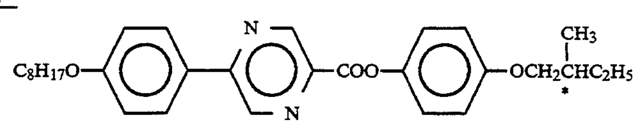

(I-2)

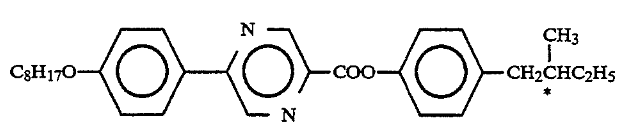

(I-3)

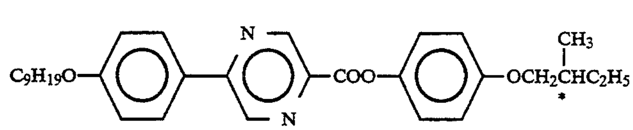

-continued
Example Compound No.
(I-4)
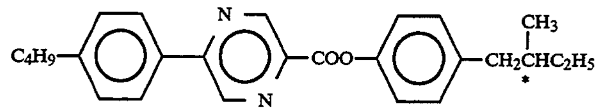
(I-5)
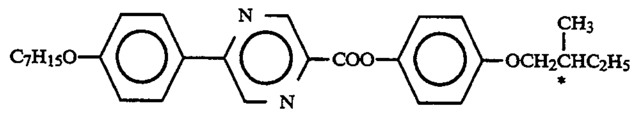
(I-6)
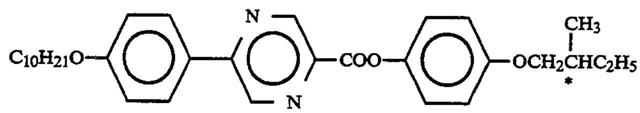
(I-7)
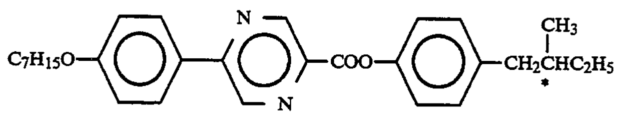
(I-8)
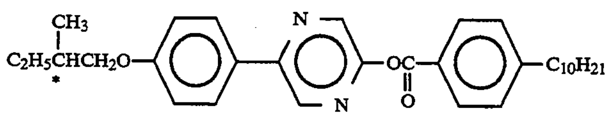
(I-9)
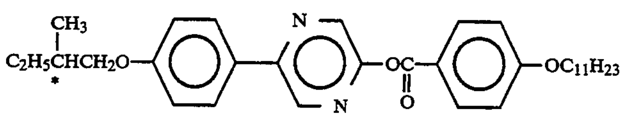
(I-10)
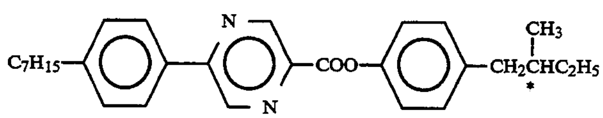
(I-11)
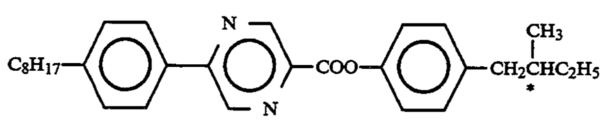
(I-12)
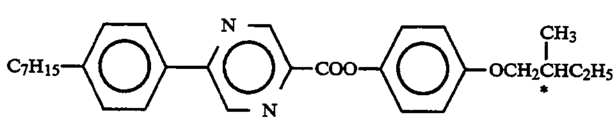
(I-13)
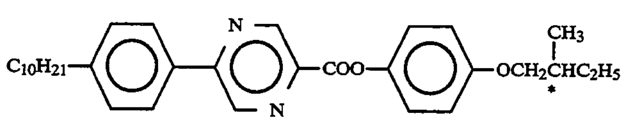
(I-14)
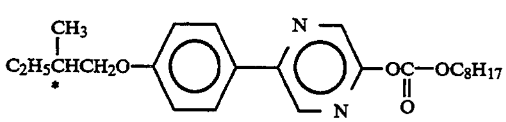
(I-15)
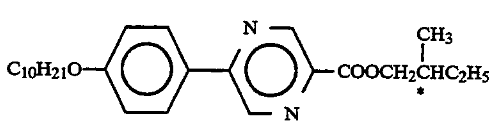
(I-16)
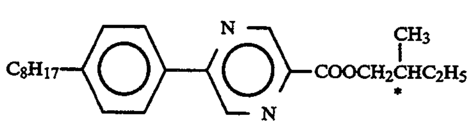

-continued
Example Compound No.
(I-17) 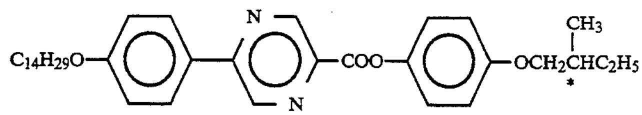
(I-18) 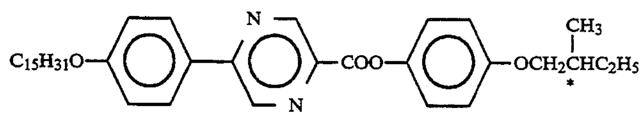
(I-19) 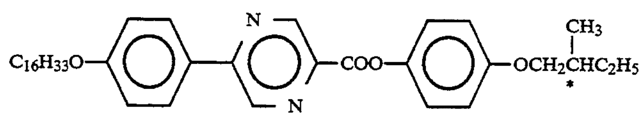
(I-20) 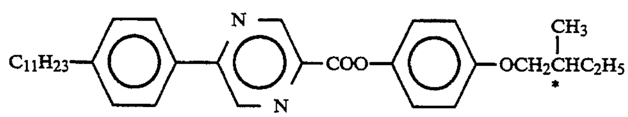
(I-21) 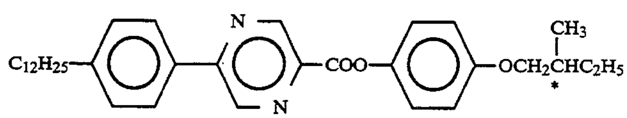
(I-22) 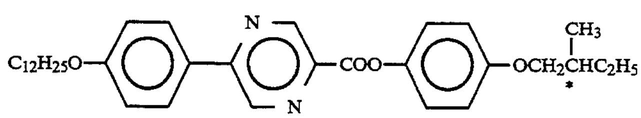
(I-23) 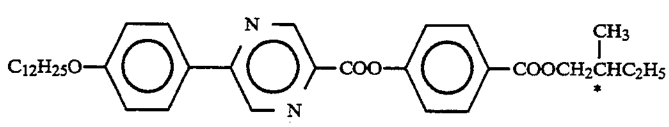
(I-24) 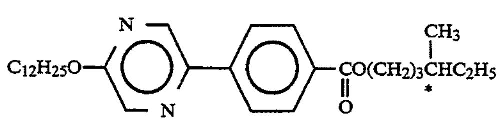
(I-25) 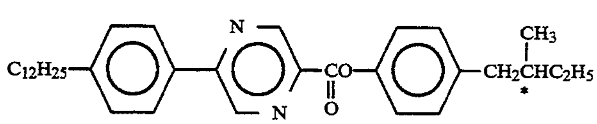
(I-26) 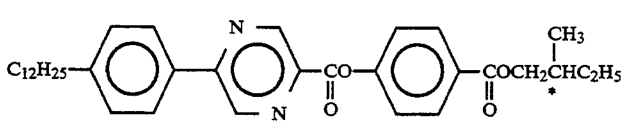
(I-27) 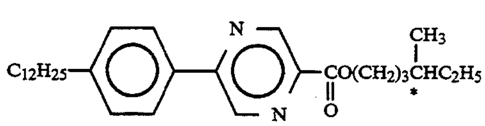
(I-28) 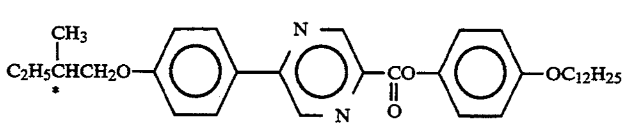
(I-29) 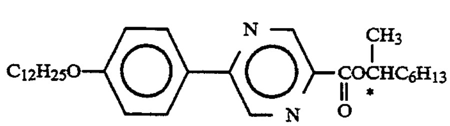

-continued
Example Compound No.
(I-30)
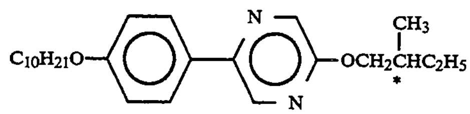
(I-31)
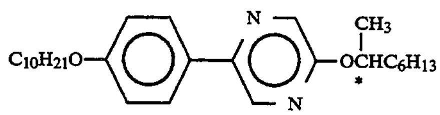
(I-32)
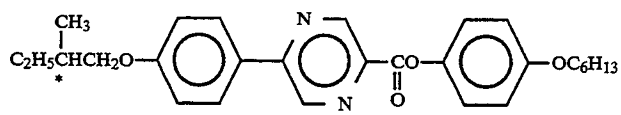
(I-33)
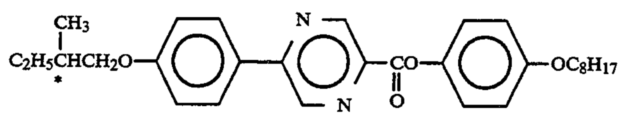
(I-34)
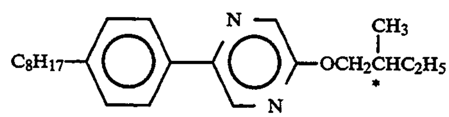
(I-35)
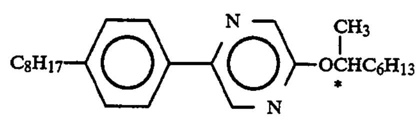
(I-36)
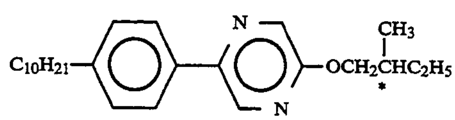
(I-37)
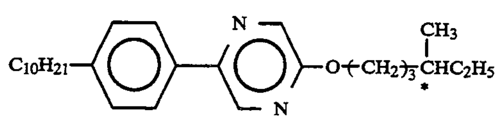
(I-38)
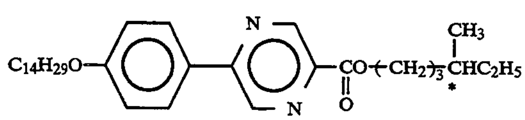
(I-39)
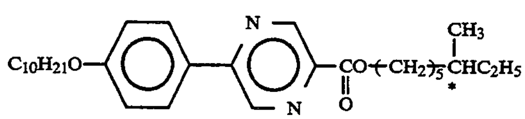
(I-40)
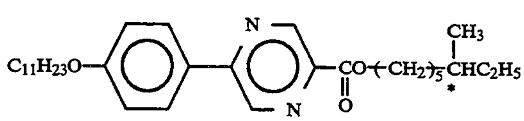
(I-41)
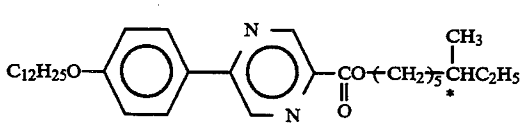
(I-42)
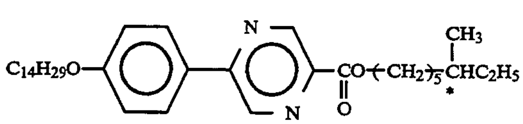

-continued
Example Compound No.
(I-43)
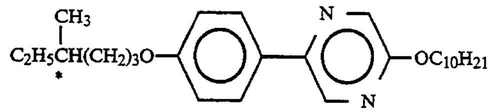
(I-44)
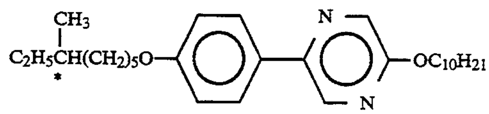
(I-45)
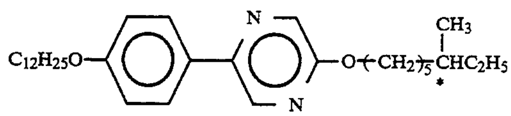
(I-46)
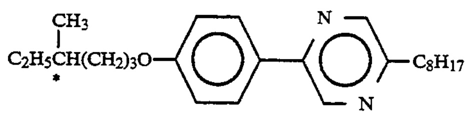
(I-47)
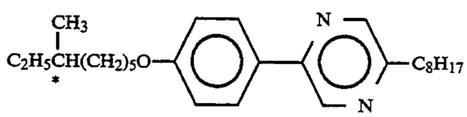
(I-48)
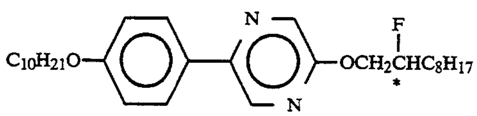
(I-49)
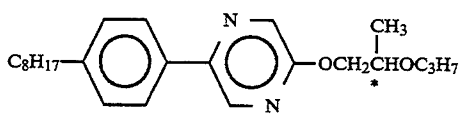
(I-50)
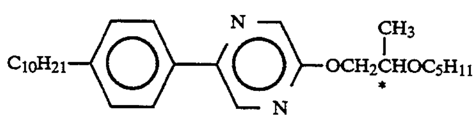
(I-51)
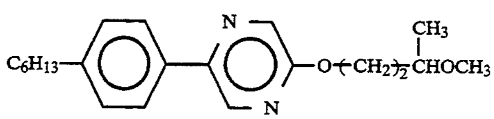
(racemate)
(I-52)
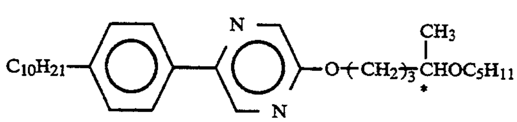
(I-53)
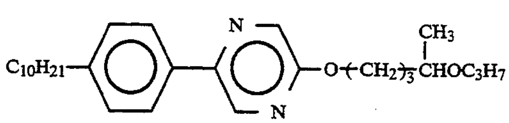
(racemate)
(I-54)
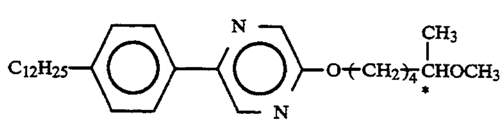
(I-55)
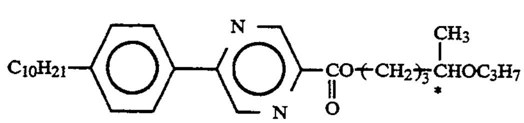

-continued
Example Compound No.
(I-56) 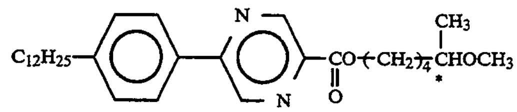
(I-57) 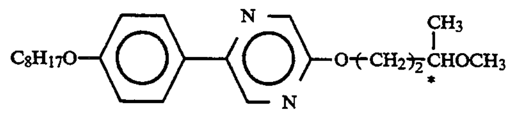
(I-58) 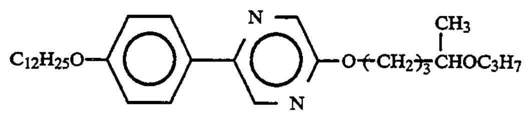 (racemate)
(I-59) 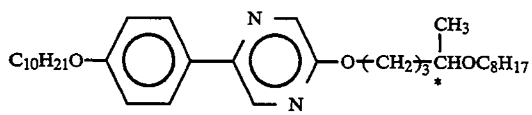
(I-60) 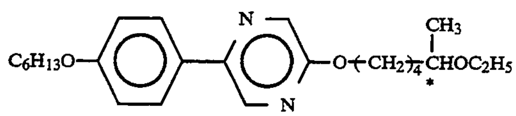
(I-61) 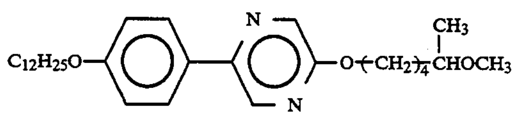 (racemate)
(I-62) 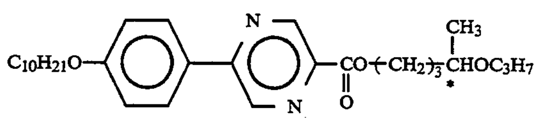
(I-63) 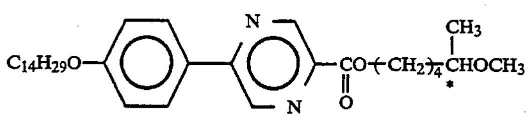
(I-64) 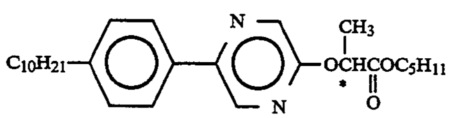
(I-65) 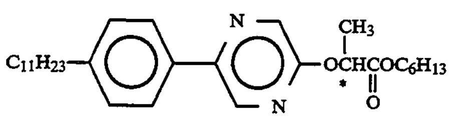
(I-66) 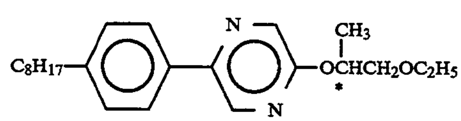
(I-67) 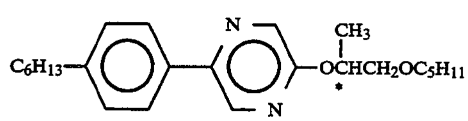
(I-68) 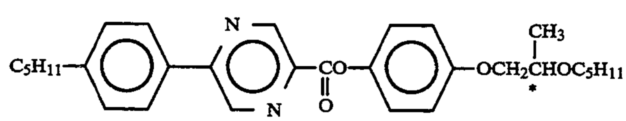

-continued
Example Compound No.
(I-69)
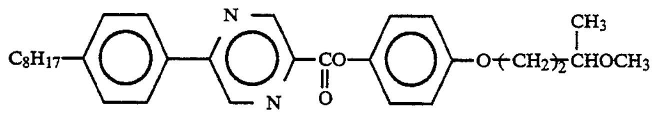
(racemate)
(I-70)
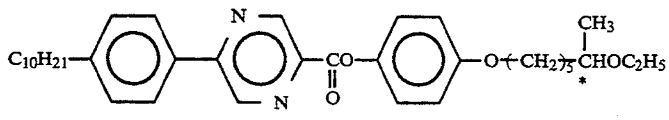
(I-71)
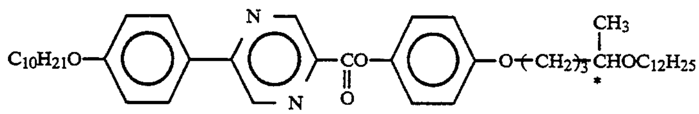
(I-72)
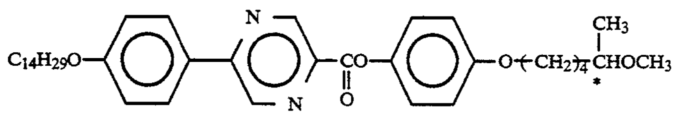
(I-73)
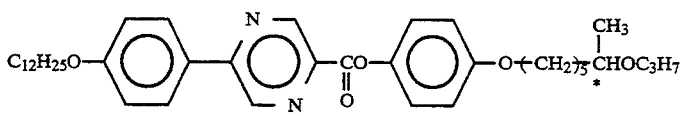
(I-74)
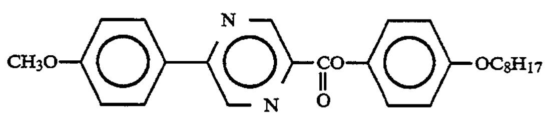
(I-75)
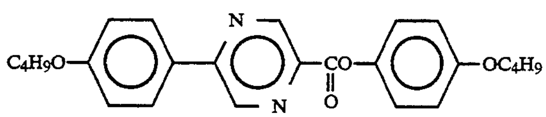
(I-76)
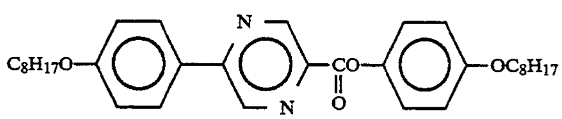
(I-77)
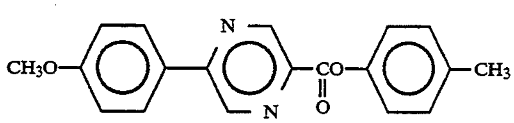
(I-78)
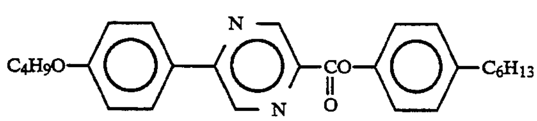
(I-79)
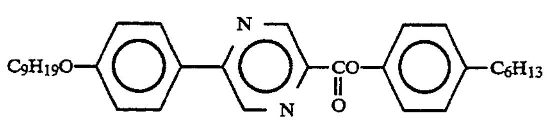
(I-80)
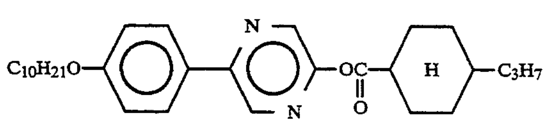
(I-81)
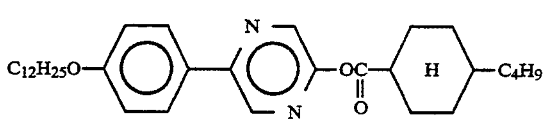

-continued
Example Compound No.
(I-82)
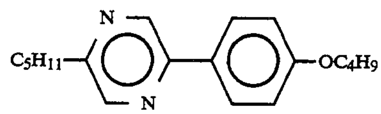
(I-83)
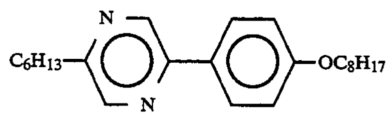
(I-84)
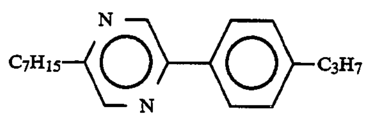
(I-85)
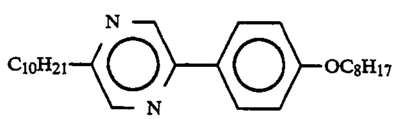
(I-86)
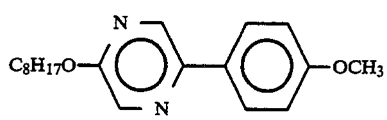
(I-87)
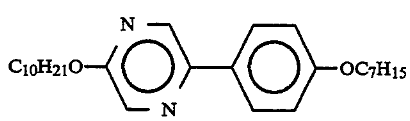
(I-88)
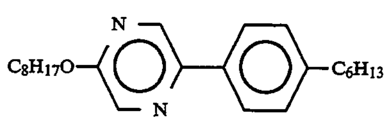
(I-89)
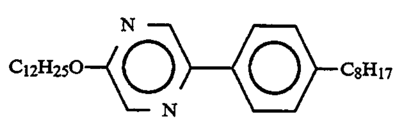
(I-90)
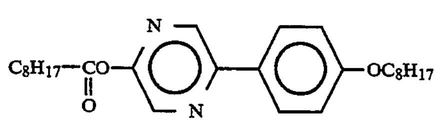
(I-91)
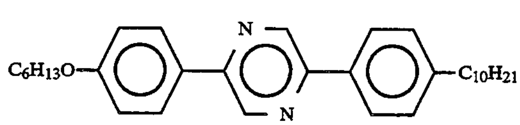
(I-92)
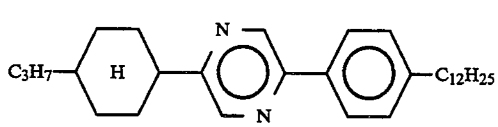
(I-93)
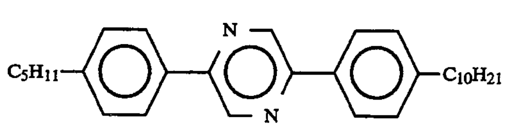
(I-94)
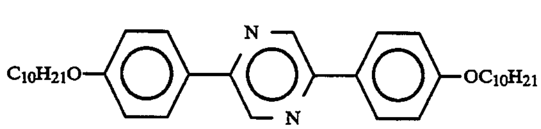

-continued

Example Compound No.

(I-95) 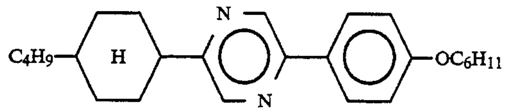

(I-96) 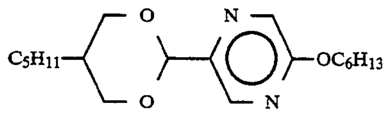

(I-97) 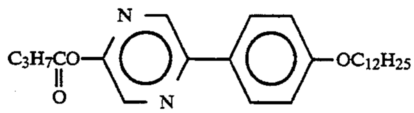

(I-98) 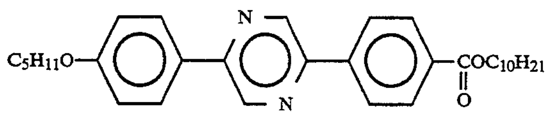

(I-99) 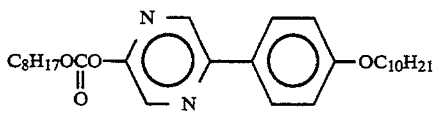

(I-100) 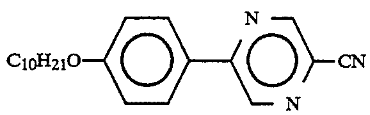

(I-101) 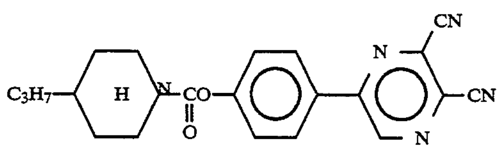

Among the mesomorphic compounds represented by the general formula (I), those also expressed by the following formula, for example,

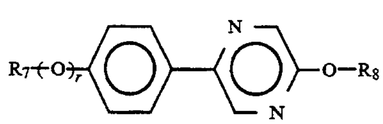

(wherein $R_7$ and $R_8$ have the same meanings as defined above and r is 0 or 1) may be produced along the following reaction scheme:

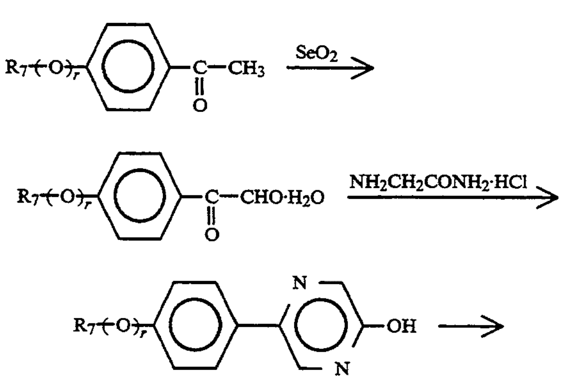

-continued

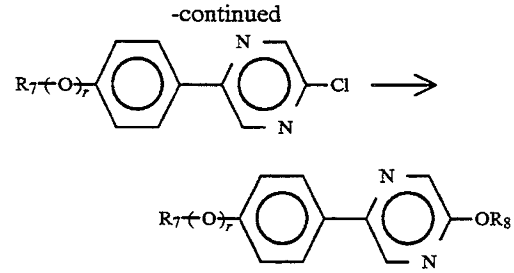

The mesomorphic compounds having a pyrimidine ring as a skeleton may preferably be those represented by the following formula (II):

$$R_9-X_4-Y_2-X_5-Z_2-X_6-R_{10} \quad \text{(II)},$$

wherein $R_9$ and $R_{10}$ respectively denote an alkyl group having 1-18 carbon atoms and capable of having a substituent, at least one of $R_9$ and $R_{10}$ being capable of having an asymmetric carbon atom; $X_4$ and $X_6$ respectively denote a single bond, —O—, $$-\underset{\underset{O}{\|}}{C}O-,\quad -O\underset{\underset{O}{\|}}{C}-\quad \text{or}\quad -O\underset{\underset{O}{\|}}{C}O-;$$

$X_5$ denotes a single bond, $-\underset{O}{\underset{\|}{C}}O-$, $-O\underset{O}{\underset{\|}{C}}-$ or $-CH_2O-$;

$Y_2$ denotes a divalent group including a pyrimidine ring; and $Z_2$ denotes a single bond,

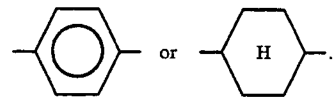

Specific examples of the mesomorphic compounds having a phenylpyrimidine ring skeleton are enumerated hereinbelow with their numbers and structural formulas:

Example Compound No.

(II-1)

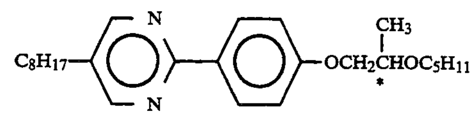

(II-2)

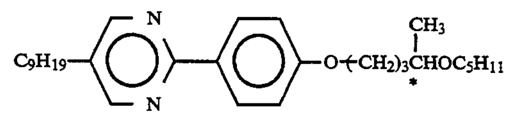

(II-3)

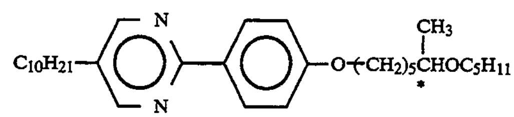

(II-4)

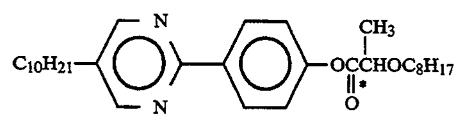

(II-5)

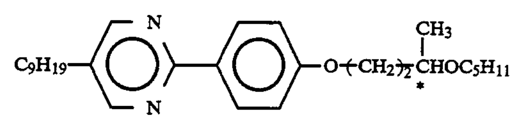

(II-6)

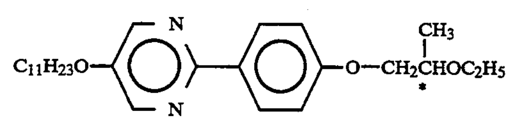

(II-7)

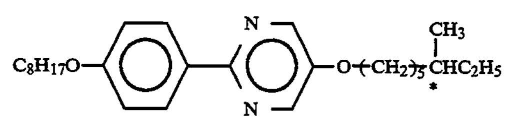

(II-8)

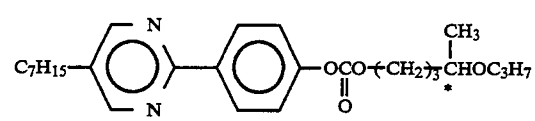

(II-9)

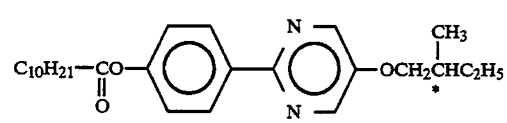

(II-10)

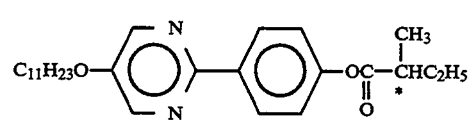

(II-11)

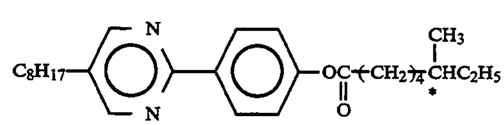

-continued
Example Compound No.
(II-12)
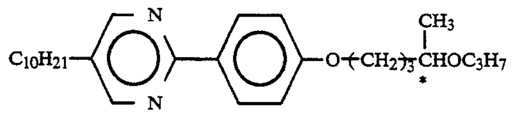
(II-13)
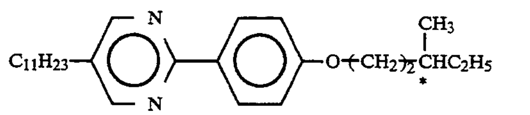
(II-14)
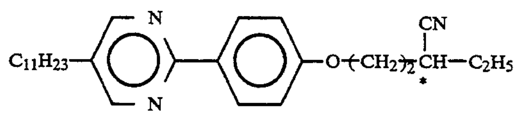
(II-15)
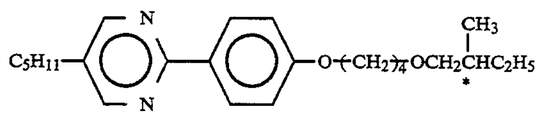
(II-16)
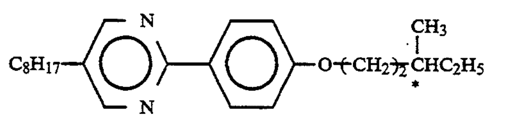
(II-17)
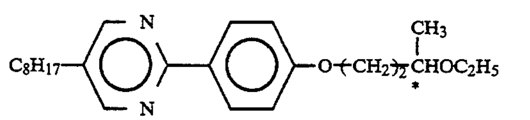
(II-18)
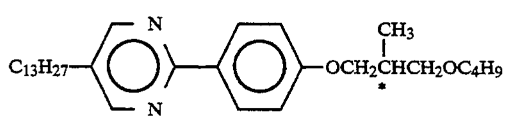
(II-19)
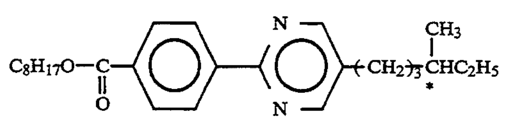
(II-20)
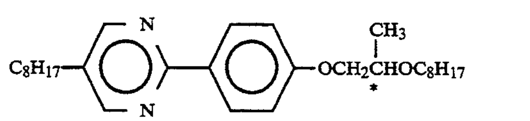
(II-21)
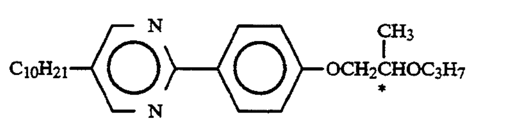
(II-22)
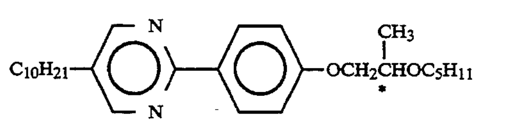
(II-23)
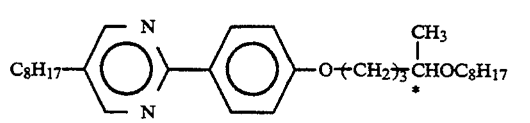
(II-24)
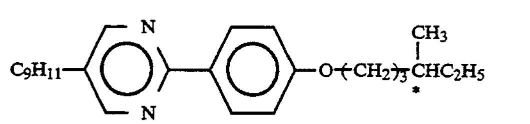

-continued
Example Compound No.
(II-25) 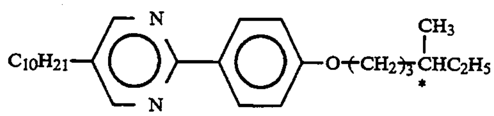
(II-26) 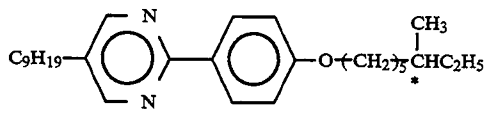
(II-27) 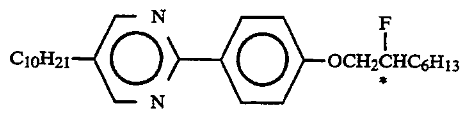
(II-28) 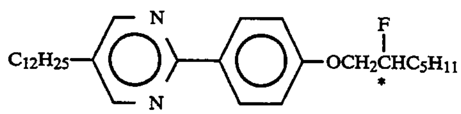
(II-29) 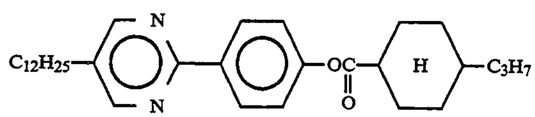
(II-30) 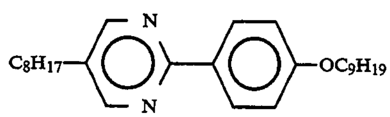
(II-31) 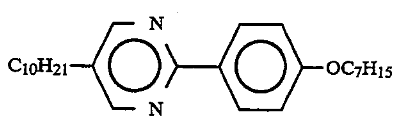
(II-32) 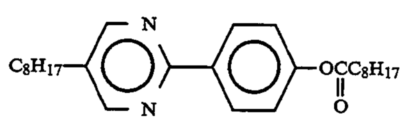
(II-33) 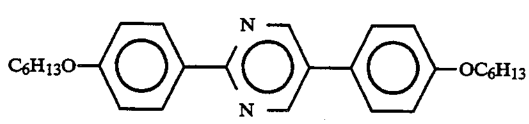
(II-34) 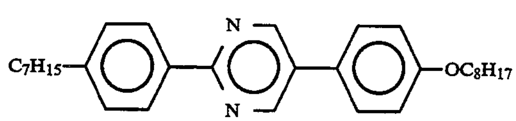
(II-35) 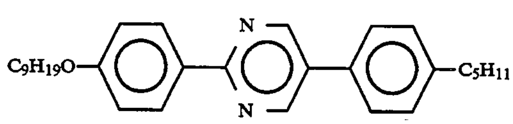
(II-36) 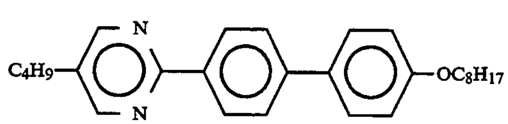
(II-37) 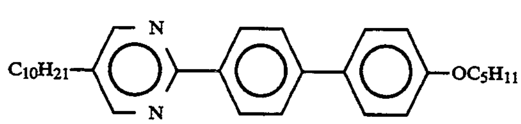

-continued
Example Compound No.
(II-38)
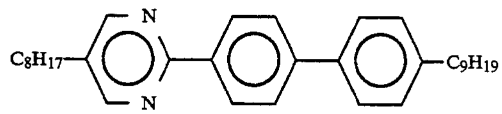
(II-39)
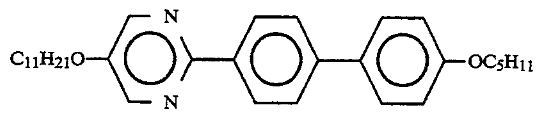
(II-40)
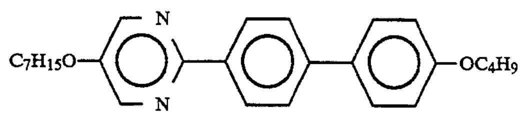
(II-41)
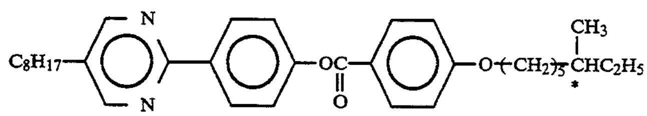
(II-42)
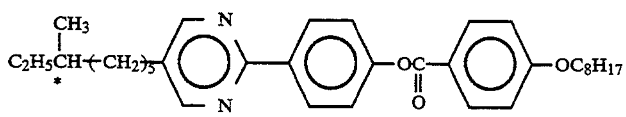
(II-43)
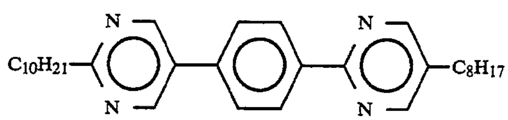
(II-44)
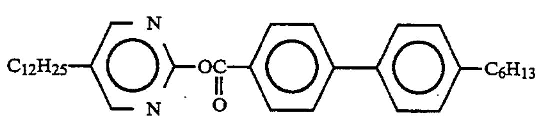
(II-45)
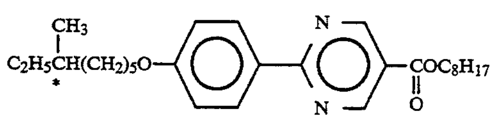
(II-46)
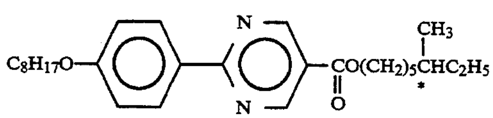
(II-47)
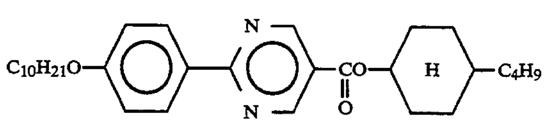
(II-48)
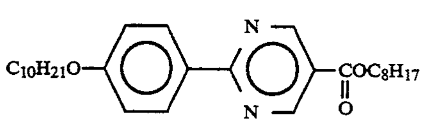
(II-49)
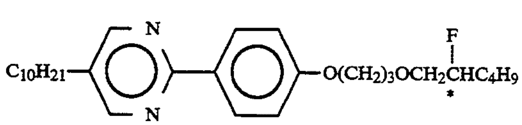
(II-50)
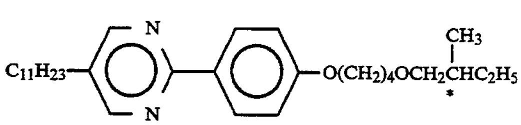

-continued
Example Compound No.
(II-51)
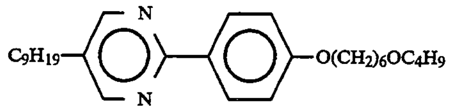
(II-52)
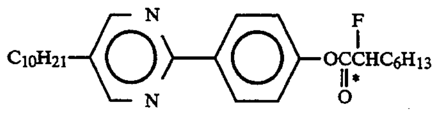
(II-53)
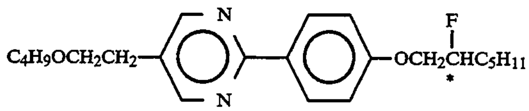
(II-54)
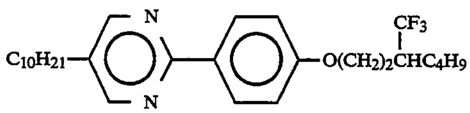
(II-55)
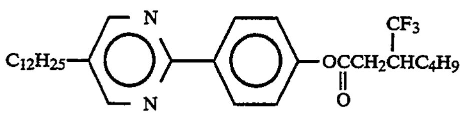
(II-56)
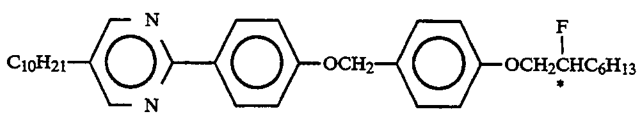
(II-57)
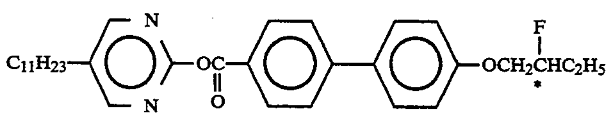
(II-58)
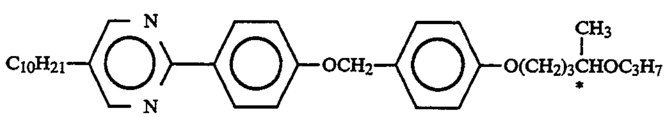
(II-59)
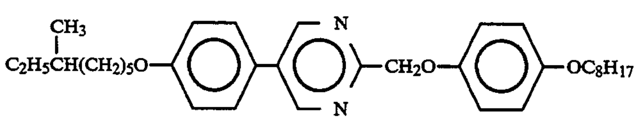
(II-60)
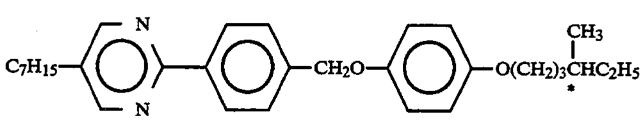
Among the mesomorphic compounds represented by the general formula (II), those also expressed by the following formula, for example,
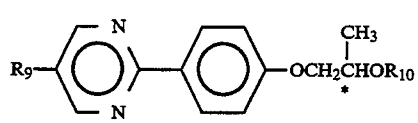
(wherein $R_9$ and $R_{10}$ have the same meanings as defined above) may be produced along the following reaction scheme:
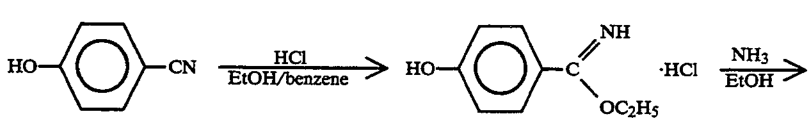

-continued

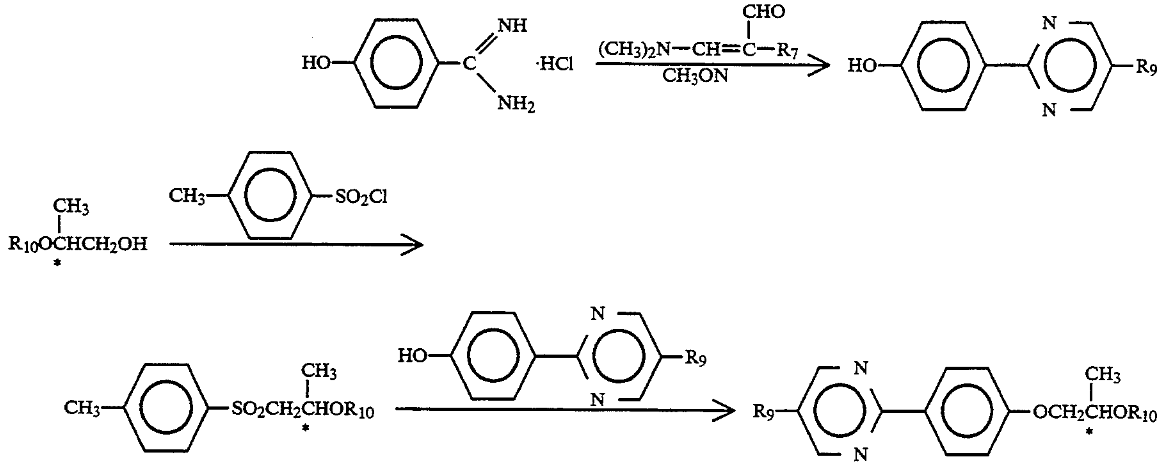

The mesomorphic compound having a pyrazine ring and the mesomorphic compound having a pyrimidine ring may suitably be mixed in a ratio of 100 wt. parts of the former with 1–300 wt. parts, preferably 5–200 wt. parts, of the latter. Further, the mesomorphic compound having a pyrazine ring and the mesomorphic compound having a pyrimidine ring in combination may suitably be mixed with another FLC material in a ratio of 1–500 wt. parts, preferably 10–100 wt. parts, of the former combination with 100 wt. parts of the latter.

FIG. 1 is a schematic sectional view of an embodiment of the ferroelectric liquid crystal device for explanation of the structure thereof.

Referring to FIG. 1, the ferroelectric liquid crystal device includes a ferroelectric liquid crystal layer 1 disposed between a pair of glass substrates 2 each having thereon a transparent electrode 3 and an insulating alignment control layer 4. Lead wires 6 are connected to the electrodes so as to apply a driving voltage to the liquid crystal layer 1 from a power supply 7. Outside the substrates 2, a pair of polarizers 8 are disposed so as to modulate incident light $I_O$ from a light source 9 in cooperation with the liquid crystal 1 to provide modulated light I.

Each of two glass substrates 2 is coated with a transparent electrode 3 comprising a film of $IN_2O_3$, $SnO_2$ or ITO (indium-Tin-Oxide) to form an electrode plate. Further thereon, an insulating alignment control layer 4 is formed by rubbing a film of a polymer such as polyimide with gauze or acetate fiber-planted cloth so as to align the liquid crystal molecules in the rubbing direction. Further, it is also possible to compose the alignment control layer of two layers, e.g., by first forming an insulating layer of an inorganic material, such as silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, or magnesium fluoride, and forming thereon an alignment control layer of an organic insulating material, such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin, or photoresist resin. Alternatively, it is also possible to use a single layer of inorganic insulating alignment control layer or organic insulating alignment control layer. An inorganic insulating alignment control layer may be formed by vapor deposition, while an organic insulating alignment control layer may be formed by applying a selection of an organic insulating material or a precursor thereof in a concentration of 0.1 to 20 wt. %, preferably 0.2–10 wt. %, by spinner coating, dip coating, screen printing, spray coating or roller coating, followed by curing or hardening under prescribed hardening condition (e.g., by heating). The inorganic insulating layer may have a thickness of ordinarily 50 Å–1μ, preferably 100 Å–5000 Å, further preferably 500 Å–3000 Å. The two glass substrates 2 with transparent electrodes 3 (which may be inclusively refereed to herein as "electrode plates") and further with insulating alignment control layers 4 thereof are held to have a prescribed (but arbitrary) gap with a spacer 5. For example, such a cell structure with a prescribed gap may be formed by sandwiching spacers of silica beads or alumina beads having a prescribed diameter with two glass plates, and then sealing the periphery thereof with, e.g., an epoxy adhesive. Alternatively, a polymer film or glass fiber may also be used as a spacer. Between the two glass plates, a ferroelectric liquid crystal is sealed up to provide a ferroelectric liquid crystal layer in a thickness of generally 0.5 to 20μ, preferably 1 to 5μ.

It is desired that the ferroelectric liquid crystal shows SmC* phase (chiral smectic C phase) over a wide temperature range (particularly on the lower temperature side) including room temperature and shows a low viscosity and a high-speed response characteristic when incorporated in a device. Further, it is desired to have a small temperature-dependency of the response speed. Further, so as to show a uniform alignment characteristic to form a monodomain, the ferroelectric liquid crystal may desirably show a phase transition series of isotropic phase—Ch (cholesteric) phase—SmA (smectic A) phase—SmC* (chiral smectic C) phase.

The transparent electrodes 3 are connected to the external power supply 7 through the lead wires 6. Further, outside the glass substrates 2, polarizers 8 are applied. The device shown in FIG. 1 is of a transmission type.

Figure 2:
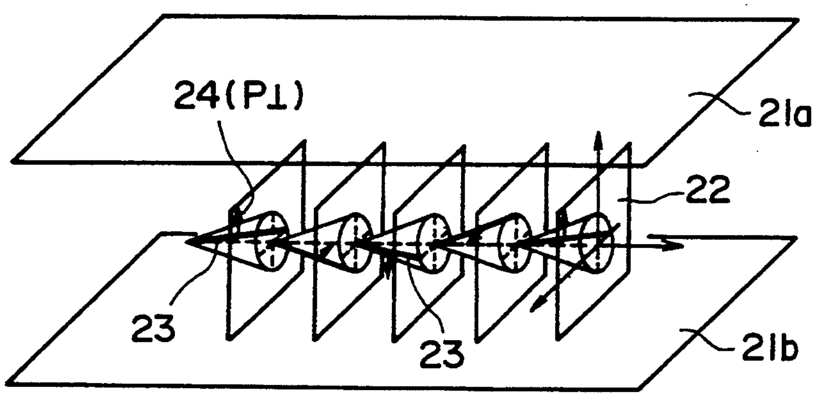
FIGS. 2 and 3 are respectively a schematic perspective view of a ferroelectric liquid crystal device for illustrating the operation of the device.

FIG. 2 is a schematic illustration of a ferroelectric liquid crystal cell (device) for explaining operation thereof. Reference numerals 21*a* and 21*b* denote substrates (glass plates) on which a transparent electrode of, e.g., $IN_2O_3$, $SnO_2$, ITO (Indium Tin Oxide), etc., is disposed, respectively. A liquid crystal of an SmC*- phase (chiral smectic C phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. When a voltage higher than a certain threshold level is applied between electrodes formed on the substrates 21*a* and 21*b*, a helical structure of the liquid crystal molecule 23 is unwound or released to change the alignment direction of respective liquid crystal molecules 23 so that the dipole moments (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
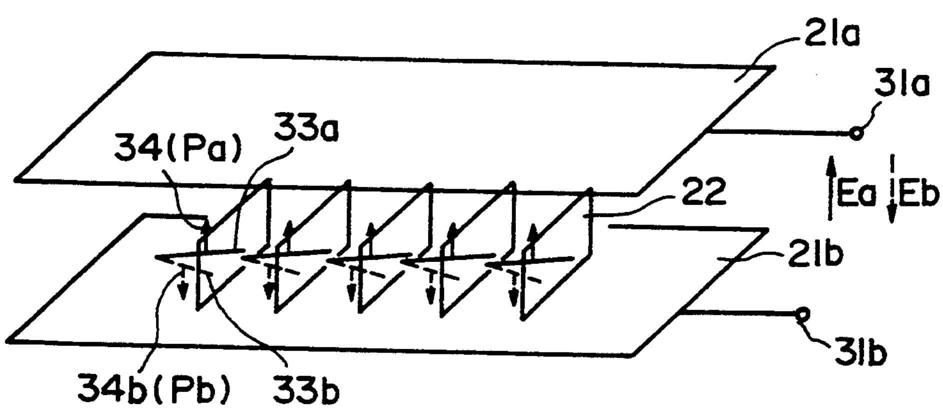

Further, when the liquid crystal cell is made sufficiently thin (e.g., about 1μ), the helical structure of the liquid crystal molecules is unwound to provide a non-helical structure even in the absence of an electric field, whereby the dipole moment assumes either of the two states, i.e., Pa in an upper direction 34*a* or Pb in a lower direction 34*b* as shown in FIG. 3, thus providing a bistable condition. When an electric field Ea or Eb higher than a certain threshold level and different from each other in polarity as shown in FIG. 3 is applied to a cell having the above-mentioned characteristics, the dipole moment is directed either in the upper direction 34*a* or in the lower direction 34*b* depending on the vector of the electric field Ea or Eb. In correspondence with this, the liquid crystal molecules are oriented in either of a first stable state 33*a* and a second stable state 33*b*.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 3. When the electric field Ea is applied to the liquid crystal molecules, they are oriented in the first stable state 33*a*. This state is stably retained even if the electric field is removed. On the other hand, when the electric field Eb of which direction is opposite to that of the electric field Ea is applied thereto, the liquid crystal molecules are oriented to the second stable state 33*b*, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

Hereinbelow, the present invention will be explained more specifically with reference to Examples.

Example 1

A liquid crystal composition A was prepared by mixing the following compounds in the respectively indicated amounts.

| Example Compound No. | Weight parts |
|---|---|
| 1 | 56 |
| 8 | 14 |
| 130 | 7.5 |
| 131 | 22.5 |

The liquid crystal composition A showed the following phase transition series (the numerals denote phase transition temperatures (°C.). The same as in the Examples appearing hereinafter.)

$$\text{Cry.}\underset{21.9}{\overset{23.6}{\rightleftarrows}}\text{SmC*}\underset{48.0}{\overset{48.7}{\rightleftarrows}}\text{SmA}\underset{68.0}{\overset{68.7}{\rightleftarrows}}\text{Ch.}\underset{77.8}{\overset{78.4}{\rightleftarrows}}\text{Iso}$$

90 wt. parts of the liquid crystal composition A was mixed with 10 wt. parts of Example Compound 1-4 as produced in the manner of Synthesis Example 1 to obtain a liquid crystal composition B which showed the following phase transition series:

$$\text{Cry.}\underset{9.4}{\overset{11.2}{\rightleftarrows}}\text{SmC*}\underset{52.0}{\overset{52.7}{\rightleftarrows}}\text{SmA}\underset{64.6}{\overset{65.2}{\rightleftarrows}}\text{Ch.}\underset{87.4}{\overset{88.0}{\rightleftarrows}}\text{Iso.}$$

Figure 4:
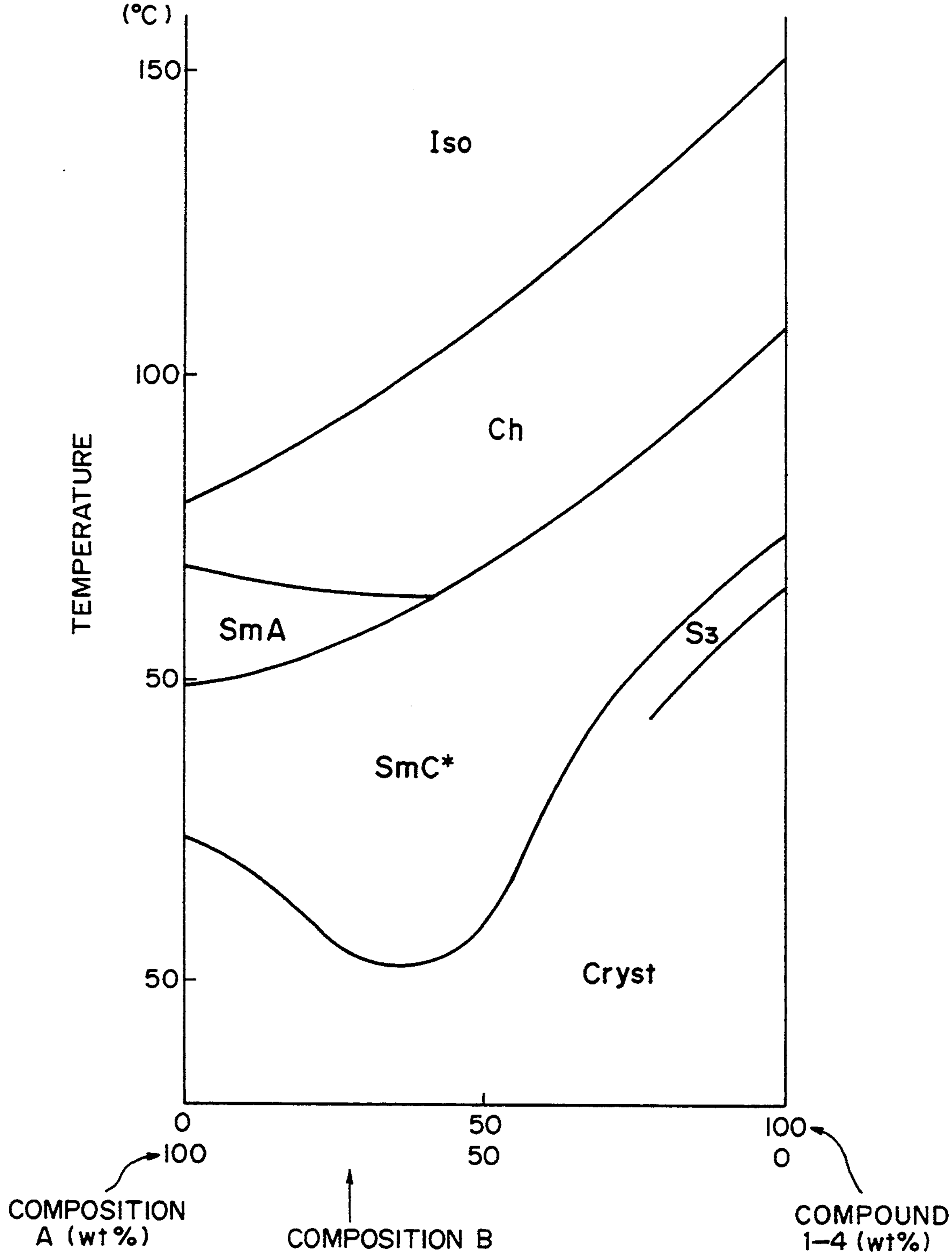
FIG. 4 is a phase diagram showing a change in phase transition temperature of a composition comprising a liquid crystal composition A of Example 1 and an example compound 1-4.

Further, a phase diagram showing changes in phase transition temperatures obtained by mixing the liquid crystal composition A and the Example Compound 1-4 in various proportions is given as FIG. 4. As is apparent in view of the results of the liquid crystal composition B and also of FIG. 4, the liquid crystal compositions according to the present invention obtained by adding the Example Compound 1-4 to the liquid crystal composition A showed SmC* phase temperature ranges which were enlarged on both the high temperature side and the low temperature side compared with that of the liquid crystal composition A.

Example 2

Two 0.7 mm-thick glass plates were provided and respectively coated with an ITO film to form an electrode for voltage application, which was further coated with an insulating layer of vapor-deposited $SiO_2$. On the insulating layer, a 0.2%-solution of silane coupling agent (KBM-602, available from Shinetsu Kagaku K.K.) is isopropyl alcohol was applied by spinner coating at a speed of 2000 rpm for 15 second and subjected to hot curing treatment at 120° C. for 20 min.

Further, each glass plate provided with an ITO film and treated in the above described manner was coated with a 2%-solution of polyimide resin precursor (SP-510, available from Toray K.K.) in dimethylacetoamide by a spinner coater rotating at 2000 rpm for 15 seconds. Thereafter, the coating film was subjected to heat curing at 300° C. for 60 min. to obtain about 250 Å-thick film. The coating film was rubbed with acetate fiber-planted cloth. The thus treated two glass plates were washed with isopropyl alcohol. After alumina beads with an average particle size of 2.0 μm were dispersed on one of the glass plates, the two glass plates were applied to each other with a bonding sealing agent (Lixon Bond available from Chisso K.K.) so that their rubbed directions were parallel to each other and heated at 100° C. for 60 minutes to form a blank cell. The cell gap was found to be about 2 μm as measured by a Berek compensator.

Then, the liquid crystal composition B prepared in Example 1 was heated into an isotropic liquid, and injected into the above prepared cell under vacuum and, after sealing, was gradually cooled at a rate of 5° C./hour to 25° C. to prepare a ferroelectric liquid crystal device.

The ferroelectric liquid crystal device was subjected to measurement of a spontaneous polarization Ps and an optical response time (time from voltage application until the transmittance change reaches 90% of the maximum under the application of a peak-to-peak voltage Vpp of 20 V in combination with right-angle cross-nicol polarizers).

The results are shown below:

| | 25° C. | 35° C. | 45° C. |
|---|---|---|---|
| Response time | 340 μsec | 145 μsec | 75 μsec |
| Ps | 23.4 nC/cm$^2$ | 17.6 nC/cm$^2$ | 9.5 nC/cm$^2$ |

Further, the device was driven at 25° C. to provide a contrast of 13, and a clear switching action was observed.

Comparative Example 2

A ferroelectric liquid crystal device was prepared in the same manner as in Example 2 except that the liquid crystal composition A prepared in Example 1 was injected into a cell. The measured values of Ps and the response time of the device were as follows:

| | 25° C. | 35° C. | 45° C. |
|---|---|---|---|
| Response time | 430 μsec | 150 μsec | 60 μsec |
| Ps | 36.5 nC/cm$^2$ | 26.2 nC/cm$^2$ | 13.3 nC/cm$^2$ |

As is understood from the comparison between Example 2 and Comparative Example 2, a ferroelectric liquid crystal device containing the liquid crystal composition according to the present invention showed a lower viscosity (about ½ at 25° C. from the above-mentioned equation $\tau=\eta/(Ps\cdot E)$) in spite of a higher upper limit temperature of SmC* phase. The ferroelectric liquid crystal device of the present invention further showed improved dynamic characteristic and high-speed responsiveness at low temperatures in contradiction with the magnitude of spontaneous polarization, and also provided a remarkably improved temperature-dependency of the response speed.

Example 3

80 wt. parts of the liquid crystal composition A was mixed with Example Compounds 1-19, 1-46 and 1-50 in amounts of 5, 10 and 5 wt. parts, respectively, to prepare a liquid crystal composition C. A ferroelectric liquid crystal device was prepared in the same manner as in Example 2 except for using the composition C. In the ferroelectric liquid crystal device, a monodomain of a uniform alignment characteristic was observed. The ferroelectric liquid crystal device was subjected to measurement of response time and spontaneous polarization Ps in the same manner as in Example 2, whereby the following results were obtained.

| | 25° C. | 35° C. | 45° C. |
|---|---|---|---|
| Response time | 385 μsec | 175 μsec | 95 μsec |
| Ps | 25.3 nC/cm$^2$ | 18.1 nC/cm$^2$ | 10.2 nC/cm$^2$ |

Example 4

80 wt. parts of the liquid crystal composition A was mixed with Example Compounds 5-23, 1-46 and 5-93 in amounts of 6, 10 and 4 wt. parts, respectively, to prepare a liquid crystal composition D. A ferroelectric liquid crystal device was prepared in the same manner as in Example 2 except for using the composition D. In the ferroelectric liquid crystal device, a monodomain of a uniform alignment characteristic was observed. The ferroelectric liquid crystal device was subjected to measurement of response time and spontaneous polarization Ps in the same manner as in Example 2, whereby the following results were obtained.

| | 25° C. | 35° C. | 45° C. |
|---|---|---|---|
| Response time | 330 μsec | 155 μsec | 85 μsec |
| Ps | 24.2 nC/cm$^2$ | 16.5 nC/cm$^2$ | 8.6 nC/cm$^2$ |

Example 5

80 wt. parts of the liquid crystal composition A was mixed with Example Compounds 1-46 and 5-23 in amounts of 10 and 10 wt. parts, respectively, to prepare a liquid crystal composition E. A ferroelectric liquid crystal device was prepared in the same manner as in Example 2 except for using the composition E. In the ferroelectric liquid crystal device, a monodomain of a uniform alignment characteristic was observed. The ferroelectric liquid crystal device was subjected to measurement of response time and spontaneous polarization Ps in the same manner as in Example 2, whereby the following results were obtained.

| | 25° C. | 35° C. | 45° C. |
|---|---|---|---|
| Response time | 260 μsec | 125 μsec | 65 μsec |
| Ps | 22.8 nC/cm$^2$ | 14.9 nC/cm$^2$ | 7.4 nC/cm$^2$ |

As is understood from the results of Comparative Example 2 and Examples 3, 4 and 5, the ferroelectric liquid crystal devices containing a mesomorphic compound of the formula (1) showed improved dynamic characteristic and high-speed responsiveness at a low temperature, and particularly showed a remarkably improved temperature dependency of response speed compared with one containing no mesomorphic compound of the formula (1). With respect to the temperature dependency, the composition C containing 20 wt. parts of the mesomorphic compound (1) showed a better performance than the composition B containing 10 wt. parts of the mesomorphic compound (1).

Further, comparison between Examples 3 and 4 shows that the use of a compound of the formula (2) in combination with the compounds of the formulas (6) and (7) provided an improved (higher) response speed as a whole than when the compound of the formula (2) alone was used. Further, some improvement in temperature-dependency of response speed was also observed. Further, in the case of Example 5 where the compounds of the formulas (2) and (6) were used in combination, the temperature dependency of response speed was remarkably improved to realize a faster response over the whole temperature range, which might be attributable to a decrease in viscosity.

Example 6

A liquid crystal composition F was prepared by mixing the following components in the respectively indicated amounts.

| Example Compound No. | wt. parts |
|---|---|
| 20 | 15 |
| 21 | 15 |
| 58 | 10 |
| 89 | 20 |
| 120 | 13 |
| 129 | 7 |
| 1-4 | 15 |
| 1-7 | 5 |

The liquid crystal composition F showed the following phase transition series.

$$\text{Cry.}\underset{6.0}{\overset{10.2}{\rightleftarrows}}\text{SmC*}\underset{55.1}{\overset{56.2}{\rightleftarrows}}\text{SmA}\underset{60.0}{\overset{60.4}{\rightleftarrows}}\text{Ch.}\underset{63.2}{\overset{64.0}{\rightleftarrows}}\text{Iso.}$$

A ferroelectric liquid crystal device was prepared in the same manner as in Example 2 except that the liquid crystal composition B was replaced by the liquid crystal composition F. In the ferroelectric liquid crystal device, a monodomain of a uniform alignment characteristic was observed. The ferroelectric liquid crystal device was subjected to measurement of response time and spontaneous polarization Ps in the same manner as in Example 2, whereby the following results were obtained.

| | 15° C. | 25° C. | 35° C. |
|---|---|---|---|
| Response time | 195 μsec | 125 μsec | 85 μsec |
| Ps | 23.4 nC/cm$^2$ | 19.0 nC/cm$^2$ | 15.2 nC/cm$^2$ |

Further, the device was driven at 25 ° C. with a contrast of 14 and a clear switching action was observed. Good bistability was also observed when the voltage application was stopped.

Comparative Example 6

A liquid crystal composition G was prepared in the same mixing proportions as the liquid crystal composition F in Example 6 except that only Example Compounds 1-4 and 1-7 were removed. The composition D showed the following phase transition series:

$$\text{Cry.}\underset{10.5}{\overset{14.0}{\rightleftarrows}}\text{SmC*}\underset{44.3}{\overset{45.6}{\rightleftarrows}}\text{SmA}\underset{50.6}{\overset{51.3}{\rightleftarrows}}\text{Iso.}$$

A ferroelectric liquid crystal device was prepared in the same manner as in Example 6 except for injecting the liquid crystal composition G in the cell and was observed with respect to the switching action, etc., whereby the alignment in the cell was not uniform and clear switching action was not observed.

The remarkable difference in alignment state between the devices of Example 6 and Comparative Example 6 may be attributable to a difference in phase transition series of the liquid crystals used that the liquid crystal composition F showed Iso → Ch → SmA → SmC* from the higher temperature side whereas the liquid crystal composition G showed Iso → SmA → SmC* and did not show cholesteric phase. Thus, it is understood that the liquid crystal composition F containing the mesomorphic compounds 1-4 and 1-7 showed an improved alignment characteristic in the device due to introduction of Ch phase in addition to an enlarged temperature region for SmC* phase.

Example 7

A liquid crystal composition H was prepared in the same manner as the liquid crystal composition F in Example 6 except that the Example Compound 1-4 was replaced by 5 wt. parts of Example Compound 3-30. A ferroelectric liquid crystal device was prepared in the same manner as in Example 2 except for using the composition H. In the ferroelectric liquid crystal device, a monodomain of a uniform alignment characteristic was observed. The ferroelectric liquid crystal device was subjected to measurement of response time and spontaneous polarization Ps in the same manner as in Example 2, whereby the following results were obtained.

| | 15° C. | 25° C. | 35° C. |
|---|---|---|---|
| Response time | 155 μsec | 100 μsec | 80 μsec |
| Ps | 24.2 nC/cm$^2$ | 19.8 nC/cm$^2$ | 15.7 nC/cm$^2$ |

Further, the device was driven at 25° C. with a contrast of 17 and a clear switching action was observed. Good bistability was also observed when the voltage application was stopped.

Compared with the liquid crystal composition F in Example 6, the liquid crystal composition H containing the mesomorphic compounds of the formulas (2) and (4) in combination showed a better response speed and also a remarkably improved temperature-dependency thereof. Further, the contrast has been remarkably increased to 17 compared with 14 of the liquid crystal composition F.

Comparative Example 7

A liquid crystal composition I was prepared in the same manner as the liquid crystal composition F in Example 6 except that the Example Compounds 1-4 and 1-7 were replaced by 20 wt. parts of Example Compound 3-30. A ferroelectric liquid crystal device was prepared in the same manner as in Example 2 except for using the composition I. In the ferroelectric liquid crystal device, a monodomain of a uniform alignment characteristic was observed. The ferroelectric liquid crystal device was subjected to measurement of response time and spontaneous polarization Ps in the same manner as in Example 2, whereby the following results were obtained.

| | 15° C. | 25° C. | 35° C. |
|---|---|---|---|
| Response time | 240 μsec | 135 μsec | 75 μsec |
| Ps | 26.3 nC/cm$^2$ | 21.1 nC/cm$^2$ | 16.5 nC/cm$^2$ |

Compared with the liquid crystal composition F in Example 6, the liquid crystal composition I obtained by the addition of only a mesomorphic compound of the formula (4) showed a shower response speed, particularly at a low temperature, and also a remarkably worse temperature dependency of response speed.

Comparative Example 8

A liquid crystal composition J was prepared in the same manner as the liquid crystal composition F in Example 6 except that the Example Compounds 1-4 and 1-7 were replaced by 20 wt. parts of the compound of the formula:

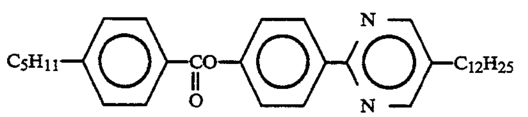

A ferroelectric liquid crystal composition device was prepared in the same manner as in Example 2 except for using the composition J. In the ferroelectric liquid crystal device, a monodomain of a uniform alignment characteristic was observed. The ferroelectric liquid crystal device was subjected to measurement of response time and spontaneous polarization Ps in the same manner as in Example 2, whereby the following results were obtained.

| | 15° C. | 25° C. | 35° C. |
|---|---|---|---|
| Response time | 285 μsec | 170 μsec | 105 μsec |
| Ps | 27.5 $nC/cm^2$ | 23.1 $nC/cm^2$ | 18.6 $nC/cm^2$ |

Compared with the liquid crystal composition F in Example 6 containing mesomorphic compounds having a cyclohexane ring, the liquid crystal composition J containing a mesomorphic compound in the form of a benzoic acid ester having a benzene ring instead of the cyclohexane showed a show response speed and also a remarkably worse temperature-dependecy thereof. Further, the viscosity value calculated from the above equation remarkably increased to about 1.7 times.

Example 8

A liquid crystal composition K was prepared by mixing the following components in the respectively indicated amounts.

| Example Compound No. | wt. parts |
|---|---|
| 1 | 64 |
| 8 | 16 |
| 9 | 22.5 |
| 43 | 22.5 |
| 63 | 15 |
| 87 | 15 |
| 130 | 6.75 |
| 131 | 18.75 |
| 1-4 | 20 |
| 1-18 | 20 |

The liquid crystal composition K showed the following phase transition series:

$$\text{Cry.}\underset{-6.7}{\overset{-5.5}{\rightleftarrows}}\text{SmC*}\underset{50.2}{\overset{51.1}{\rightleftarrows}}\text{SmA}\underset{67.7}{\overset{68.5}{\rightleftarrows}}\text{Ch.}\underset{85.9}{\overset{86.9}{\rightleftarrows}}\text{Iso.}$$

A ferroelectric liquid crystal device was prepared in the same manner as in Example 2 except for using the composition K. In the ferroelectric liquid crystal device, a monodomain of a uniform alignment characteristic was observed. The ferroelectric liquid crystal device was subjected to measurement of response time in the same manner as in Example 2, whereby the following results were obtained.

| 10° C. | 25° C. | 35° C. |
|---|---|---|
| 890 μsec | 340 μsec | 230 μsec |

Further, the device was driven at 25° C. with a contrast of 12 and a clear switching action was observed. Good bistability was also observed when the voltage application was stopped.

Comparative Example 9

A liquid crystal composition L was prepared in the same mixing proportions as the liquid crystal composition K in Example 8 except for omitting the Example Compounds 1-4 and 1-8. The composition L showed the following phase transition series:

$$\text{Cry.}\underset{5.0}{\overset{6.1}{\rightleftarrows}}\text{SmC*}\underset{41.5}{\overset{42.4}{\rightleftarrows}}\text{SmA}\underset{67.9}{\overset{68.7}{\rightleftarrows}}\text{Ch.}\underset{75.0}{\overset{75.8}{\rightleftarrows}}\text{Iso.}$$

A ferroelectric liquid crystal device was prepared in the same manner as in Example 8 except for injecting the liquid crystal composition G in the cell, and the response time was measured in the same manner, whereby the following results are obtained.

| 10° C. | 25° C. | 35° C. |
|---|---|---|
| 1400 μsec | 450 μsec | 250 μsec |

Example 9

A liquid crystal composition M was prepared in the same manner as the liquid crystal composition K in Example 8 except that the Example Compounds 1-4 and 1-18 were replaced by Example Compounds 1-7 and 1-15 in 30 wt. parts and 10 wt. parts, respectively. The liquid crystal composition M showed the following phase transition series:

$$\text{Cry.}\underset{-3.7}{\overset{-2.5}{\rightleftarrows}}\text{SmC*}\underset{49.4}{\overset{50.1}{\rightleftarrows}}\text{SmA}\underset{70.7}{\overset{71.5}{\rightleftarrows}}\text{Ch.}\underset{89.0}{\overset{89.9}{\rightleftarrows}}\text{Iso.}$$

A ferroelectric liquid crystal device was prepared in the same manner as in Example 2 except for using the liquid crystal composition M. In the liquid crystal device, a monodomain of a uniform alignment characteristic was observed. The response time of the device was measured in the same manner as in Example 2, whereby the following results were obtained:

| 10° C. | 25° C. | 35° C. |
|---|---|---|
| 950 μsec | 370 μsec | 240 μsec |

Further, the device was driven at 25° C. with a contrast of 15, and a clear switching was observed. Good bistability was also observed when the voltage application was stopped.

Example 10

A liquid crystal composition N was prepared in the same manner as the liquid crystal composition K in Example 8 except that the Example Compounds 1-4 and 1-18 were replaced by Example Compounds 1-7, 1-8 and 1-9 in 20 wt. parts, 10 wt. parts and 10 wt. parts, respectively. The liquid crystal composition N showed the following phase transition series:

$$\text{Cry.} \underset{-0.3}{\overset{1.0}{\rightleftarrows}} \text{SmC*} \underset{52.8}{\overset{53.7}{\rightleftarrows}} \text{SmA} \underset{74.8}{\overset{75.8}{\rightleftarrows}} \text{Ch.} \underset{90.2}{\overset{91.0}{\rightleftarrows}} \text{Iso.}$$

A ferroelectric liquid crystal device was prepared in the same manner as=in Example 2 except for using the liquid crystal composition N. In the liquid crystal device, a monodomain of a uniform alignment characteristic was observed. The response time of the device was measured in the same manner as in Example 2, whereby the following results are obtained:

| 10° C. | 25° C. | 35° C. |
|---|---|---|
| 910 μsec | 350 μsec | 240 μsec |

Further, the device was driven at 25° C. with a contrast of 14 and a clear switching was observed. Good bistability was also observed when the voltage application was stopped.

As is understood from Examples 8, 9, 10 and Comparative Example 9, the liquid crystal compositions K, M and N containing an optically inactive mesomorphic compound having a cyclohexane ring in its skeleton showed an SmC* phase temperature range which had been broadened both on the high temperature side and on the low temperature side compared with the liquid crystal composition L not containing such a mesomorphic compound. Further, they showed a remarkably improved low temperature operation characteristic and a smaller temperature-dependency of response speed.

Example 11

A liquid crystal composition 0 was prepared in the same manner as the liquid crystal composition K in Example 8 except that the Example Compound 1-18 was replaced by Example Compounds 5-9, 1-58 and I-61 in 8 wt. parts, 6 wt. parts and 6 wt. parts, respectively.

A ferroelectric liquid crystal device was prepared in the same manner as in Example 2 except for using the liquid crystal composition O. In the liquid crystal device, a monodomain of a uniform alignment characteristic was observed. The response time of the device was measured in the same manner as in Example 2, whereby the following results were obtained:

| 10° C. | 25° C. | 35° C. |
|---|---|---|
| 670 μsec | 280 μsec | 205 μsec |

Further, the device was driven at 25° C. with a contrast of 15 and a clear switching was observed. Good bistability was also observed when the voltage application was stopped.

Example 12

A liquid crystal composition P was prepared in the same manner as the liquid crystal composition K in Example 8 except that the Example Compound 1-18 was replaced by Example Compounds 5-46 and 5-53 in 10 wt. parts and 10 wt. parts, respectively.

A ferroelectric liquid crystal device was prepared in the same manner as in Example 2 except for using the liquid crystal composition P. In the liquid crystal device, a monodomain of a uniform alignment characteristic was observed. The response time of the device was measured in the same manner as in Example 2, whereby the following results were obtained:

| 10° C. | 25° C. | 35° C. |
|---|---|---|
| 635 μsec | 270 μsec | 195 μsec |

Further, the device was driven at 25° C. with a contrast of 16 and a clear switching was observed. Good histability was also observed when the voltage application was stopped.

Example 13

A liquid crystal composition Q was prepared in the same manner as the liquid crystal composition K in Example 8 except that the Example Compound 1-18 was replaced by Example Compounds 1-61 and 1-63 in 10 wt. parts and 10 wt. parts, respectively.

A ferroelectric liquid crystal device was prepared in the same manner as in Example 2 except for using the liquid crystal composition Q. In the liquid crystal device, a monodomain of a uniform alignment characteristic was observed. The response time of the device was measured in the same manner as in Example 2 whereby the following results were obtained:

| 10° C. | 25° C. | 35° C. |
|---|---|---|
| 1050 μsec | 385 μsec | 250 μsec |

Further, the device was driven at 25° C. with a contrast of 16 and a clear switching was observed. Good bistability was also observed when the voltage application was stopped.

Example 14

A ferroelectric liquid crystal device was prepared in the same manner as in Example 2 except that a 2% aqueous solution of polyvinyl alcohol resin (PUA-117, available from Kuraray K.K.), and the optical response time thereof was measured in the same manner as in Example 2. The results are shown below.

| 25° C. | 35° C. | 45° C. |
|---|---|---|
| 330 μsec | 140 μsec | 70 μsec |

The device was driven at 25° C. with a contrast of 19.

Example 15

A ferroelectric liquid crystal device was prepared in the same manner as in Example 2 except that the $SiO_2$ insulating layer was omitted and the alignment control layer was composed of the polyimide film alone, and the optical response time of the device was measured in the same manner as in Example 2. The results are shown below:

| 25° C. | 35° C. | 45° C. |
|---|---|---|
| 335 μsec | 142 μsec | 70 μsec |

As is understood from Examples 14 and 15, a device containing the ferroelectric liquid crystal composition according to the invention shows a remarkably improved low temperature operation characteristic and a smaller temperature-dependency of response speed.

Example 16

Among the example mesomorphic compounds mentioned hereinbefore. Example Compounds I-38 and II-24 were mixed in a ratio of 3:7 to prepare a liquid crystal composition. The above mesomorphic compounds and the liquid crystal composition were respectively disposed in a thickness of 2 μm between a pair of electrode plates each coated with a rubbed polyimide film covering the electrodes to prepare liquid crystal devices. The respective devices were subjected to measurement of optical response time by detecting optical response in response to application of a peak-to-peak voltage of 20 V under right angle cross nicols. The results are shown below.

| | 55° C. | 45° C. | 35° C. |
|---|---|---|---|
| I-38 | 3.2 msec | 6.7 msec | — |
| II-24 | — | 230 μsec | 300 μsec |
| Liquid Crystal Composition (I-38/II-24 = 3/7) | — | 200 μsec | 270 μsec |

As shown in the above table, the responsive characteristics around room temperature were improved by mixing the mesomorphic compounds I-38 and II-24.

Example 17

Example Compounds I-44 and II-25 were mixed in a ratio of 3:7 to form a liquid crystal composition. The above mesomorphic compounds and the liquid crystal composition were respectively formulated into a liquid crystal device in the same manner as in Example 16. The respective devices .were subjected to measurement of optical response time in the same manner as in Example 16. The results are shown below.

| | 65° C. | 50° C. | 45° C. | 35° C. | 25° C. |
|---|---|---|---|---|---|
| I-44 | 3.4 msec | — | — | — | — |
| II-25 | — | — | 220 μsec | 300 μsec | 420 μsec |
| Composition (I-44/II-25 = 7/3) | — | 300 μsec | 380 μsec | 440 μsec | 530 μsec |

By mixing the mesomorphic compounds I-44 and II-25, the responsive characteristics, particularly the temperature dependency of response speed, were improved.

Example 18

Example Compounds I-46 and II-26 were mixed in a ratio of 3:7 to form a liquid crystal composition. The above mesomorphic compounds and the liquid crystal composition were respectively formulated into a liquid crystal device in the same manner as in Example 16. The respective devices were subjected to measurement of optical response time in the same manner as in Example 16. The results are shown below.

| | 45° C. | 40° C. | 35° C. | 25° C. |
|---|---|---|---|---|
| I-46 | 350 μsec | 370 μsec | — | — |
| II-26 | 310 μsec | — | 460 μsec | 600 μsec |
| Composition (I-46/II-26 = 7/3) | — | 420 μsec | 470 μsec | 530 μsec |

By mixing the mesomorphic compounds I-46 and II-26, the responsive characteristics, particularly the temperature dependency of response speed, were improved.

Example 19

Example Compounds II-12, II-24, II-25 and II-32 were mixed in ratios of 2:3:3:1 to form a liquid crystal composition R. The liquid crystal composition was formulated into a liquid crystal device in the same manner as in Example 16. The device was subjected to measurement of optical response time in the same manner as in Example 16. The results are shown below.

| | 45° C. | 35° C. | 25° C. |
|---|---|---|---|
| Composition R | 290 μsec | 350 μsec | 410 μsec |

The device caused an inversion of display state when supplied with a reverse electric field of 2 V for 2 msec.

Then, the liquid crystal composition R was mixed with Example Compound I-41 in a ratio of 4:1 to form a liquid crystal composition S, from which a liquid crystal device was prepared and subjected to measurement of optical response time in the same manner as in Example 16. The results are shown below.

| | 45° C. | 35° C. | 25° C. |
|---|---|---|---|
| Composition S | 310 μsec | 375 μsec | 430 μsec |

The device did not caused an inversion of display state when supplied with a reverse electric field of 2 V for 2 msec.

As is understood from the above results, the response characteristic and threshold characteristic of the liquid crystal composition R comprising mesomorphic compounds having a pyrimidine ring were improved by adding a mesomorphic compound I-41 having a pyridine ring.

Example 20

A liquid crystal composition T was prepared by mixing Example Compounds I-44 and I-45 in a ratio of 1:1. A liquid crystal composition U was prepared by mixing Example Compounds II-24 and II-25 in a ratio of 1:1. Further, a liquid crystal composition V was prepared by mixing the liquid crystal compositions T and U in a ratio of 4:6. A device was prepared by using the liquid crystal composition V in the same manner as in Example 16, whereby a monodomain of a uniform alignment state was obtained. Further, devices were similarly produced by using the liquid crystal compositions T and U, respectively. The liquid crystal devices thus obtained were subjected to measurement of optical response time in the same manner as in Example 16. The results are shown below.

| | 45° C. | 35° C. | 25° C. | 15° C. |
|---|---|---|---|---|
| Composition T | 750 μsec | 960 μsec | 1.35 msec | — |
| Composition U | 210 μsec | 280 μsec | 400 μsec | — |
| Composition V | 320 μsec | 400 μsec | 470 μsec | 550 μsec |

The respective devices were supplied with a reverse electric field of 2 V for 2 msec at 25° C., whereby the devices containing the liquid crystal compositions T and V did not cause inversion of display state.

From the above results, it is understood that the liquid crystal composition V was remarkably improved in both the response characteristic and threshold characteristic when compared with the liquid crystal compositions T and U.

Example 21

A liquid crystal composition W was prepared by mixing the following mesomorphic compounds in the respectively indicated proportions.

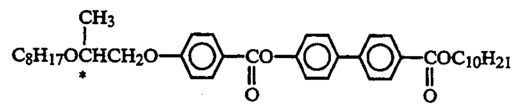
30%

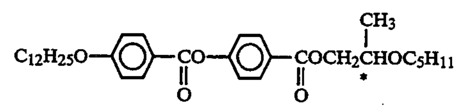
10%

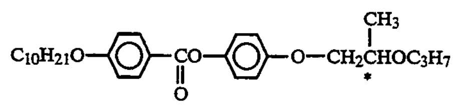
20%

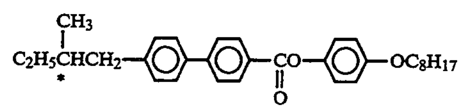
20%

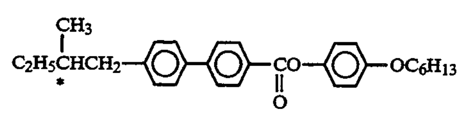
20%

Further, a liquid crystal composition X was prepared by mixing the above-mentioned Example Compounds I-43, I-44, I-45, I-47, II-5 and II-12 in ratios of 10:10:10:30:20:25.

Further, a liquid crystal composition Y was prepared by mixing the liquid crystal compositions W and X in a ratio of 75:25.

Then, liquid crystal devices were prepared by using the liquid crystal compositions W and Y, respectively, and subjected to measurement of optical response time in the same manner as in Example 16. The results are shown below.

| | 35° C. | 25° C. | 15° C. | 5° C. |
|---|---|---|---|---|
| Composition W | 350 μsec | 750 μsec | 1.35 msec | 3.2 msec |
| Composition Y | 300 μsec | 600 μsec | 950 μsec | 1.6 msec |

The respective devices were supplied with a reverse electric field of 2 V and 2 msec, whereby the liquid crystal composition W caused an inversion of display state while the liquid crystal composition Y did not caused such an inversion.

From the above results, it is understood that both the response characteristic and the threshold characteristic of the liquid crystal composition W were remarkably improved by the addition of the liquid crystal composition X containing mesomorphic compounds having a pyrazine ring and a pyrimidine ring respectively.

Example 22

A liquid crystal composition Z-1 was prepared by mixing Example Compounds I-8, I-10, I-24, I-47, I-85, I-97, II-25, II-30, II-49, II-52 and II-56 in ratios of 2:2:10:30:10:5:30:10:6:10:10.

Further, the liquid crystal composition Z-1 and the liquid crystal composition W used in Example 21 were mixed in the ratio of 25:75 to prepare a liquid crystal composition Z-2.

A liquid crystal device was prepared by using the liquid crystal composition Z-2 and subjected to measurement of optical response time in the same manner as in Example 16. The results are shown below.

| | 35° C. | 25° C. | 15° C. | 5° C. |
|---|---|---|---|---|
| Composition Z-2 | 270 μsec | 490 μsec | 705 μsec | 1.2 msec |

The device did not cause of display state when supplied with a reverse electric field of 2 V for 2 msec at 25° C.

From the above results, it is understood that the response characteristic and threshold characteristic of the liquid crystal composition W were both improved remarkably by the addition of the liquid crystal composition Z-1 containing mesomorphic compounds having a pyrazine ring and a pyrimidine ring, respectively.

What is claimed is:

1. A chiral smectic liquid crystal composition, comprising:

at least one mesomorphic compound represented by the formula (1) below:

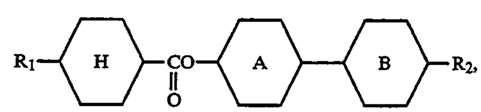
(1)

wherein $R_1$ denotes an alkyl group having 1–16 carbon atoms; $R_2$ denotes a substituted or unsubstituted alkyl group, alkoxy group, alkoxycarbonyl group, acyloxy group or alkoxycarbonyloxy group each having 1–16 carbon atoms the substituent of the substituted $R_2$ being alkyl, alkoxy, alkoxycarbonyl, Cl or F; and

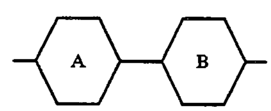
denotes

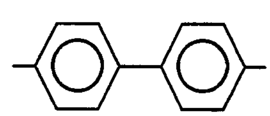

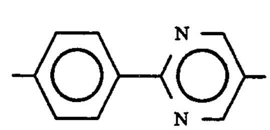

-continued

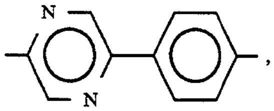

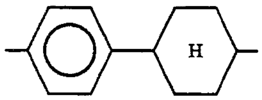

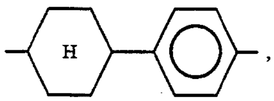

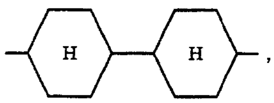

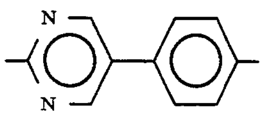

or

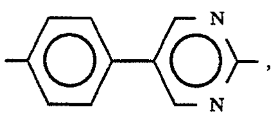

in which group

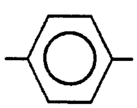

may have a substituent of CN or F; and at least one mesomorphic compound represented by the formula (3) below:

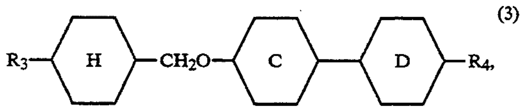

(3)

wherein $R_3$ denotes an alkyl group having 1-16 carbon atoms; $R_4$ denotes a substituted or unsubstituted alkyl group, alkoxy group, alkoxycarbonyl group, acyloxy group or alkoxycarbonyloxy group each having 1-16 carbon atoms, the substituent of the substituted $R_4$ being alkyl, alkoxy or Cl; and

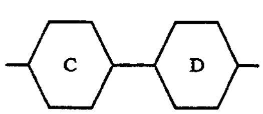

denotes

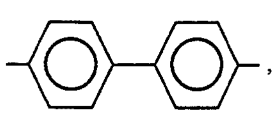

-continued

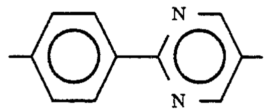

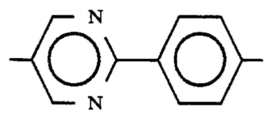

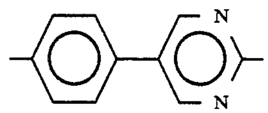

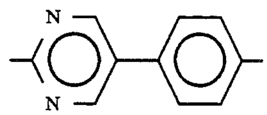

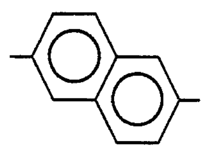

or

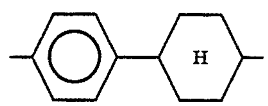

and wherein group

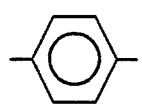

may have a substituent of CN or F.

2. A composition according to claim 1, wherein the mesomorphic compound represented by the formula (3) is free from an asymmetric carbon atom and optically inactive.

3. A composition according to claim 1, wherein at least one of $R_3$ and $R_4$ in the formula (3) has an asymmetric carbon atom and is optically active.

4. A composition according to claim 1, wherein the mesomorphic compound represented by the formula (1) is one also represented by the following formula (2):

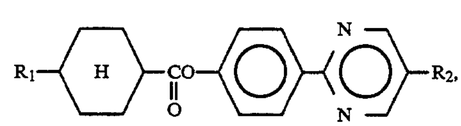

(2)

wherein $R_1$ and $R_2$ have the same meanings as in the formula (1); and the mesomorphic compound represented by the formula (3) is one also represented by the following formula (4):

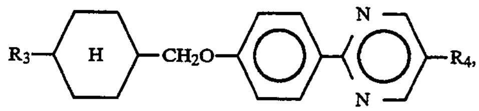

(4)

wherein $R_3$ and $R_4$ have the same meanings as in the formula (3).

5. A liquid crystal device, comprising a pair of electrode plates and a chiral smectic liquid crystal composition according to claim 1 disposed between the electrode plates.

6. A device according to claim 5, wherein said chiral smectic liquid crystal composition shows a phase transition series of isotropic phase, cholesteric phase, smectic A phase, and chiral smectic C phase.

7. A device according to claim 5, wherein at least one of the electrode plates has a face having a function of aligning the axis of liquid crystal molecules preferentially in one direction.

8. A composition according to claim 1, wherein the mesomorphic compound represented by the formula (1) is free from an asymmetric carbon atom and is optically inactive.

9. A composition according to claim 1, wherein at least one of $R_1$ and $R_2$ in the formula (1) has an asymmetric carbon atom and is optically active.

10. A composition according to claim 1, which comprises 1–500 wt. parts in combination of the compounds of the formulae (1) and (3) and 100 wt. parts of another liquid crystal material.

11. A composition according to claim 1, which comprises 10–100 wt. parts in combination of the compounds of the formulae (1) and (3) and 100 wt. parts of another liquid crystal material.

* * * * *

UNITED STATES PATENT AND TRADEMARK OFFICE
CERTIFICATE OF CORRECTION

PATENT NO. : 5,389,296

DATED : February 14, 1995

INVENTOR(S) : KENJI SHINJO, ET AL.

It is certified that error appears in the above-identified patent and that said Letters Patent is hereby corrected as shown below:

Title page, item
[75] Inventors

"Kenji Shingo;" should read --Kenji Shinjo;--.

COLUMN 1

Line 26, close up right margin; and

Line 27, close up left margin.

COLUMN 6

Line 46, "Least" should read --least--.

COLUMN 21

Line 62, "distille-off" should read --distilled-off--.

COLUMN 22

Line 60, "represent" should read --represented--.

COLUMN 24

Line 17, "suit, ably" should read --suitably--.

COLUMN 51

Line 27, "may" should read --may be--.

UNITED STATES PATENT AND TRADEMARK OFFICE

CERTIFICATE OF CORRECTION

PATENT NO. : 5,389,296

DATED : February 14, 1995

INVENTOR(S) : KENJI SHINJO, ET AL.

It is certified that error appears in the above-identified patent and that said Letters Patent is hereby corrected as shown below:

COLUMN 52

Line 31, "Further" should read --Further,--.

COLUMN 61

Line 19, "mesomorphic-compound" should read --mesomorphic compound--.

COLUMN 62

Line 30, "neutralty" should read --neutrality--; and

Line 34, "retool): should read --mmol)--.

COLUMN 63

Line 7, "group)" should read --group).--; and

Line 19, "neutralty" should read --neutrality--.

COLUMN 108

Example Compound No. (II-6), " 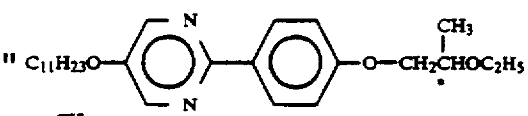 "

should read -- 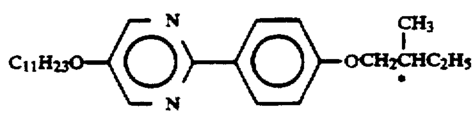 --

UNITED STATES PATENT AND TRADEMARK OFFICE

CERTIFICATE OF CORRECTION

PATENT NO. : 5,389,296
DATED : February 14, 1995
INVENTOR(S) : KENJI SHINJO, ET AL.

It is certified that error appears in the above-identified patent and that said Letters Patent is hereby corrected as shown below:

COLUMN 108, Cont'd.

No. (II-7) "

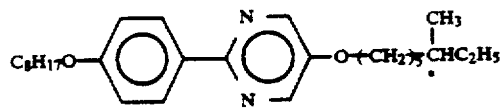

"

should read --

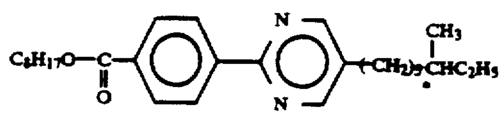

--

No. (II-8) "

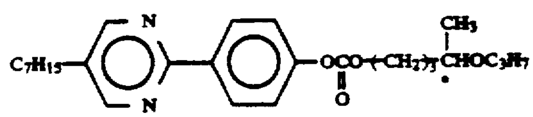

"

should read --

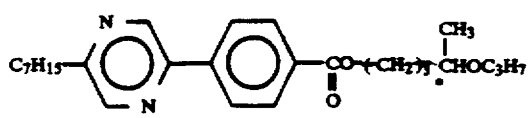

--

UNITED STATES PATENT AND TRADEMARK OFFICE
CERTIFICATE OF CORRECTION

PATENT NO. : 5,389,296
DATED : February 14, 1995
INVENTOR(S) : KENJI SHINJO, ET AL.

It is certified that error appears in the above-identified patent and that said Letters Patent is hereby corrected as shown below:

<u>COLUMN 109</u>

Example Compound No. (II-13) " $CH_3$
| 
—$\overset{*}{C}HC_2H_5$" should read

-- OH
|
— $\overset{*}{C}HC_2H_5$ --;

No. (II-16), "$CH_3$
|
$\overset{*}{C}HC_2H_5$" should read -- Cl
|
$\overset{*}{C}HC_2H_5$--; and No. (II-17) "$CH_3$
|
$\overset{*}{C}HOC_2H_5$" should read -- $CH_3$
|
$\overset{*}{C}HOC_{12}H_{25}$--.

<u>COLUMN 113</u>

Example Compound No. (II-48), " 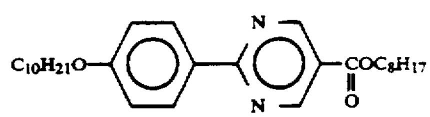 "

should read -- 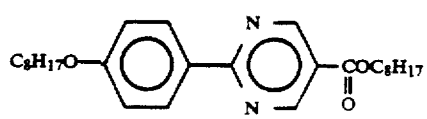 --

UNITED STATES PATENT AND TRADEMARK OFFICE
CERTIFICATE OF CORRECTION

PATENT NO. : 5,389,296

DATED : February 14, 1995

INVENTOR(S) : KENJI SHINJO, ET AL.

It is certified that error appears in the above-identified patent and that said Letters Patent is hereby corrected as shown below:

<u>COLUMN 115</u>

Example Compound No. (II-54) " 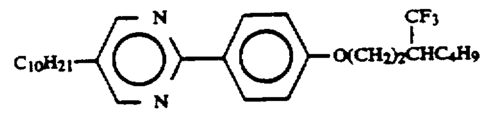 "

should read -- 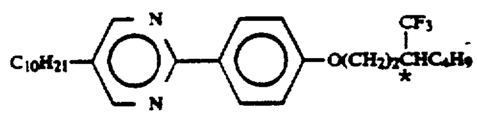 --

No. (II-55) " 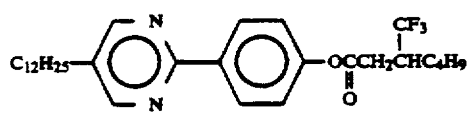 "

should read -- 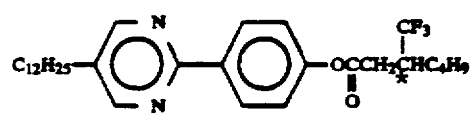 --

<u>COLUMNS 117 & 118</u>

Line 5, " 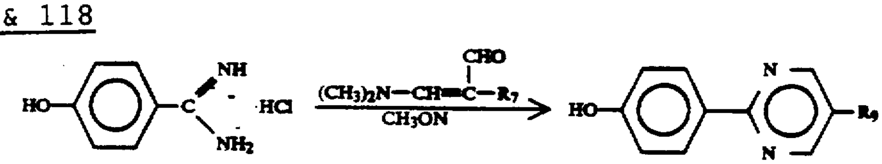 "

UNITED STATES PATENT AND TRADEMARK OFFICE
CERTIFICATE OF CORRECTION

PATENT NO. : 5,389,296

DATED : February 14, 1995

INVENTOR(S) : KENJI SHINJO, ET AL.

It is certified that error appears in the above-identified patent and that said Letters Patent is hereby corrected as shown below:

COLUMN 117, Cont'd.

should read -- 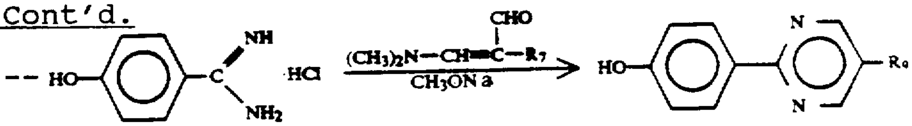 --

COLUMN 120

Line 48, "is" should read --in--;
Line 49, "second" should read --seconds--; and
Line 50, "min." should read --minutes.--.

COLUMN 127

Line 18, "as=in" should read --as in--.

COLUMN 128

Line 22, "histability" should read --bistability--.

COLUMN 129

Line 16, "hereinbefore." should read --hereinbefore,--.

COLUMN 130

Line 43, "caused" should read --cause--.

UNITED STATES PATENT AND TRADEMARK OFFICE

CERTIFICATE OF CORRECTION

PATENT NO. : 5,389,296

DATED : February 14, 1995

INVENTOR(S) : KENJI SHINJO, ET AL.

It is certified that error appears in the above-identified patent and that said Letters Patent is hereby corrected as shown below:

COLUMN 131

Line 60, "$\frac{15°C}{1.35\ msec}$" should read --$\frac{15°C}{1.4\ msec}$--; and Line 68, "caused" should read --cause--.

Signed and Sealed this

Thirtieth Day of May, 1995

Attest:

BRUCE LEHMAN

Attesting Officer

Commissioner of Patents and Trademarks